US008407062B2

(12) United States Patent
Jermyn et al.

(10) Patent No.: US 8,407,062 B2
(45) Date of Patent: *Mar. 26, 2013

(54) ANONYMITY-ENSURED SYSTEM FOR PROVIDING AFFINITY-BASED DELIVERABLES TO LIBRARY PATRONS

(75) Inventors: Michael Jermyn, New York, NY (US); Frank Palazzo, Dresher, PA (US); Paul Simon, Princeton Junction, NJ (US)

(73) Assignee: Jermyn & Associates, LLC, New York, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 12/985,097

(22) Filed: Jan. 5, 2011

(65) Prior Publication Data
US 2011/0095083 A1 Apr. 28, 2011

Related U.S. Application Data

(63) Continuation of application No. 11/844,184, filed on Aug. 23, 2007, now Pat. No. 7,890,337.

(60) Provisional application No. 60/823,560, filed on Aug. 25, 2006.

(51) Int. Cl.
G06Q 10/00 (2006.01)
G06Q 30/00 (2012.01)

(52) U.S. Cl. ..................... 705/1.1; 705/14.49
(58) Field of Classification Search .......................... None
See application file for complete search history.

(56) References Cited

U.S. PATENT DOCUMENTS

| 4,703,423 A | 10/1987 | Bado et al. |
| 4,723,212 A | 2/1988 | Mindrum et al. |
| 4,910,672 A | 3/1990 | Off et al. |
| 5,173,851 A | 12/1992 | Off et al. |
| 5,459,306 A | 10/1995 | Stein et al. |
| 5,612,868 A | 3/1997 | Off et al. |
| 5,832,457 A | 11/1998 | O'Brien et al. |
| 5,892,827 A | 4/1999 | Beach et al. |
| 5,926,795 A | 7/1999 | Williams |
| 5,974,399 A | 10/1999 | Giuliani et al. |
| 6,014,634 A | 1/2000 | Scroggie et al. |
| 6,021,362 A | 2/2000 | Maggard et al. |
| 6,026,370 A | 2/2000 | Jermyn |
| 6,067,524 A | 5/2000 | Byerly et al. |
| 6,237,145 B1 | 5/2001 | Narasimhan et al. |
| 6,240,394 B1 | 5/2001 | Uecker et al. |
| 6,278,979 B1 | 8/2001 | Williams |
| 6,282,516 B1 | 8/2001 | Giuliani |
| 6,292,711 B1 | 9/2001 | LaDue |
| 6,304,849 B1 | 10/2001 | Uecker et al. |
| 6,307,958 B1 | 10/2001 | Deaton et al. |
| 6,321,210 B1 | 11/2001 | O'Brien et al. |

(Continued)

OTHER PUBLICATIONS www.amazon.com, Feb. 28, 2008.

(Continued)

*Primary Examiner* — Jonathan Ouellette
(74) *Attorney, Agent, or Firm* — Caesar, Rivise, Bernstein, Cohen & Pokotilow, Ltd.

(57) ABSTRACT

A system and method for automatically determining library patrons' interests without having to identify the patron or otherwise invade his/her privacy based on the library patron's current use of library assets. The system and method involve categorizing the library's assets using broad mapping user interest categories, associating a user interest category with a specific library asset that is checked out, reserved or otherwise used by a library patron and providing that patron with a confirmation item containing that user interest category, providing the library patron with feedback about the library assets and the broad mapping user interest categories, allowing library patrons to access and register for a library rewards program using the user interest category number and having advertisers provide relevant information and rewards to library patrons who request such additional information.

16 Claims, 64 Drawing Sheets

U.S. PATENT DOCUMENTS

| | | |
|---|---|---|
| 6,334,108 B1 | 12/2001 | Deaton et al. |
| 6,351,735 B1 | 2/2002 | Deaton et al. |
| 6,377,935 B1 | 4/2002 | Deaton et al. |
| 6,392,786 B1 | 5/2002 | Albert |
| 6,424,949 B1 | 7/2002 | Deaton et al. |
| 6,484,146 B2 | 11/2002 | Day et al. |
| 6,584,448 B1 | 6/2003 | Laor |
| 6,684,195 B1 | 1/2004 | Deaton et al. |
| 6,750,777 B2 | 6/2004 | Larson et al. |
| 6,795,809 B2 | 9/2004 | O'Brien |
| 6,885,994 B1 | 4/2005 | Scroggie et al. |
| 7,024,374 B1 | 4/2006 | Day et al. |
| 7,058,591 B2 | 6/2006 | Giuliani et al. |
| 7,099,038 B2 | 8/2006 | Schuller |
| 7,542,919 B1 | 6/2009 | Mueller et al. |
| 2001/0023407 A1 | 9/2001 | Liyanearachchi et al. |
| 2001/0027423 A1 | 10/2001 | Clonts et al. |
| 2002/0069115 A1 | 6/2002 | Fitzpatrick |
| 2002/0077901 A1 | 6/2002 | Katz |
| 2002/0091566 A1 | 7/2002 | Siegel |
| 2002/0107728 A1 | 8/2002 | Bailey et al. |
| 2002/0107729 A1 | 8/2002 | Katz |
| 2002/0147639 A1 | 10/2002 | Williams et al. |
| 2003/0014537 A1 | 1/2003 | Kupiec et al. |
| 2003/0028424 A1 | 2/2003 | Kampff et al. |
| 2003/0088466 A1 | 5/2003 | Fitzpatrick |
| 2003/0154163 A1 | 8/2003 | Phillips et al. |
| 2004/0139318 A1 | 7/2004 | Fiala et al. |
| 2004/0193538 A1 | 9/2004 | Raines |
| 2005/0156027 A1 | 7/2005 | Munari |
| 2006/0188145 A1 | 8/2006 | Song et al. |

OTHER PUBLICATIONS www.catalinamarketing.com, Feb. 28, 2008.

www.netflix.com, Feb. 28, 2008.

Welcome Page

Welcome Message:
Page from the internet to promote the user experience.

One version from library link or newsletter, and one version from search engines.

Login box:

| Username | Category Code |
|---|---|
| Password | Login button |

Find your library

Drop-down by state

FIG. 14

Register Page

First Name*
Last Name
Library Card Number*
Category Number
Email Address
Username
Password
Confirm Password

[Submit]

picture of newsletter or checkout slip

Sub-Category Page

| Show All | Events | Offers | Resources |

Readers' Advisory - when applicable

| LOGO | Name and offer |
| LOGO | Name and offer |
| LOGO | Name and offer |

Calendar Page

Month-view of calendar

Date: Title, Time
　　Location
　　Description
　　Link to register

Date: Title, Time
　　Location
　　Description
　　Link to register

Event Detail Page

Title    Time    Location

Description

Image

FIG. 26

Readers' Advisory Detail

Date, Title

Content block

FIG. 30

**Library Admin System
Event Manager Page**

Month DD ▶
Year DD ▶ month view | list view

\> Next last <

(calendar month view)

FIG. 34

**Library Admin System
Manage Library Profile Page**

| Name of library |
| Address |
| Phone |
| Contact name |
| Change password |
| Logo |

Library Admin System
Event Edit Form

Title
Date/time
Location
Description

Tag management interface
TBD

RSVP email

External Link

Audience selection ▶

Library Admin System
New Advertiser Form

Business Name
Address
Phone
Email
Comments

LOGO

Upload logo

Library Admin System
New Campaign / Edit Campaign

Title
Description
Publish date          Expire date
Create coupon (came as coupon)

| Assign Subcategories TBD |

Big Text
Medium Text              | Upload image |
Limiting Terms/Fine Print | Requires library card? |
                          | ☐ yes (Checked) |

| Add new campaign |

Library Admin System
New Campaign / Edit Campaign

Title
Description
Publish date          Expire date
Create coupon (came as coupon)

Big Text
Medium Text
Fine Print

Assign Subcategories TBD

Upload image
Requires library card?
☐ yes (Checked)

Create expertise

Title
Description
Link

**Library Admin System
Manage Readers' Advisory**

List of Advisories

| Title | Expire Immediately |
|---|---|
| Title | Expire Immediately |
| Title | Expire Immediately |
| Title | Expire Immediately |
| Title | Expire Immediately |

Add New

FIG. 52

Library Admin System
Edit Readers' Advisory

Title

Publish / Expire Date

Comments

Category Tags TBD

Library Admin System
Links & Resources Form

Title

Publish / Expire Date

Resource or Link  Drop-down menu ▶

Description

External URL

FIG. 56

ANONYMITY-ENSURED SYSTEM FOR PROVIDING AFFINITY-BASED DELIVERABLES TO LIBRARY PATRONS

CROSS-REFERENCE TO RELATED APPLICATIONS

This Continuation Application claims the benefit under 35 U.S.C. §120 of utility application Ser. No. 11/844,184, filed Aug. 23, 2007 entitled ANONYMITY-ENSURED SYSTEM FOR PROVIDING AFFINITY-BASED DELIVERABLES TO LIBRARY PATRONS which in turn claims the benefit under 35 U.S.C. §119(e) of Provisional Application Ser. No. 60/823,560 filed on Aug. 25, 2006 entitled LIBRARY PATRON TARGETING AND RELEVANCE COMMUNICATION SYSTEM and all of whose entire disclosures are incorporated by reference herein.

BACKGROUND OF THE INVENTION

1. Field of Invention

This invention relates to a system and method of enhancing library usage by library patrons while enhancing patron knowledge and experience while protecting their privacy.

2. Description of Related Art

One common business technique utilized today by vendors of goods, particularly those providing such goods over the Internet, is to offer the purchaser similar goods to those being purchased on the assumption that it is likely that the purchaser has an affinity for or interest in goods of that type. One well known example of such a business is Amazon.com, wherein a purchaser of a book or some other product will be presented with offers for books or products of a similar nature or genre to the book/product being purchased. For example, if the purchaser purchases a camera he/she may be presented with an offer for camera accessories, such as lenses. This affinity-based vending technique is also used in the rental field. For example, Netflix.com rents videos to its customers and presents the customers with other videos that its system considers the renter would be interested in renting.

Both of these types of prior art businesses operate under a commercial relationship with their customers that demands customer payment upon product purchase or lease. Moreover, these systems recommend the products to be purchased or leased based on historical transactions. Their related products' marketing information is not provided and would not be acceptable as constructed in a borrowed asset environment, for example, a library. Also, their marketing information is solely directed towards in-store products that they sell, and does not consider third party programs, training, expertise, services or products, since such outside products are considered counterproductive to their competitive interest. Moreover, these services do not provide any additional content to its users, but merely promote existing content. These systems are also invasive as they recommend their existing content automatically and without customer consent. Further, these Internet sales and movie rental systems promote their existing content based on the specific identification of the purchased or leased asset. Such specific identification consists of the title and author of books/media, or the title, director, and actors of films. Moreover and quite significantly, these systems also require and track the identification of the purchaser/leaser and the asset's title, thereby raising privacy concerns in the public.

Another type of affinity-based vending technique utilized by businesses is to provide to purchasers of goods promotional coupons for other similar or related goods. For example, Catalina Marketing has a system (e.g., In-Store Prints$^{SM}$ at http://www.catalinamarketing.com, hereinafter referred to as "The Catalina Coupon System) that operates for and within supermarket and drug stores. The Catalina Coupon System generates a coupon for patrons at points of sale based on the Universal (UPC) of items purchased. That is, the Catalina Coupon System relies on the UPC of the product(s) purchased to identify the product and trigger the generation of a related promotional coupon within the product family. Moreover, the Catalina Coupon System maintains a history of consumer purchasing behavior that is used to determine if a consumer is a target to receive a particular offer. Thus the Catalina Coupon System and similar systems used in grocery stores are invasive and operate in a purchase only environment.

While the above described systems for vending goods or services are generally suitable for their intended purposes they all suffer from various drawbacks. For example, they do not provide a non-invasive environment (e.g., they require and track personal information about the consumer and do so without giving the consumer any choice as to whether the data about him/her will be saved). Further still, such systems do not provide any opportunities or benefits outside the specific product family. Further yet, such systems do not provide an opportunity to visit an opt-in environment (e.g., a website) where the patrons can view information and expertise, learn about and obtain tickets for events and programs of interest to the patrons and receive promotional values based on the patron's demonstrated areas of interest.

Traditionally libraries have not made use of effective marketing techniques to promote their services. Thus, in order to fulfill their mission of public service, to provide value as a community center and to better compete for patron attention and loyalty, today's libraries must do more than provide access to printed materials. Libraries commonly circulate videos, CDs, DVDs, journals, subscriptions, databases, archival material, and even books on MP3 players. In addition, nearly 50% of library visitors use public PCs to access the Internet during their visit. Many libraries also provide meeting rooms for public use and even cafes or coffee shops to enhance the patron experience. Beyond access to materials and resources, educational and social events have become important services provided by the libraries of today. In fact, research by the American Library Association has shown that programs such as "how to" sessions, book groups, and teen nights are essential to increasing patron visits to libraries.

While librarians are experts at information management, most are not trained in program development or marketing. As a result, the level of programs offered varies greatly from library to library. Some libraries offer rich programs of educational and entertainment events. Others have little beyond children's reading programs. Attendance at in-library events has a direct correlation to the number of patron visits and circulation levels. Both are critical metrics for library funding initiatives and the perception of the library within its community.

Most libraries also do a poor job of promoting their programs to patrons. Many facilities simply post announcements in the library—you have to visit the library to know what is available. Those with electronic calendars force patrons to wade through pages of programs in numerous topics to find something of value to the patron. Organizations outside of the library do not consider the library as a medium for promotion because of this inability to reliably reach people with their message.

Existing library cataloging methods (Dewey Decimal, Library of Congress) are not suitable to fill the gap of effectively matching patrons to areas of their interest, so the inventors defined the categories of interest and created the system described below for mapping library item barcodes to their defined categories. The existing library catalog system used by the Library of Congress is too specific to meet the breadth of interest related to individual books. For example, book subject matter is often too granular and not lifestyle oriented. In other words, the existing library categories are not based on user needs, as they do not associate the narrow topics of books with broader categories aligned with the general interest of patrons.

Libraries have a need for tools to provide better, more relevant programs to patrons and to promote deliverables (e.g., programs, expertise, information, promotional values, etc.) to their patrons who would be most interested in them. The subject invention is directed to that end and fulfills that goal, while protecting the privacy of its patrons. In addition, the subject invention enables other entities to sponsor library programs and to gain some commercial benefit from such sponsorship.

All references cited herein are incorporated herein by reference in their entireties.

BRIEF SUMMARY OF THE INVENTION

The Anonymity-Ensured System for Providing Affinity-Based Deliverables to Library Patrons, hereinafter "AES" (also referred to as "Library Rewards" or "Library Patron"), is a comprehensive set of computer hardware, software, on-line content and services that provides better programming for libraries and improved promotion of library resources and programs to patrons. Use of the system enhances library usage by patrons. The AES includes a recruitment tool that matches patron-specific needs and interests in a borrowed-asset environment with information, expertise, live events, programs, promotional values and advertising content based on patron transactional behavior. The AES is directed to patrons' needs and interest in a borrowed-asset environment.

While not being limited to a particular theory, the AES provides an opt-in web site where patrons may obtain information and expertise, view and sign up for in-library events and programs, view advertiser content, and receive promotional values. These deliverables relate to topics of interest demonstrated by the patrons via the AES by automatically correlating subject matter of patron borrowed materials to specific categories of interest of the moment for the patrons. The AES also provides on-screen messages and printed newsletters identifying categories of interest for patrons based on self-checkout transactions, staff checkout transactions, public computer reservations, payment for printouts, and empirical areas of interest, regardless of the security and circulation products used by the library. Further, the AES provides tools and services for libraries to manage their local events and programs along with regional and nationally sponsored programs, provides a mechanism for library staff to easily generate interest specific email to members, and provides statistics on member participation and use of the service. Programs for patrons may be sponsored by corporate and non-profit organizations, such as a seminar on infant care sponsored by Johnson and Johnson, or CPR training sponsored by the Red Cross.

The preferred embodiments of the invention provide numerous benefits, including advantages in relevancy of interest, patron awareness, reward opportunities, programming enhancements, and privacy. Patrons are informed of program benefits or specific deliverables (e.g., information, expertise, events, programs, promotional values) in categories of great interest, related to topics of materials being borrowed. Patrons are not exposed to offers or information that is irrelevant to their interest as demonstrated by the item or items checked out. Program benefits are promoted on newsletters (e.g., receipts of borrowing transactions), as a recruiting vehicle to proactively inform patrons of the benefits that are available from the library. Sponsors or presenters do not have to rely on people browsing the Internet to find their material, but instead know that patrons having like interests have an accessible directed path to the sponsored or presented event. Library patrons are offered access to knowledge, programs and live events from national and local providers in areas of interest that would not be available from the library otherwise. As additional benefits provided by the AES, library programs are enhanced by association with national sponsors who are experts in subject areas (e.g., Disney for travel); individual libraries are otherwise unable to acquire this content, since currently libraries must be syndicated to attract corporate interest. Patron privacy is preserved by the removal of all personally identifying information at the end of each patron's transaction. Category promotion is strictly based on the items being checked out at each transaction. Moreover, the AES is noninvasive; the patron must opt into the program to experience the benefits. The AES creates and fosters a relationship between the outside world (e.g., corporations, businesses, nonprofit organizations, etc.) and libraries while protecting the privacy of patrons. This new relationship provides mutual benefit by bringing more patrons to the library and providing potential customers to the program sponsors of the outside world based on patrons' demonstrated interest.

The invention described herein is a system for providing deliverables in the form of services and/or items to patrons of a library comprising: a confirmation item received by the patron from the library upon either checking out a specific library asset or reserving a specific library asset for checkout wherein the confirmation item bears indicia indicative of a category of interest related to the subject matter of the specific library asset and not based on any historical data regarding that patron or any other library assets the patron has previously checked-out or reserved. The system further includes an Internet-based system that establishes a program at a website for providing the deliverables, wherein the deliverables are in the form of information and/or expertise in the category of interest and/or events or programs available from the library or from others in the category of interest and/or promotional values in the category of interest. The Internet-based system is arranged so that the patron who receives the confirmation item can access the website to opt-into the program if the patron so chooses. The website is arranged to receive from the patron who has opted-in an input corresponding to said indicia on said confirmation item, whereupon the patron is presented with information about said deliverables, so that the patron can avail himself/herself of said deliverables if the patron so chooses.

A method for providing deliverables in the form of services and/or items to patrons of a library comprising: providing a confirmation item to the patron by the library upon the patron either checking out a specific library asset or reserving a specific library asset for checkout, said confirmation item bearing indicia indicative of a category of interest related to the subject matter of the specific asset and not based on any historical data regarding that patron or any other publications the patron has previously checked-out or reserved; and establishing a program at a website on the Internet for providing deliverables in the form of information and/or expertise in the category of interest and/or events or programs available from the library or from others in the category of interest and/or promotional values in the category of interest. The program is arranged so that the patron who receives the confirmation item can access the website to opt-into the program if the patron so chooses, and wherein the website is arranged to receive from the patron who has opted-in an input corresponding to the indicia on the printed item, whereupon the patron is presented with information about the deliverables, so that the patron can avail himself/herself of the deliverables if the patron so chooses.

A method of doing business by a service provider comprising: establishing a system for a library to enable patrons of the library to have access to deliverables in the form of services and/or items. The system comprises providing a confirmation item to the patron upon the patron either checking out a specific library asset or reserving a specific library asset for checkout. The confirmation item bears indicia indicative of a category of interest related to the subject matter of the specific library asset and not based on any historical data regarding that patron or any other asset the patron has checked-out or reserved; and establishing a program at a website on the Internet for providing deliverables in the form of information and/or expertise in the category of interest and/or events or programs available from the library or from others in the category of interest and/or promotional values in the category of interest. The program is arranged so that the patron who receives the confirmation item can access the website to opt-into the program if the patron so chooses. The website is arranged to receive from the patron who has opted-in an input corresponding to the indicia on the confirmation item, whereupon the patron is presented with information about the deliverables, so that the patron can avail himself/herself of said deliverables if the patron so chooses.

A method for automatically providing library patrons with relevant information upon checkout or reservation of at least one library asset. The method comprises: associating the identity of every removable library asset with a category based on a user interest; providing each removable library asset with a machine readable identity code; scanning the machine readable identity code upon checkout of a removable library asset; generating a confirmation item that identifies the removable library asset and at least one corresponding user interest category indicia without using prior patron library checkout activities; inputting the user interest category indicia to a website at which the library patrons are registered; and displaying information in the confirmation item pertinent to the at least one user interest category.

A method for configuring a library database including a plurality of library asset data records, each record having an asset identifier. The method comprises: identifying user interests using a plurality of user interest categories; associating a user interest category to each asset identifier; storing said asset identifier and associated interest category as a corresponding record in said library database.

A method of integrating a system for providing deliverables in the form of services and/or items to patrons of a library wherein the library has an existing library asset management system and which is coupled to an existing checkout station: disconnecting the connection between the existing library asset management system and the existing checkout station; coupling a computer between the existing library asset management system and the existing checkout station; intercepting messages from the library asset management system to determine library asset identifiers. The computer associates the library asset identifiers with corresponding user interest categories; intercepting messages from the checkout station containing library asset identifiers corresponding to library assets being checked out; comparing the intercepted library asset identifiers to determine if there is a match between the intercepted asset identifiers and their corresponding user interest categories; generating a confirmation item bearing indicia of the corresponding user interest category without interfering with the library system's checkout process if a match is found, or generating a confirmation item without indicia of the corresponding interest category if no match is found; permitting a patron who has completed the checkout process to input said corresponding user interest category at a website for providing deliverables in the form of information and/or expertise in the category of interest and/or events or programs available from the library or from others in the category of interest and/or promotional values in the category of interest. The program is arranged so that the patron who receives the confirmation item can access the website to opt-into the program if the patron so chooses. The website is arranged to receive from the patron who has opted-in an input corresponding to the indicia on the printed item, whereupon the patron is presented with information about said deliverables, so that the patron can avail himself/herself of the deliverables if the patron so chooses.

A system for providing deliverables in the form of services and/or items to patrons of a library that includes an existing library asset management system database and server having library asset identifiers stored therein. The system comprises: a user interest category database and associated server, wherein the database includes records that associate specific user interest categories with specific library assets; a checkout station interfaced with the user interest category database and associated server; and an Internet-based system establishing a program at a website for providing the deliverables; and wherein the checkout station and the user interest category database and associated server cooperate to generate a confirmation item that includes indicia indicative of a user category of interest related to a subject matter of a specific library asset that is being checked out by the patron and wherein the deliverables are in the form of information and/or expertise in the category of interest and/or events or programs available from the library or from others in the category of interest and/or promotional values in the category of interest. Wherein the Internet-based system is arranged so that the patron who receives the confirmation item can access the website to opt-into the program if the patron so chooses, wherein the website is arranged to receive from the patron who has opted-in an input corresponding to the indicia on the confirmation item, whereupon the patron is presented with information about the deliverables, so that the patron can avail himself/herself of the deliverables if the patron so chooses.

A system for providing deliverables in the form of services and/or items to patrons of a library which includes an existing library asset management system database and server having library asset identifiers stored therein, said system comprising: a user interest category database and associated server and wherein the database including records that associate specific user interest categories with specific library assets; a computer search station for permitting patrons to conduct searches and interfaced with the user interest database and associated server; and an Internet-based system establishing a program at a website for providing the deliverables; and wherein the computer search station is monitored during a patron search session such that a specific user interest category is associated with content or keywords used in the patron's search, wherein the user interest category database and associated server cooperate to generate a confirmation item that includes indicia indicative of the specific user interest category related to the patron's search and wherein the deliverables are in the form of information and/or expertise in the category of interest and/or events or programs available from the library or from others in the category of interest and/or promotional values in the category of interest, and wherein the Internet-based system is arranged so that the patron who receives the confirmation item can access the website to opt-into the program if the patron so chooses, and wherein the website is arranged to receive from the patron who has opted-in an input corresponding to the indicia on the confirmation item, whereupon the patron is presented with information about the deliverables, so that the patron can avail himself/herself of the deliverables if the patron so chooses.

A system for providing deliverables in the form of services and/or items to patrons of a library which includes an existing library asset management system database and server having library asset identifiers stored therein and wherein the system comprises: a user interest category database and associated server, wherein the database includes records that associate specific user interest categories with specific library assets; a computer station for permitting patrons to use the computer in a stand-alone session and interfaced with the user interest database and associated server; and an Internet-based system establishing a program at a website for providing the deliverables; and wherein upon ending a session at the computer station, a default user interest category is associated with the session, the user interest category database and associated server cooperating to generate a confirmation item that includes indicia indicative of the default user interest category and wherein the deliverables are in the form of information and/or expertise in the default category of interest and/or events or programs available from the library or from others in the category of interest and/or promotional values in the default category of interest. Wherein the Internet-based system is arranged so that the patron who receives the confirmation item can access the website to opt-into the program if the patron so chooses, and wherein the website is arranged to receive from the patron who has opted-in an input corresponding to the indicia on the confirmation item, whereupon the patron is presented with information about the deliverables, so that the patron can avail himself/herself of the deliverables if the patron so chooses.

BRIEF DESCRIPTION OF SEVERAL VIEWS OF THE DRAWINGS

The invention will be described in conjunction with the following drawings in which like reference numerals designate like elements and wherein:

FIG. 14 is a wire frame depiction of a home page of the hosted web site of the present invention;

FIG. 16 is a wire frame depiction of the joining member's registration page of the hosted web site;

FIG. 17 is a screen display of FIG. 16;

FIG. 22 is a wire frame depiction of the program subcategories page of the hosted web site showing the name and offer or event for that subcategory;

FIG. 23 is a screen display of FIG. 22;

FIG. 24 is a wire frame depiction of the library programs and events calendar page of the hosted web site;

FIG. 25 is a screen display of FIG. 24;

FIG. 26 is wire frame depiction of the events detail page of the hosted web site;

FIG. 30 is a wire frame depiction of a reader advisory detail page of the hosted web site;

FIG. 34 is a wire frame depiction of an administrator event manager page of the hosted web site;

FIG. 38 is a wire frame depiction of an administrator library profile management page of the hosted web site;

FIG. 39 is a screen display of FIG. 38;

FIG. 40 is a wire frame depiction of an administrator event edit form of the hosted web site;

FIG. 41 is a screen display of FIG. 40;

FIG. 44 is a wire frame depiction of an administrator new advertiser form page of the hosted web site;

FIG. 45 is a screen display of FIG. 44;

FIG. 48 is a wire frame depiction of an administrator new campaign/edit campaign page regarding "expertise" of the hosted web site;

FIG. 49 is a screen display of FIG. 48;

FIG. 50 is a wire frame depiction of an administrator new campaign/edit campaign page regarding a "coupon" of the hosted web site;

FIG. 51 is a screen display of FIG. 50;

FIG. 52 is wire frame depiction of an administrator's manage readers' advisory page of the hosted web site;

FIG. 54 is a wire depiction of an administrator's edit readers' advisory page of the hosted web site;

FIG. 55 is a screen display of FIG. 54;

FIG. 56 is a wire frame depiction of an administrator's links and resources (new resources) form page of the hosted web site;

DETAILED DESCRIPTION OF THE INVENTION

Figure 1:
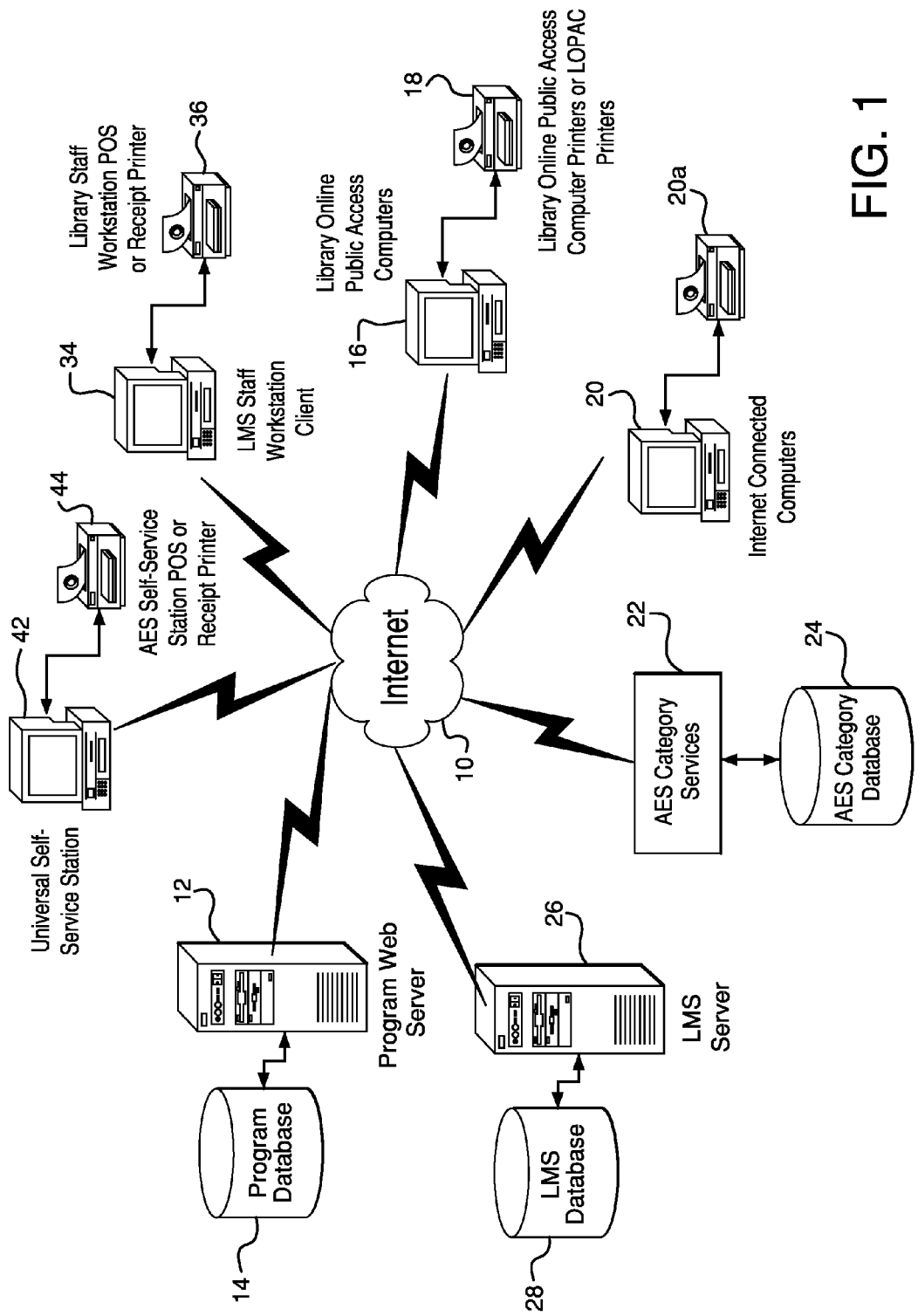
FIG. 1 is a diagram of the AES of the present invention.

In a preferred embodiment, the AES includes a relevancy detection module, a catalog service, a patron newsletter printing station, a content management service and on-line content. Relevancy detection modules are preferably located at points of checkout (e.g., staff checkout, self checkout) and at public computer stations within the library. These modules scan circulated materials and assets (e.g., books, periodicals, videotapes, DVDs, artifacts, CDs, computers and associated devices, audio video equipment, publication, original works, archives, materials, conference rooms, etc.) being checked out by patrons and forward indicia of the checked out materials to the catalog service. The catalog service correlates subject matter of the assets (including books, periodicals, CDs, DVDs, videos, computer usage, lecture hall service, teleconferencing service, etc) to predefined categories of interest. The patron newsletter printing stations are preferably located at the points of checkout and at PC reservation stations. These printing stations insert promotional messages from the matching categories into the patron newsletter (e.g., receipt). Additionally, relevant category benefits may be displayed on-screen as part of the patron interface at self checkout stations, or on library public PCs. The content management service is preferably located on a service provider-managed web server that enables library staff to enter events, programs, recommended reading, links to on-line information, and coupons and associate them with a category of interest. On-line content located or accessible via the service provider-managed web server is preferably available only to patrons who opt-in to the server.

As an example of a preferred embodiment for checking out materials, a library patron checks out a book on a specific topic (e.g., running) at a checkout station. The checkout station prints a newsletter or confirmation item, including confirmation of the checkout transaction, flags the book as relating to a corresponding category (e.g., fitness) and provides an invitation to visit a web site associated with the library for programs and view benefits related to the corresponding category. The patron visits the library web site, enrolls in the program, and enters the corresponding category (e.g., fitness) by the category name or code listed on the patron's newsletter. Web content related to the entered category is displayed on the patron's computer. For example, for a fitness category, related content may include listings of road races in the area, upcoming cycling events for charity, advertisement material for local fitness centers, and an invitation to attend a presentation on proper stretching exercises at the library.

As an example of a preferred embodiment for using library computers, a library patron signs up to use a library computer at a reservation station. The reservation station prints reservation information, such as a confirmation item (e.g., an item bearing printed indicia, newsletter) of the item reserved by the patron with an invitation to visit a web site associated with the library to enroll in the program and view benefits in various categories of interest. The confirmation item may include a default category of interest (e.g., local interest; it should be noted that the various categories are discussed later). The patron visits the library web site, enrolls in the program, and finds programs related to a category of interest (e.g., cooking). The patron views and signs up for an upcoming library event related to the category, such as, a cooking class.

In a preferred embodiment, the present invention combines the following three assets: (1) the library patrons' unique use of the library; (2) monitoring of assets borrowed (e.g., checked-out, noncirculating lending) or reserved by the library patrons; and (3) linking each library patron's interests into a syndicated network to advertisers. Thus, the goods or services of the advertisers that the individual library patron would have an interest in are provided to the patron only based on patron inquiry, not the advertisers' queries. In other words, the information about an advertiser's goods or services is patron-requested, not advertiser-requested.

One of the key features of the present invention is the mapping of the library's assets (e.g., books, periodicals, videotapes, DVDs, artifacts, CDs, computers and associated devices, audio video equipment, publication, original works, archives, materials, conference rooms, etc.) into unique broad mapping categories (e.g., family, young adult, small business, personal financing planning, pet care, technology, health care, home improvement, hobbies, fitness). In addition to the broad mapping categories discussed above, there are also cultural, local, community events and local programming. These categories can be broken into a limitless number of subcategories as is readily understood by a skilled artisan.

The following is an exemplary list of the categories and the corresponding subcategories that are used in the present invention 20. However, it should be understood that this list is provided by way of example only and that it is within the broadest scope of the present invention to include more or less categories and subcategories:

1. Family
   Entertainment; Childcare; Parenting; Summer Reading Program; Weddings
2. Young Adult
   Activities; Community; Entertainment; Fashion; Money; Sports; School & Education
3. Small Business
   Business Planning; Investment & Finances; Marketing; Tools & Supplies; Applied Technology
4. Smart Money
   Banking; Retirement Planning; Investing
5. Personal Technology
   Personal Computing; Communicating; Entertainment; Consumer Electronics
6. Health Care
   Care Giving & Family Health; Consumer Products
7. Home Improvement
   Planning Improvements
8. Pet Care
   no sub category
9. Hobbies
   Arts & Crafts; Cooking; Photography; Plants & Gardening
10. Fitness & Wellness
    Nutrition & Diet
11. Cultural Offerings
    Music; Film
12. Local Offering
    Local
13. Fiction
    Romance One of the important points of distinction from existing "recommendation systems", e.g., Amazon or Netflix, is the use of a matching trigger technology. In the present invention, when a patron checks out a library asset, the system checks for a match between the asset's item identifier and an assigned category number. Preferably this matching occurs every time a patron uses a borrowed asset from the library. This "association" of the library assets' identifiers and category numbers is provided in an output file in the AES category database 24. Table 1 depicts a typical output file content:

TABLE 1

| Item identifier, e.g., barcode | Library of Congress number, call number, Dewey Decimal number, etc. | Category number |
| --- | --- | --- |

The output file comprises basically three fields: an item identifier, Library of Congress number (or call number or Dewey Decimal number, etc.), and the category number (i.e., one of the thirteen, at present, category numbers discussed previously). The item identifier is an identification code, such as a barcode, that is provided with the library asset when acquired by the library, although it is not limited to barcodes. The identifier in itself does not contain standardized useful information about the material that it is associated. It cannot be used to directly inform about the content it is associated with. It is simply a pointer to information stored about the item in the library database. The Library of Congress number, call number or Dewey Decimal number is another more standardized identifier of the asset.

Applicant has previously generated an assignment of Library of Congress subject headings (LCSH) to the present invention's category numbers. For example, for assets that are categorized under the LSCH of "family relationships", "social institutions" and "domestic relations", a category 001 Family in the present invention has been assigned thereto.

Figure 60:
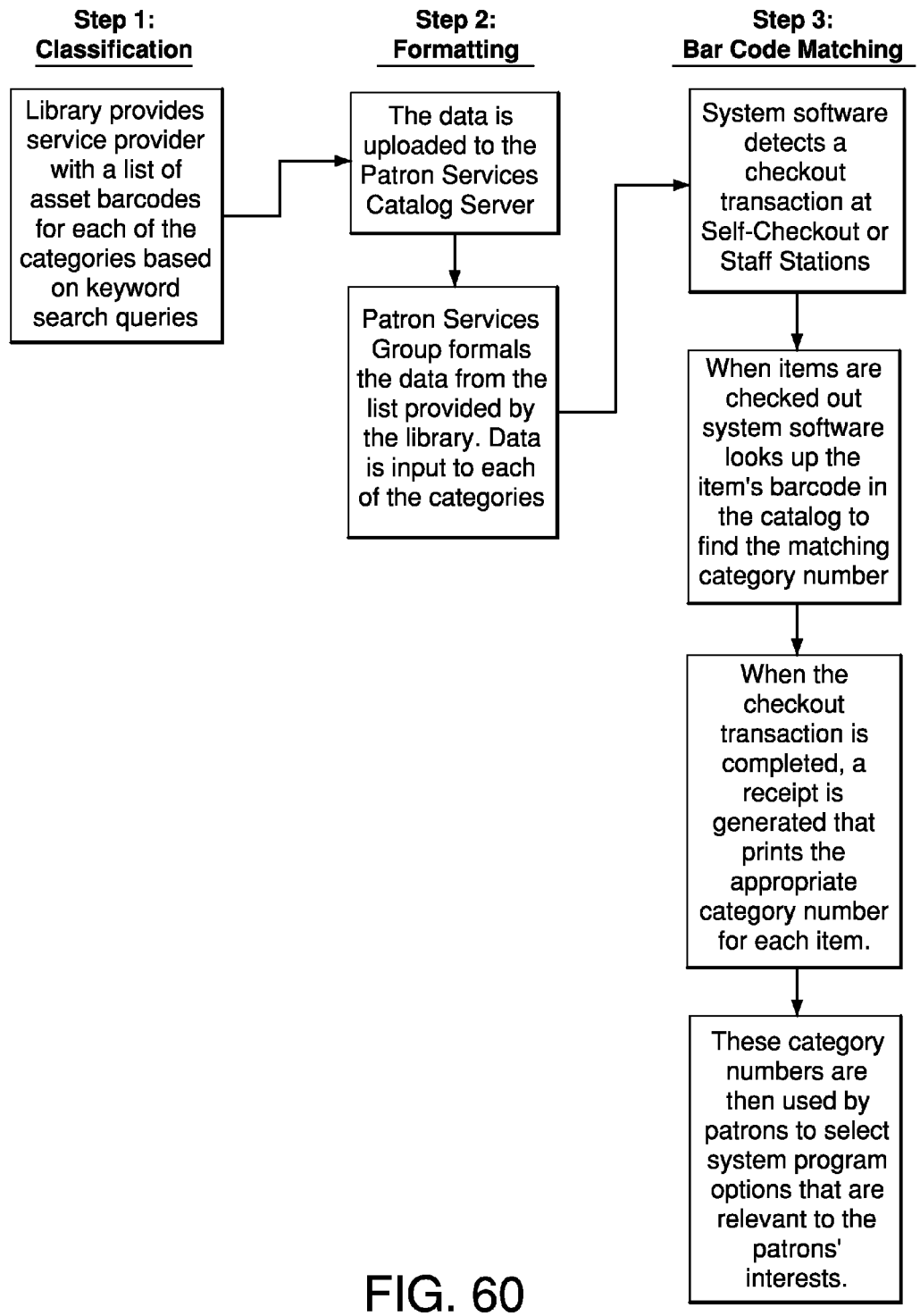
FIG. 60 is the item identifier (e.g., barcode) transaction process.

The process of organizing each library's data is shown in FIG. 60. Step 1: A report or database query is run on the library circulation system that retrieves the items in the library collection and provides the AES Program with data organized by the program's categories. Step 2: This information is stored in the Category Rewards database, as the output file, and the database keeps a relationship between the item identifier and the category the item belongs to. The organization of the information in the database is designed to facilitate the determination of a category that is associated with an item during the transactional process (see Step 3) or a description of a relevant reward, or actual content and to deliver that information in real-time to a patron.

Furthermore, to facilitate the library's own LMS database 2, the Marc record for each library asset stored therein can be updated to include the category in the Marc record. The Marc record is the record stored in library circulation database 2 that maintains information about physical items held in the library collection.

Step 3: Once the output file is created, matching is based off the library assigned item identifier (barcode ID). As mentioned previously, this is not a universal ID, but specific to the library. It is not a UPC code, an ISBN number or other Nationally Standardized code for information about a product. Many times the material identifier is not even compliant to a national standard barcode specification for library materials. This has several implications:

the process is specific to library databases and the way that those databases store information and enable access to information;

the relationship between the program's categories and the library collection are custom for each library. The library can control what items go to what categories based on the Library of Congress subject headings used to create reports from queries or report searches or by controlling category assignment through the Marc record option described above;

the trigger matching technology is incorporated on library transactional equipment Staff Workstations and Self Service Stations, which have different interfaces from retail equipment and infrastructure;

the deliverable to the patron at the transaction point, which can be a category number (e.g., patron goes to website, logs in, and enters category number to see various relevant reward offers), a reward (coupon or discount), an interactive display of relevant rewards with the options to select desired rewards at the point of transaction;

untargeted invitation to visit the website, for example, for a user that uses a library computer to prepare or modify a computer application, such as Microsoft Word® the identifier is not a personal identifier, it is an identifier related to material assets;

the identifier does not include information that specifically identifies what the asset is; and the identifier is not required to be a standard identifier;

As a result:

This invention is novel in the library space. There is no equivalent in the library market place. It provides deliverables that are different than other reward programs and relevant to both libraries and library patrons, which include expertise, educational content, programs, promotional values, and events relevant to the patron's interest.

The invention is based on borrowed assets, not purchased assets.

The invention provides a relevant need and interest specific category ID and/or description of the relevant category and/or description of relevant rewards and recruits patrons to join or opt into the program based on the material or items processed during a transaction and in real time.

The invention does not use a person's name or method of payment to generate rewards or offers.

It should be understood that the terms "reserve" or "borrow" as used in the description of the AES is meant to cover a range of activities with regard to library assets, such as, but not limited to: holding a library asset for a patron to checkout a later time; reserving library conference rooms, audiovisual or computer equipment, or furniture, non-circulating lending assets (e.g., original manuscripts, artifacts, works of art, attendance at a library event, etc.) and resources. Thus, the mere act of library staff making any type of library asset available for a patron to view, investigate, handle, etc., and/or the fact that the library asset does not have to leave the library premises, is covered by the terms "reserve" or "borrow."

While not being limited to a particular theory, the system and method for affinity-based deliverables include (1) relevant expertise information; (2) relevant on-site events (e.g., at the library) and (3) relevant rewards (e.g., coupons, rebates, etc.) based on the patron's demonstrated interests. In other words, the deliverables include information, expertise, promotions, advertising, lecture services, speaker bureau services, RSVP services, etc. . . . all sourced from outside the library sponsors (e.g., advertisers), contracted by the service provider or third party to the library itself. The term "affinity" as used in this specification means any information or thing having a likeness based on relationship or causal connection; inherent likeness or agreement; close resemblance or connection.

The preferred embodiments of the AES are used in any public, academic, or special library that has a Library Management System (LMS). A library management system may also be referred to as an Automated Circulation System, an Integrated Library System or any system for managing a library's assets. The LMS includes a database that manages the library's collection and contains MARC formatted records for the managed materials held in the library's collection. The LMS may have one, some, or all of the following components that the invention interfaces with to provide opt-in patrons an invitation to relevant information that can be retrieved from a website hosted by the service provider. The LMS components that the invention interfaces with, to deliver program information to the patron include but are not limited to LMS Staff Workstations, Self Check Stations, Self Service Stations, Library Catalog Information Computers, Public Access PC's, and Online Public Access PCs.

AES deliverables are only available to patrons who opt into the program. Therefore, patrons are always being recruited to join the program. The newsletter, website, and library are all involved in the recruitment of the libraries patrons to the AES program. A patron must register on the website to join the program. After registering, the patron logs in on the "log in" page of the website and provides any category number that was received during their transaction at the library. The patron is brought to a category of the program that has relevant rewards to the patron interest, which is based on the category number entered while logging in. As mentioned earlier, the deliverables to the patron include relevant information, expertise, educational content, programs, promotional values, and events.

Figure 2:
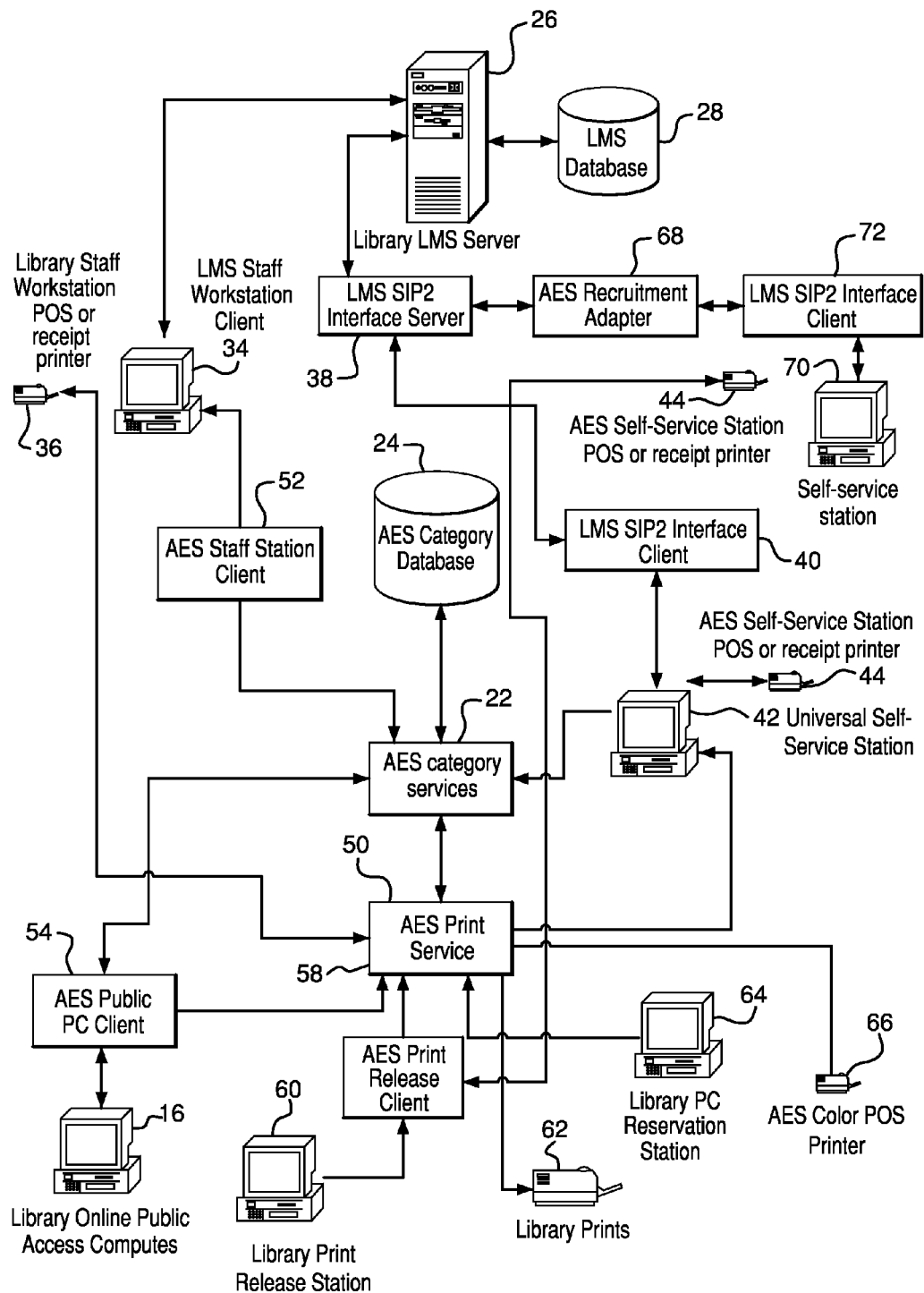
FIG. 2 is a network diagram of the AES.

An exemplary system of the present invention is depicted in FIG. 1 and FIG. 2. The system provides relevant library rewards to their patrons based on the patron transaction in real time. Rewards are relevant, because the reward deliverables are generated by a matching trigger methodology. The matching trigger methodology process includes: retrieving the scanned barcode item ID from a library material being processed during a transaction, looking up the item ID in the Category Database, and returning an association category number assigned to the item ID stored in the database.

The Patron Newsletter Printing Station provides the material transaction information, along with a category number matched with the material on a paper or email newsletter, also referred to as a "confirmation item." The category number is the patron's key to rewards that are relevant to the patron's interest. Library rewards are available to the patron on the AES Program Server. This server maintains the service provider's hosted website that patrons go to for their rewards. It should be understood that the structural members shown in the figures may also be represented by a plurality of each of the respective members as needed. For example, a server also refers to a plurality of servers that provide the services associated with the respective single server shown in the figures.

With reference to the confirmation item (also referred to as the newsletter or printed/email receipt) this acts as a recruitment vehicle. One of the key aspects of the newsletter is to recruit patrons to an "opt-in" environment; in other words, to motivate each patron to register at the website portion of the present invention. The advantages and features of the present invention are not available to the general public. They are only available to those library patrons who register at the website.

FIG. 1 depicts an exemplary network connection diagram showing the main component connections of the AES over the internet 10. The program web server 12 and program database 14 comprise a service provider hosted site that all participating libraries and library patrons access over the internet 10. Preferably, a plurality of library online public access computers 16 sit on the library network with access to the internet 10. The Library Online Public Access Computers (LOPAC) 16, that are part of the AES system, have a web link or portal that connects to the program web server 12. The server is accessed from a web browser on the LOPAC 16. Selected reward offers with print components are downloaded and printed on LOPAC printer(s) 18. The LOPAC printer(s) 18, as part of the library configuration, may be part of a document print management system described in greater detail below. Internet connected computers 20 (having associated printers 20A) that do not belong to the library network may access the program web server 12 by logging into the AES Website portal from the library's website home page. The AES category services 22 and the AES category database 24 reside on a computer that belongs to the AES network domain and have access to the internet where communication to the LMS server 26 requires internet access. The LMS server 26 and LMS database 28 reside on the library network and preferably connects to the internet as part of a WAN when the server is remotely located to the AES participating library or is configured as such by library IT. The AES also includes a LMS Staff Workstation client 34, a Library Staff Workstation POS or receipt printer 36, a Universal Self-Service Station 42, and an AES Self-Service Station POS or receipt printer 44, as will discussed in detail below.

FIG. 2 depicts a system block diagram in accordance with the preferred embodiments. As can be seen in FIG. 2, the exemplary AES includes an LMS Server 26, a LMS Database 28, the LMS Staff Workstation client 34, the Library Staff Workstation POS or receipt printer 36, an LMS Standard Interchange Protocol V2 (SIP2) server 38, an LMS SIP2 Client 40, the Universal Self-Service Station 42, the AES Self-Service Station POS or receipt printer 44, an AES category services 22, an AES category database 24, an AES Print Service 50, an AES Staff Station client 52, an AES Public PC Client 54, library online public access computers 16, an AES Print Release client 58, a Library Print Release Station 60, Library Printers 62, Library PC Reservation Station 64, and an AES 4-color POS printer 66.

The LMS Server 26 is the computer and software that manages the materials held in the library's collection. Its primary purpose is for material or asset management, administration, and status updates of the item records stored in the LMS Database 28. The LMS staff workstation 34 is preferably a PC computer and LMS client software, which is primarily used by library staff members to manage material or asset flow transactions, such as checkout and check-in.

The AES Staff Station Client (SSC) 52 is a software client that runs on the library LMS staff workstation client 34. The SSC 52 monitors LMS staff workstation transactions, determines the start and finish of transactions, parses information provided during a transaction that is required for the AES to generate a transactional matching trigger, builds a newsletter, and delivers the newsletter to a printer associated with the appropriate LMS Staff Workstation 34. The newsletter can be printed material used to recruit the patron to the AES Program, that provides a receipt for the patron's transaction and provides AES category numbers or offers for items processed in the transaction.

The AES Staff Station Client (SSC) 52 has two preferred operational methods to facilitate the delivery of a newsletter.

For example, in a first exemplary operational method, the AES Staff Station Client (SSX) 42 monitors barcode input to the LMS Staff Workstation (LSW) from a serial port, USB port, or keyboard wedge port. In particular, the SSC 52 monitors barcode input (e.g., patron IDs, item IDs) and the LMS staff workstation application to determine the start of a patron transaction, to locate item IDs required for matching category numbers, and to determine the end of a transaction. Item ID barcodes are forwarded to the AES Category Services (AESCS) 22, which determines if the item matches a patron relevancy category stored in the AES Category Database (AESDB) 24. If the item matches a category, then the category ID associated with the matched category is retrieved and sent in a print message to the AES Print Services (AESPS) 50 from the AESCS 22 along with the item ID. The AESPS 50 combines the information from the SSC and SSX and releases a print job containing items processed, category IDs and/or relevant programming content, and a newsletter is printed from the AES Printer 66 associated with the LSW 34 when the SSC 52 releases the standard receipt to the LSW receipt printer. In this example, the transaction receipt is printed by the LMS Staff Workstation printer 36 and the AES newsletter is printed on the AES printer 66 associated with the Library Staff Workstation.

In a second exemplary operational method, the AES Staff Station Client (SSC) 52 directly receives the print stream from the LMS Staff Workstation client application. In this embodiment, the LMS Staff Workstation (LSW) 34 prints to a generic Microsoft Windows text library printer 62 via a port that has been assigned to the SSC 52. The SSC 52 parses the print stream into data elements and creates structured messages that are used to pass the transactional information to the AES Category Service (AESCS) 22 over a proprietary Application Program Interface (API). The AESCS 22 determines if the item matches a patron relevancy category stored in the AES Category Database (AESDB) 24. If a category is matched, then the AESCS retrieves and sends the category ID in a print message to the AES Print Services (AESPS) 50 along with the item ID. The AESPS combines the information and releases a print job containing items processed, category Ds and/or relevant programming content, and the AES Printer (AESP) 66 associated with the LSW 34 prints a newsletter. It should be noted that the secondary exemplary method is different from the first exemplary method described above, as the start and end of the transaction do not need to be determined. Since this is the print stream from the LMS Staff Station, it includes the transaction detail from start to finish. Here, in the second exemplary method, only one item bearing printed indicia is printed from the AES Printer 66. The printed item includes the newsletter for patron recruitment, the transaction receipt, and the category information and correspondence information of the Library. It should be noted that while AES newsletter and a transaction receipt are preferably printed together as one item, the invention is not limited thereto, and separate printouts of the newsletter and receipt are within the scope of the invention.

The Universal Self-Service Station (USS) 42 is a self-service center for patron conducted transactions. The USS 42 interfaces with the LMS 26 via the Standard Interchange Protocol V2 (SIP2) server 38 and client 40 interface, the Patron Manager 104 (FIG. 3), the AESCS 22, and the AESPS 50 to create customized AES confirmation items (e.g., receipts, newsletter), as will be described in greater detail below and shown by example in FIG. 3.

The Library Online Public Access PCs (LOPAC) 16 provides AES program services to patrons upon logging-on to a homepage of the LOPAC though the AES Public PC client 54. The client 54 is launched when logging-on to the LOPAC 16. The AES Program Services are accessed from the LOPAC's homepage. For example, the home page may include a link to program details, a link to the AES Web Server's homepage, an option to send a program newsletter and/or category number to an email address, and an option to print a program brochure and/or category number to a printer.

The AES Public PC client 54 temporarily monitors sites visited during a session and evaluates site content to establish relevant program content and generates Category IDs for relevant content (e.g., from content or keywords used in the patron's search). Category IDs are provided to the patron when the email or print options are selected from the home page. The web link automatically directs the patron to relevant rewards categories of the AES program. User ID from logon, Library ID, Station Type ID, and Category IDs are logged to the patron's profile maintained on the AESDB 24. Printed receipts are process through the AESCS 22 and the AESPS 50.

The communication protocol to the LMS for third party devices is the standard library protocol known as the Standard Interchange Protocol V2 SIP2), developed by 3M. This protocol is typically used for communication between a library management system (LMS) and Self-Service Stations or Self-Checkout Stations.

The AES Patron Recruitment Adapter (PRA) 68 is an AES service that provides an interface to connect any self-service station 70 SIP client (e.g., self check device, self-service device or other device) that communicates using the SIP2 protocol. The PRA 68 can be inserted between any SIP enabled client 72 and the LMS SIP server 38. The PRA 68 monitors SIP messages between the SIP client 72 and the SIP server connections 38. Patron and item identifiers are monitored for the purpose of triggering relevancy categories in the AESDB 24 and passing relevant Categories to the AES print service 50 to create patron receipts and newsletters. The details of the PRA 68 configuration will be discussed in detail later with regard to FIGS. 3A-3D.

Referring to FIGS. 1 and 2, the program web server 12 provides services to library patrons who decide to opt-into the program. The program web server 12 delivers relevant programming content to opt-in patrons based on but not limited to specific materials or services accessed at the library or by a profile of interests that the opt in patron creates. Category content is provided by the library, local sponsors and national sponsors of the program. It should be noted that no information is stored by the system. The category ID(s), the library ID(s), the transaction location ID, and the Transaction Type ID are stored locally to the library on the AESDB. The library AES category database 24 synchronizes with the program database 14 to create reports for the program sponsors and AES program administrators. Reports are parsed to provide the number of sponsor reward offers visited, the number of sponsor rewards selected and downloaded, the name of library's' that the reward visits and selections were from, the number of reward hits and reward selection from each service offering rewards specific to each library, and the date/time for each hit and reward selection. No personal identifying information is stored. The content type delivered to the patron is based on program categories established on the system's database and accessed through the hosted website. Program categories of interest are created and modifiable based on the specific profiles for the participating library and the cross-section of sponsors. The specific delivery of content that the patron is directed to access on the website is established from their demonstrated interests as determined from the library materials accessed or borrowed by the patron. The system's web service has a management component that the host uses to maintain national, local, and library programming. The system provides the patron rewards that are in the form of expertise, educational content, programs, promotional values, and events that are relevant to the patron's demonstrated interest.

Referring to FIG. 2, the Library Print Release Station 60 preferably resides near library printers 62 and is used for releasing print jobs that patrons request from the library online public access computers 16. The print release station 60 primarily provides the patron a final opportunity to select the print jobs to print and review costs of the print jobs. The library print release station 60 also accepts payment from the patron. The print release client 58 monitors the number and location of newsletters that are printed. The print release client 58 stores the newsletter template, which when selected to be printed from the library online public access computer 16 is printed as part of a print job. The client 58 print release logs the number of printed newsletters in the AESDB 24.

The library PC Reservation Station 64 is a library computer that is dedicated to the reservation of the library online public access computers 16. When a reservation is made, a receipt may optionally be selected to print. The receipt normally includes the reservation details. Preferably an AES newsletter is added to the reservation print, and is printed by the AES Printer 66. The newsletter template is stored in the AESDB 24 and called from the AESCS 22 when the print job is initiated from the Library PC Reservation Station 64. The AESPS 50 combines the reservation information with the newsletter print and merges the two onto one receipt.

Figure 3:
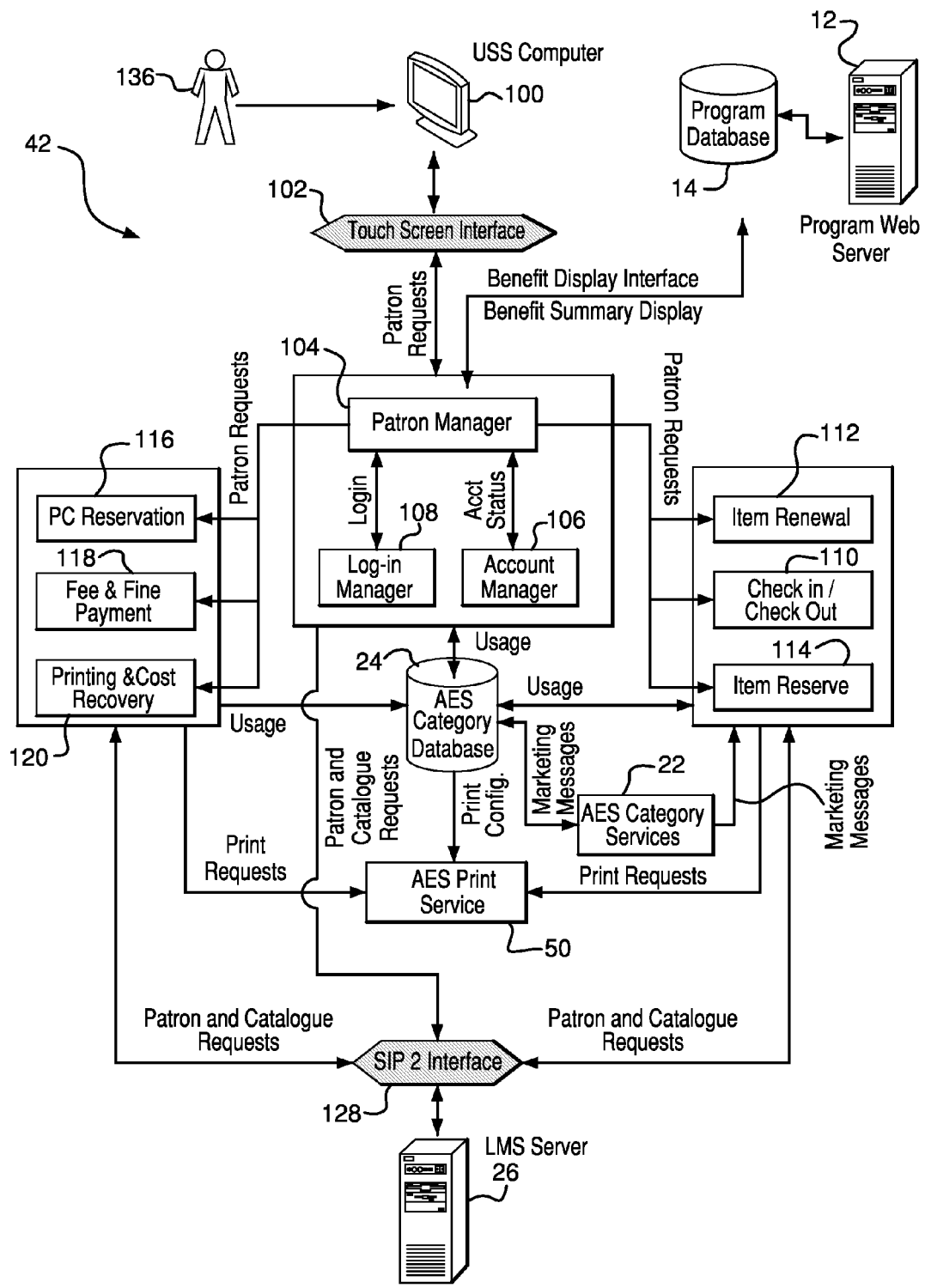
FIG. 3 is a block diagram of the AES universal self-service station (USS) of the present invention.

FIG. 3 depicts a system configuration with a Universal Self-Service Station 42, which can be referred to as the USS. The USS 42 includes hardware and services of a USS computer 100 with a touch screen interface 102, a Patron manager 104, an account manager 106, a log-in manager 108, check-in/check-out services 110, an item renewal service 112, an item reserve service 114, a PC reservation service 116, a fee & fine payment service 118, document printing & cost recovery services 120, the AES category database 24, the AES category services 22, an AES print services 50, a SIP 2 interface 128, a LMS server 26, a program database 14, and a program web server 12.

The preferred embodiments' integrated approach to self-service enables the AES receipt and newsletter content to be delivered for numerous patron requested transaction types in a single session, such as Checkout 110, Check-in 110, Item renewal 112, Item Reserve 114 Library Fee & Fine payment 118, Account Status via the account manager 106, Reserve PC 116, and Document Printing 120. The login manager 108 enables the patron 136 to authenticate once during a session. During a session the patron can select any one, some, or all possible transaction types identified above. Optionally the USS 142 can be configured to display AES benefits on the USS touch screen interface 102 and display an interactive detailed benefit summary of relevant rewards at the end of the transaction session. The patron 136 can interactively select rewards from the benefit summary for delivery to the patrons email address. The patron must be a member of the AES Program to select benefits, and may join the program from the USS if the patron decides to opt in to the program.

As a first exemplary integration of the preferred system, for self-service checkout, a patron 136 conducts the self-service checkout transaction using the touch screen interface 102 to process user selections from the graphical user interface, which is viewed from the USS monitor 100. In a first step the patron selects a language. While not being limited to any particular number of languages, in this example, up to four languages can be selected. There is a default language that the application is set to. If the patron uses the default language, then they do not need to select the language and they may choose the log on option. After the language is selected the patron logs on to the USS 42. The logon process is managed by the Logon Manager 108. The logon Manager 108 enables the patron to logon using a library card or username and a password. Preferably, at least barcode, magnetic stripe, RFID, and Weigand cards are supported in this example, and the invention is not limited thereto.

Figure 5:
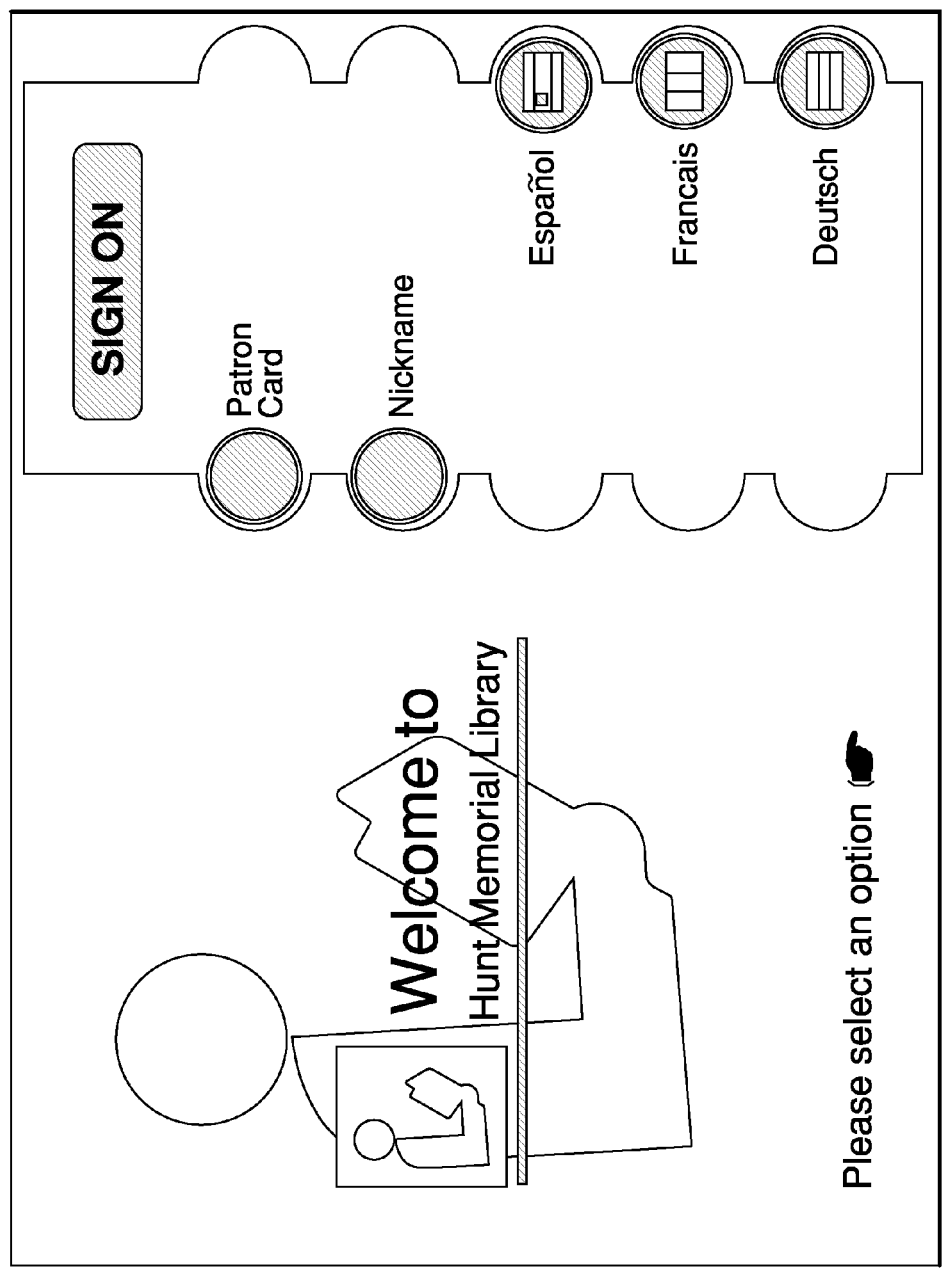
FIG. 5 is a universal self-service station (USS) sign-on screen.
Figure 6:
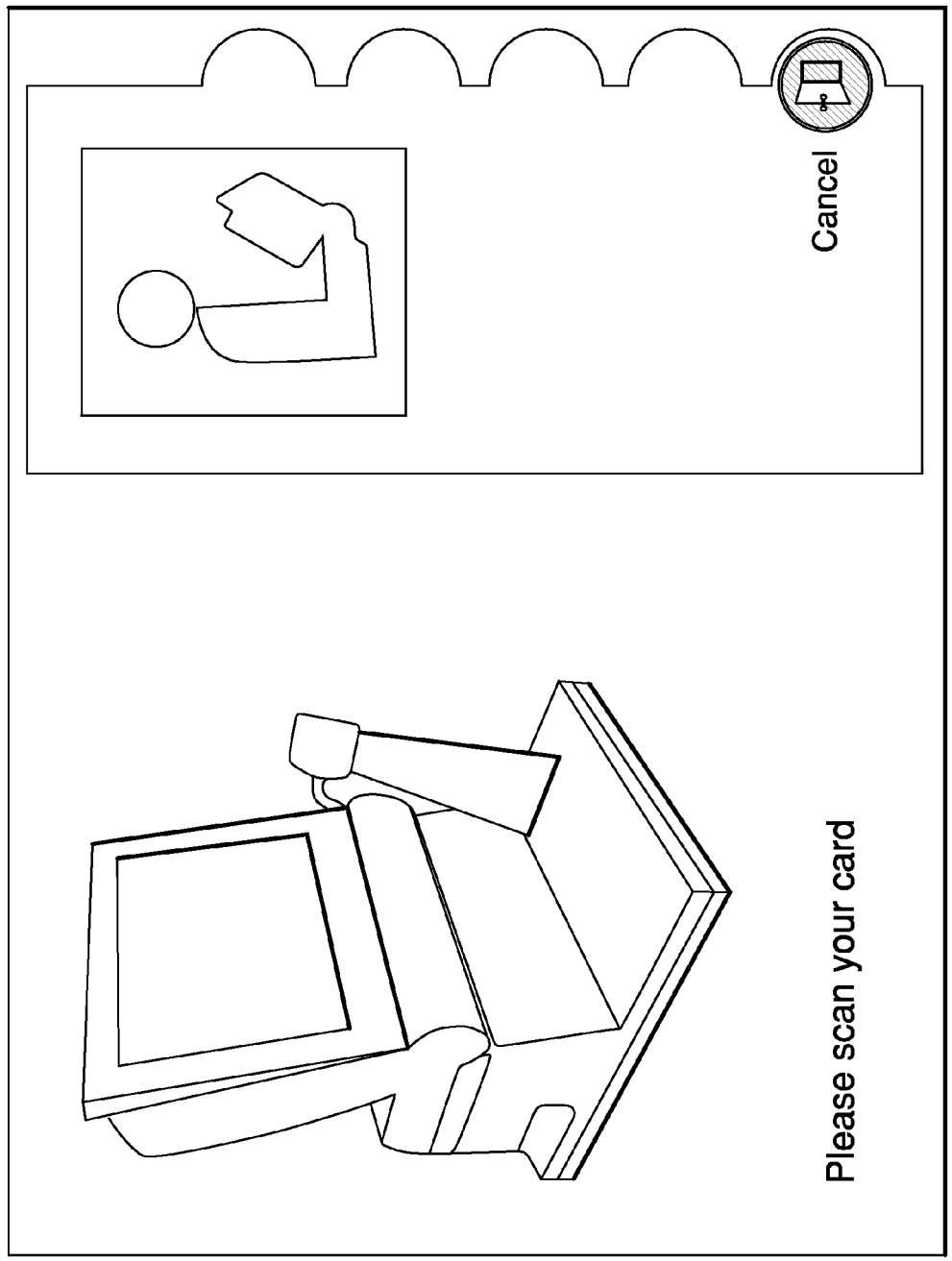
FIG. 6 is a USS patron card scan screen.
Figure 7:
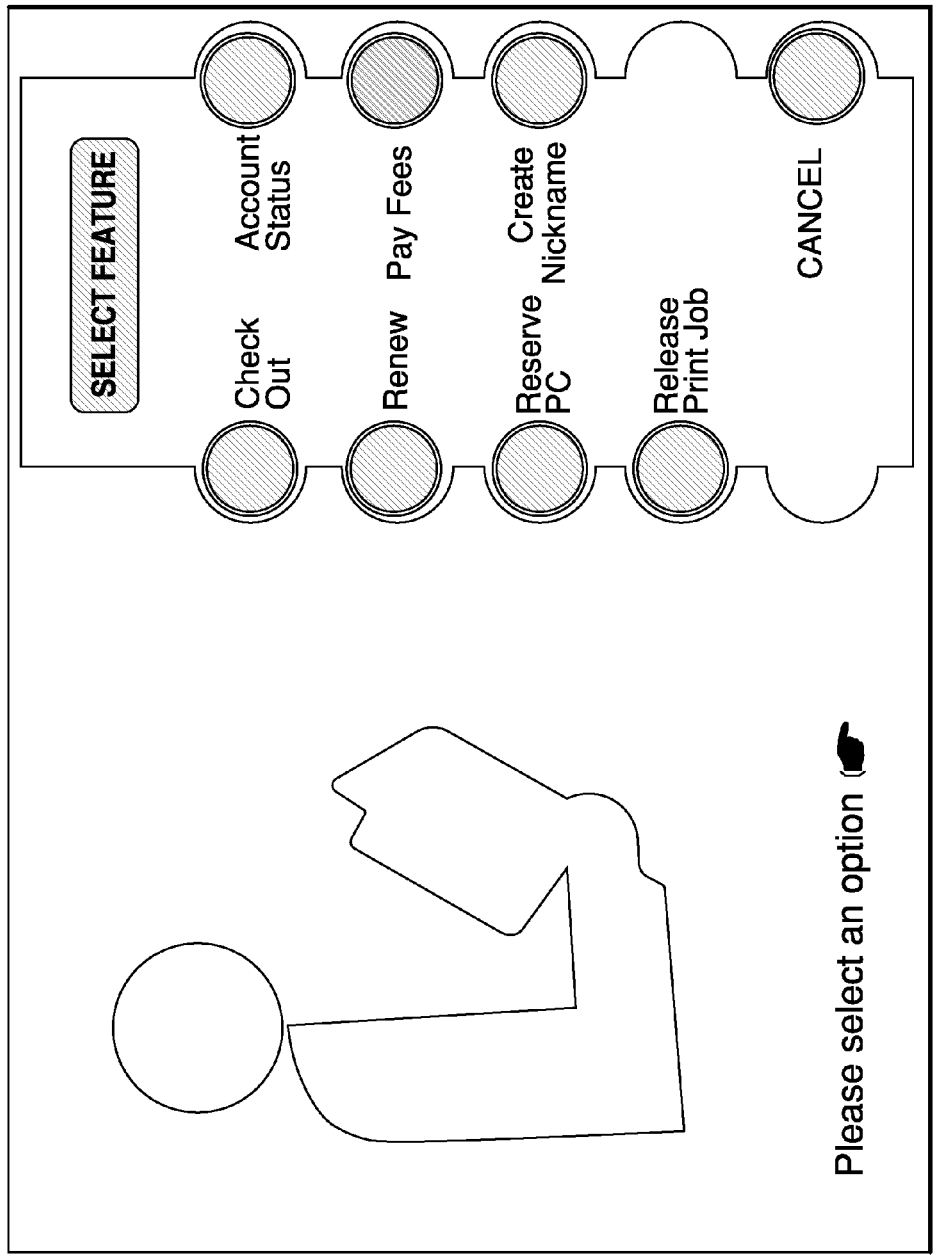
FIG. 7 is a USS feature select screen.

An exemplary user interface for language selection and logging on is shown in FIG. 5. Once the patron is authenticated, the patron or user is presented with options for the available various transaction types. FIG. 6 depicts an exemplary user interface for scanning a patron card for authentication, and FIG. 7 depicts an exemplary interface for selection of transaction types. The patron selects the checkout option and is presented with instructions for checking out items, as can best be seen in FIG. 8. The patron checks out the asset(s) by scanning the item ID of the asset(s). While not being limited to a particular format, the USS 42 supports scanning item ID's barcodes and RFID tags. The item ID is passed from the checkout service 110 to the LMS server 26 as a checkout request complying with the SIP2 protocol through the SIP2 Interface 128. The LMS server 26 validates and processes the checkout request, then replies to the USS checkout service 110 with an updated checked out status through the SIP 2 interface 128.

Figure 8:
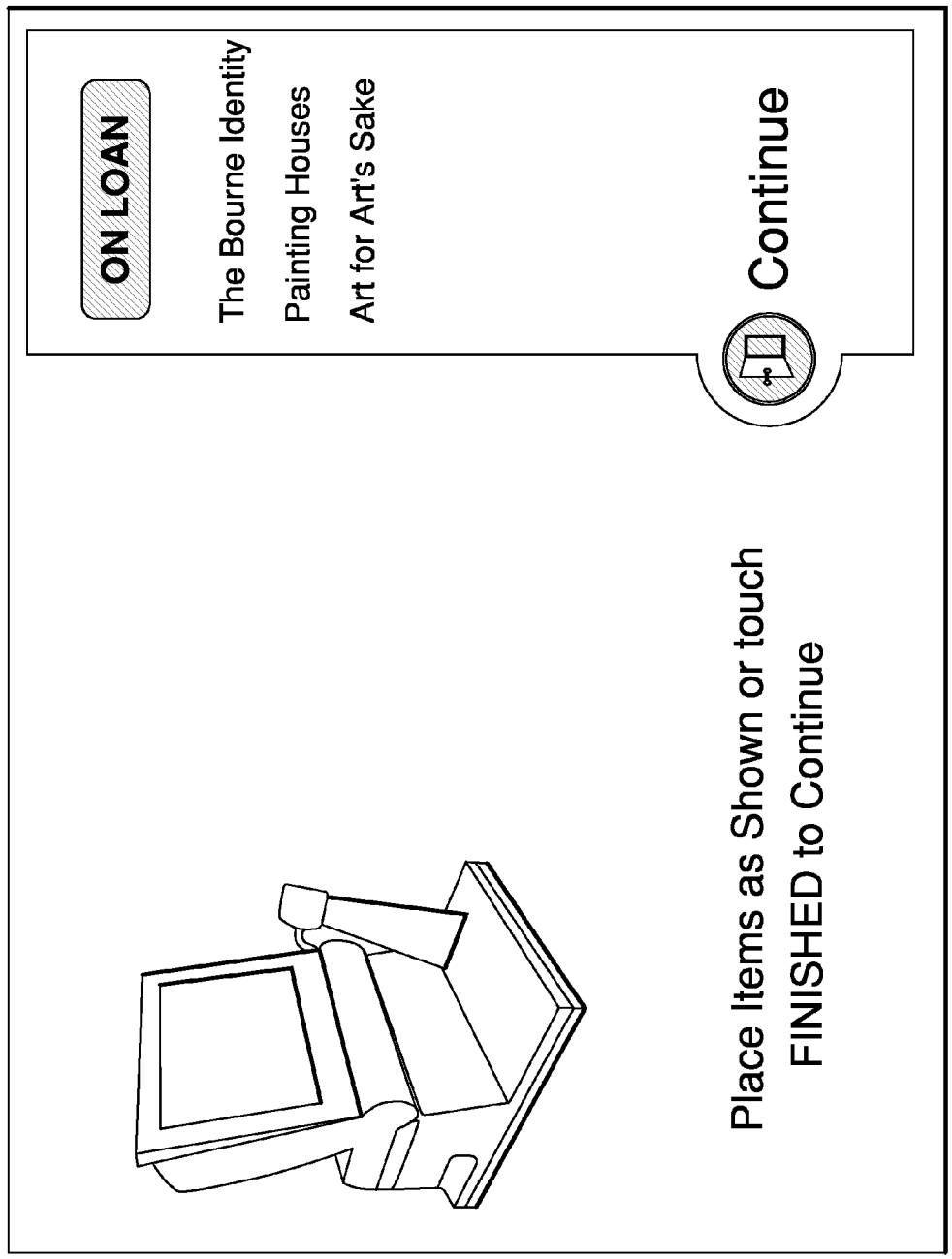
FIG. 8 is a USS item scan screen.

Once the updated status is received by the USS checkout service 110, the service deactivates security maintained on the item and displays the name of the checked out item on the touch screen interface 102, as shown, for example, in FIG. 8. The USS 42 preferably supports processing at least EM, RF, and RFID security technologies. If the AES category services 22 is notified of the checkout. The item ID, which is included in the notification message passed to the AES category services 22 from the Checkout Service 110, is used to determine if the material belongs to a category maintained in the AES category database 24. Each Category in the AES category database 24 holds groups of item identifiers that are from material or asset holdings in the library that match criteria for the category. As such, each category defines a set of materials or assets (e.g., items) items from the library collection that are relevant to programming content that is available from the AES web site at the program web server 12 (FIG. 1). Categories in the AES category database 24 hold library item identifiers for the category on the website that holds relevant content for the materials associated with those item IDs. The AES category database 24 can hold any defined number of categories within limits for capacity of the database. Every category in the AES category database 24 has a Category Number assigned to it. When an item ID from the checkout process matches an item ID from a category, the category is triggered for that checked out item. A triggered category is a category that is considered to be relevant to the patron and a message with the category number and associated item ID is sent to the USS checkout service 110.

The checkout service 110 collects all the transaction messages for the checkout session and forwards them to the AES print service 50 when the checkout session is complete. The checkout session is complete when the patron selects the "Continue" button from the touch screen interface 102 item checkout screen (FIG. 8) or a configurable timeout value is exceeded. The AES print service 50 builds the confirmation item (e.g. newsletter content of combined newsletter and receipt) and sends it to the Rewards Program printer 44 (FIG. 2), where it is printed.

A second exemplary integration of the preferred system shows library rewards interactively delivered during checkout session. If the Patron Manager 104 is connected to the program database 14, then the USS 42 can interactively provide AES programming to opt in members of the program. The second exemplary integration is different than the first exemplary integration described above, as the second integration shows the integration of rewards interactively delivered during the patron checkout session. The USS 42 actively recruits membership by showing the patron relevant program offers based on the program's category matching trigger methodology. A patron can select offers from a list of relevant offers at the end of the checkout session. If a patron is interested in a reward and is not a member, then the patron is provided an opportunity to join the program through the USS interactive touch screen 102. Once the patron is a member, he/she may select the rewards of interest.

As in the first exemplary integration described above, the patron 136 conducts the self-service checkout transaction using the touch screen interface 102 to process user selections from the graphical user interface, which is viewed from the monitor of the computer 100. The patron logs on to the USS through the log on interface. The user interface for logging on with a library card is shown in FIGS. 5 and 6. First the patron card button is selected from the page shown in FIG. 5, then the library card is scanned as instructed in FIG. 6. Once the patron is authenticated, the user is presented with selections for the various transaction types available. The user interface for selecting transaction types is shown in FIG. 7. The user in this second exemplary integration selects the checkout option and is presented with instructions for checking out items as shown, for example, in FIG. 8. The user or patron checks out the item(s) by scanning the item ID on the material.

The item ID is passed from the checkout service 110 to the LMS server 26, as a checkout request defined by the SIP 2 protocol, through the SIP 2 Interface 128. The LMS Server 26 validates and processes the checkout request, and then replies to the USS checkout service 110 with an updated checked out status through the SIP 2 Interface 128. Once the updated status is received by the checkout service 110, the USS 42 deactivates security maintained on the item and displays the name of the checked out item on the user interface checkout screen (FIG. 8). The AES category services 22 is notified of the checkout.

Still referring to the second exemplary integration, the item ID, which is part of the notification message passed to the AES category services 22 from the Checkout Service 110, is used to determine if the material belongs to a category maintained in the AES category database 24. The USS category services database, when connected to the program database 14, downloads on a schedule basis: descriptions of the rewards, patron ID's and email addresses from opted in members that chose to provide such info, the location for rewards, and email addresses of reward administrators for event type rewards requiring registration. This is in addition to the description above of the AES category database 24 from the first exemplary integration.

Figure 9:
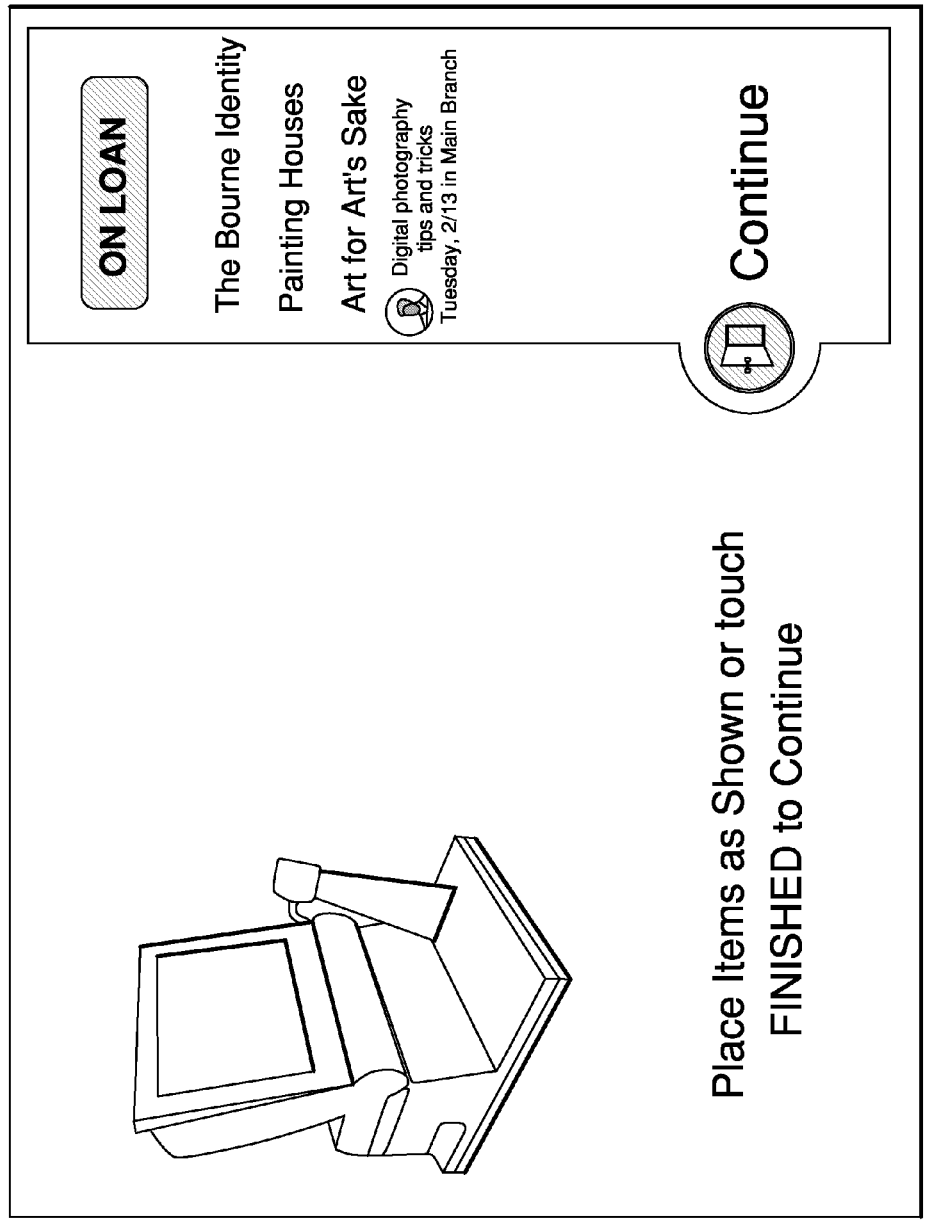
FIG. 9 is a USS scan screen with item benefit display.
Figure 10:
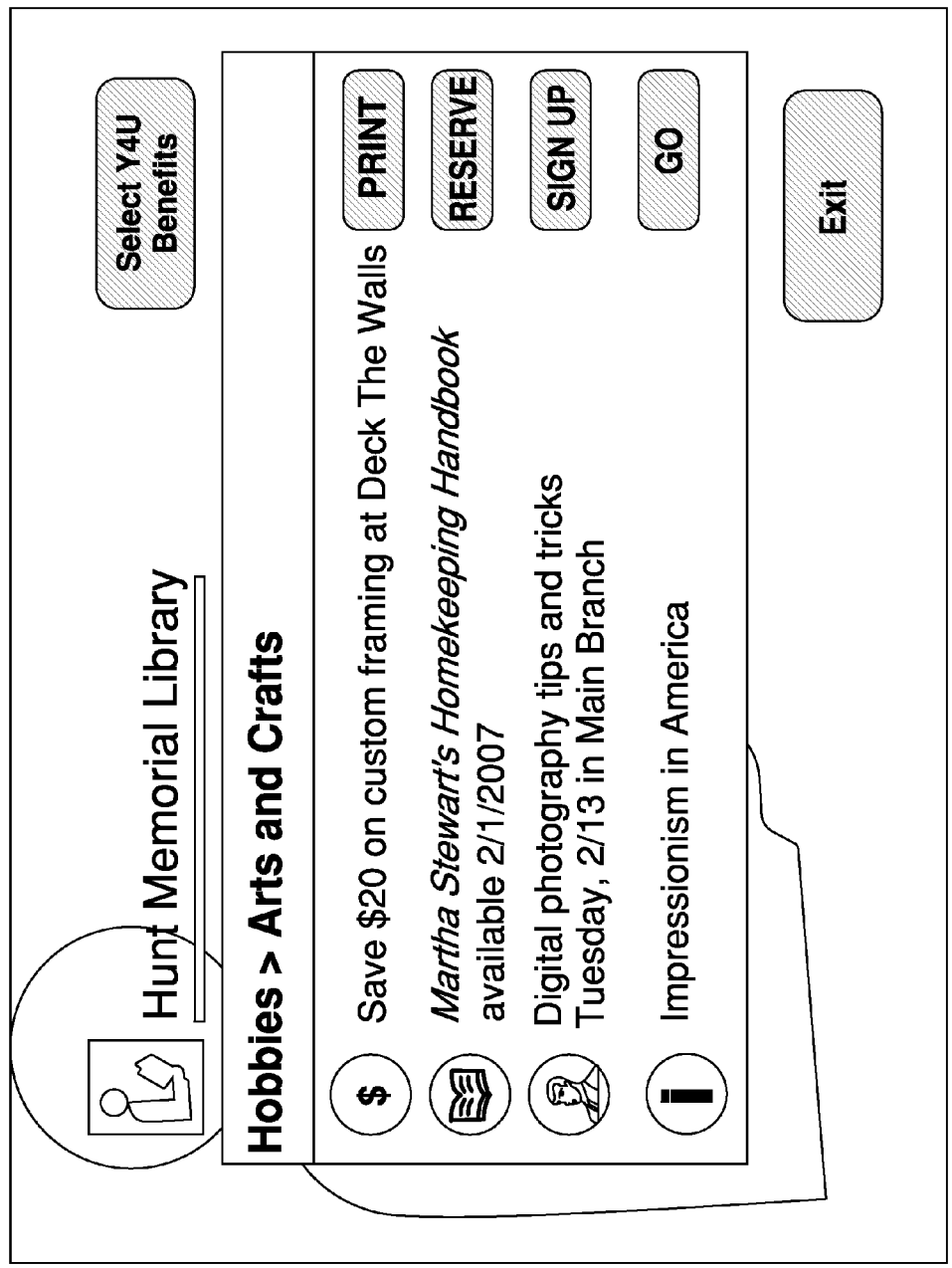
FIG. 10 is a USS detailed benefit summary screen.

When an item ID from the checkout process matches an item ID from a category, the category is said to be triggered for that checked out item. As discussed above, a triggered category is a category that is considered to be relevant to the patron, and a message with the category number, associated item ID, and reward description is sent to the USS checkout service 110. The checkout service now displays the item checked out by the patron along with the reward description on the user interface, for example, in FIG. 9. The checkout service 110 collects all the transaction messages for the checkout session and forwards them to the AES print service 50 when the checkout session is complete. The checkout session is complete when the patron selects the "Continue" button from the graphical user interface item checkout screen (FIG. 8 or 9) or a configurable timeout value is exceeded. The checkout service 110 passes control to the patron manager 104, which displays the Detailed Benefits Summary Screen to the patron as depicted in FIG. 10. The benefits summary screen displays a summary of rewards that were determined to be relevant to the patron from the transactional matching trigger methodology.

Figure 11:
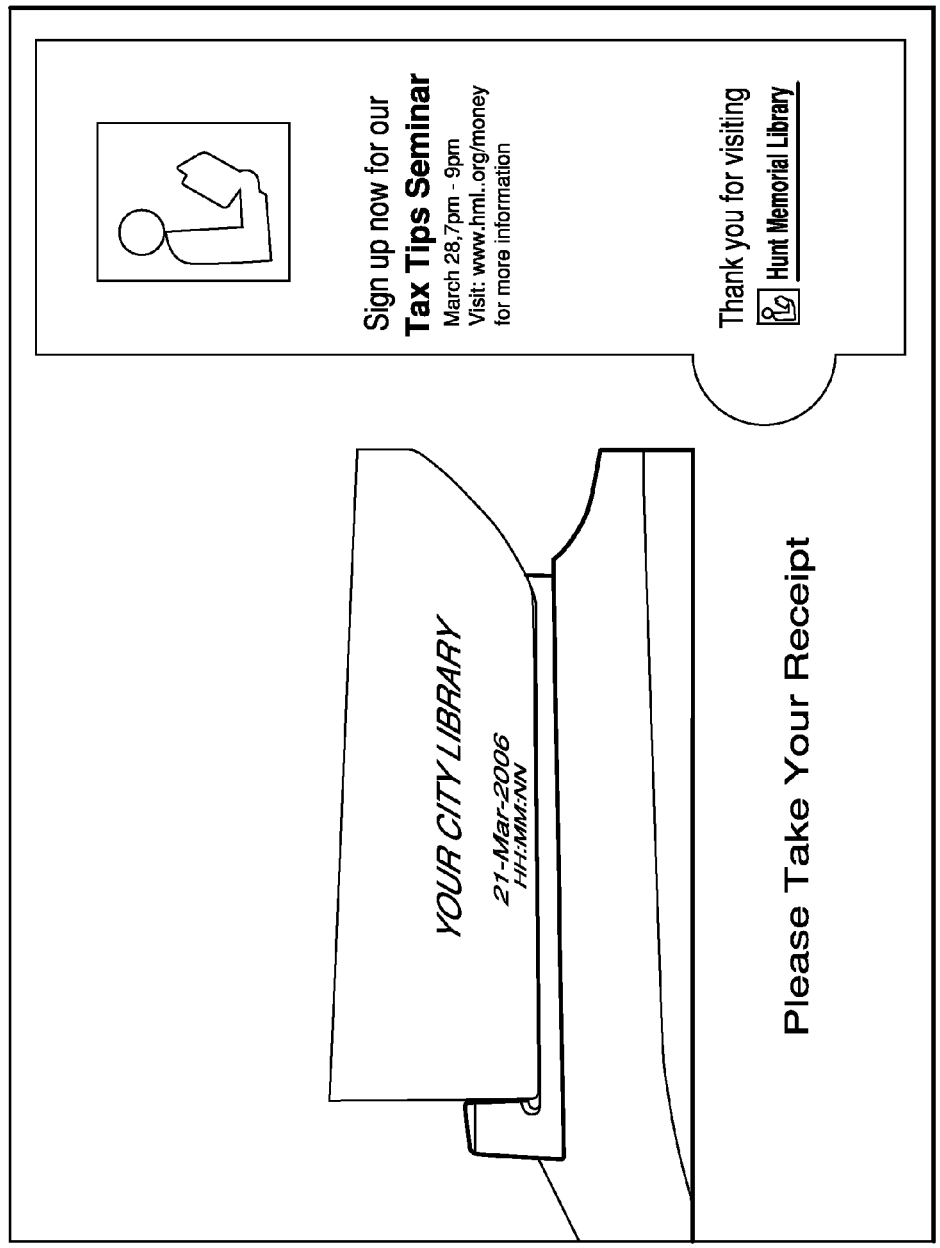
FIG. 11 is a USS print receipt screen.

A patron interested in accessing benefits may select the "Select Y4U Benefits" button, shown in FIG. 10. This button selection activates the reward selection buttons shown to the right of the reward summaries in FIG. 10. The patron can then select the reward benefits of interest. The "print" button on the discount benefit shown in FIG. 10 enables a printing of the discount coupon from the receipt printer or emails a link to the patron for a website where the discount coupons could be retrieved. The "reserve" button shown in FIG. 10 sends an email to the library administrator who is responsible for reserving the material for the patron and an email is sent to the patron confirming the request to reserve the material. Once the material is placed on hold, the patron is emailed a confirmation of reservation and a follow-up email is sent when the reserved material is available. When the "sign up" button shown in FIG. 10 is selected, an email is sent to the library administrator who is responsible for registering the patron for an event or program. An email is also sent to the patron confirming the request to sign up for the event of program. A registration confirmation email is sent once the patron is successfully registered for the event. Of course it is within the scope of this invention to fully automate the reservation process without the requirement for a staffed administrator. The "Go" button shown in FIG. 10 delivers an email to the patron with a link to relevant expert information or educational content that was selected by the patron. Once the patron has completed their selections, the patron should select the "exit"

button shown of FIG. 10 or a session timeout occurs and the patron manager 104 passes control back to the checkout service 110, which ends the patron session by showing a printing screen, as shown, for example, in FIG. 11, and then returns to the sign on screen (FIG. 5). The Rewards AES print service 50 builds the newsletter content at this time and sends it to the Rewards Program printer 44 (FIG. 1), where it is printed.

Figure 3A:
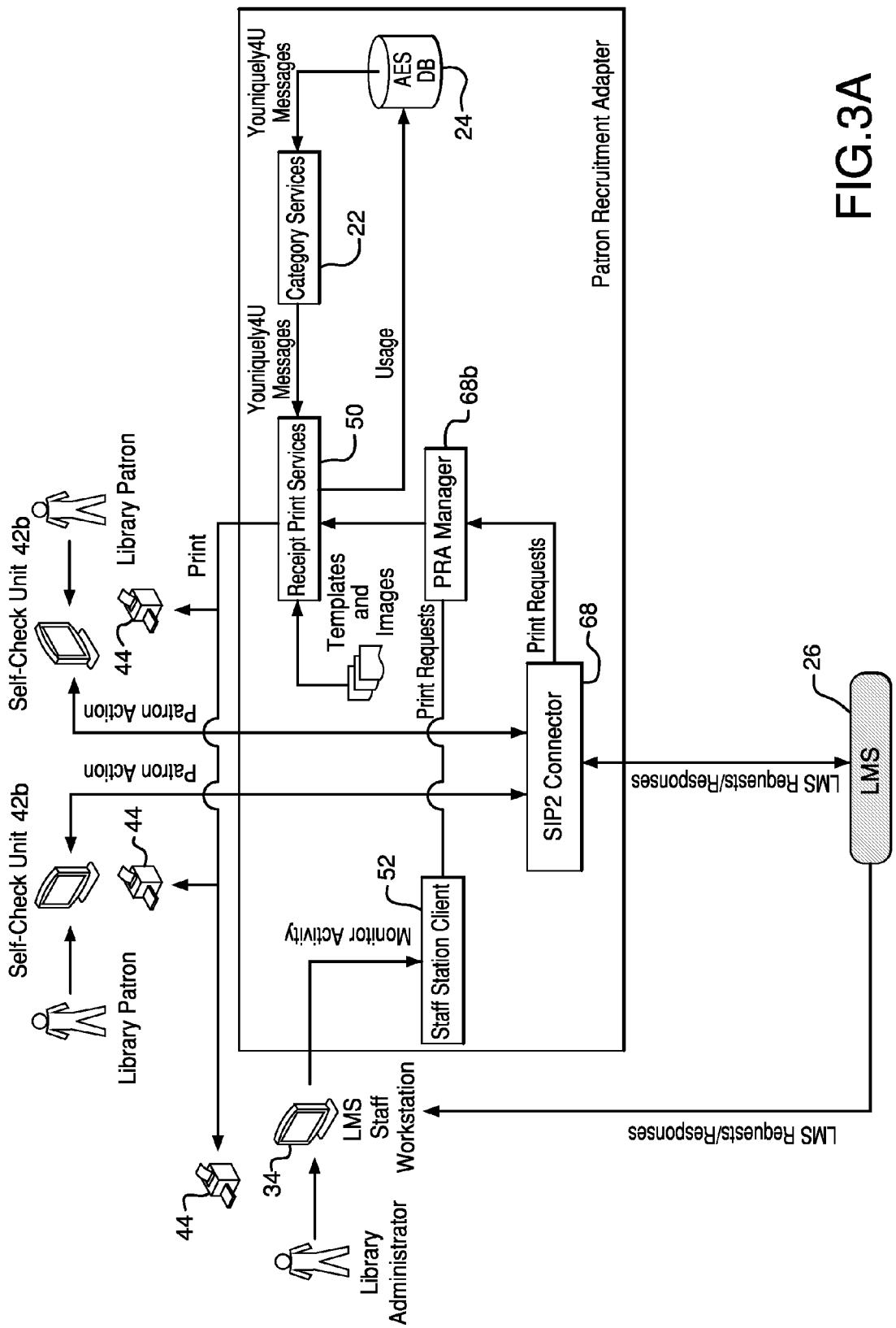
FIG. 3A is a block diagram of the AES patron recruitment adapter (PRA) configuration that provides the matching trigger technology and printed newsletters/receipts for the AES program in a library with a self-checkout station other than one provided by the service provider.

As a third exemplary integration of the preferred system is shown in FIG. 3A. The system configuration shown in FIG. 3A is referred to as the Patron Recruitment Adapter (PRA) configuration. The PRA enables LMS staff stations 34 and other vendors' self-service stations 42b to print AES (library reward) messages on AES (patron library reward) newsletters/receipts. The system is a derivative of the USS Self-Check Solution. The USS Self-Check Solution includes a Print Receipt Web Service 50 and a Category Web Service 22 that provide targeted messages to patrons. The PRA uses Print Receipt 50 and Category Web Services 52 to print targeted messages when patrons perform a transaction. The system monitors actions on vendors' (i.e., not the service-provider's self checkout station) self-service station units connected to an LMS using SIP2 protocol server 38 (see FIG. 2) and client 72 (see FIG. 2). The system also monitors all LMS staff stations 34. The components that are different from the first two exemplary integrations are the SIP 2 Connector 68 and the PRA manager 68b.

The SIP 2 Connector's 68 primary purpose is monitoring and intercepting communications between a self-check unit 42b and an LMS 26 for the purpose of triggering relevant category IDs and providing patrons AES (Library Reward) newsletter/receipts. The connector is a unique method for non-invasively connecting the AES (Library Rewards) matching trigger technology and newsletter generation process between two systems that rely on the SIP 2 protocol to communicate. The SIP connector 68 captures LMS SIP message responses that are relevant to the AES (Library Rewards) program receipt messaging. The SIP2 Connector 68 is a pass-through socket for SIP2 commands from a self-check unit 42b. Self-check units 42b communicate to an LMS 26 using either a socket connection or a telnet connection.

The PRA Manager 68b receives requests from the Staff Station Client 52 and the SIP2 Connector 68. The requests include patron ID, patron name, action, items, and IP address of the Self-Check Unit 42b or the Staff Station Client 52. The PRA Manager 68b manages newsletters/receipt information and builds print web service requests for printing to the AES (Library Rewards) Printer 44.

The Staff Station Client 52 runs on an LMS staff station 34. The staff station client 52 is a unique method for non-invasively connecting the AES (Library Rewards) matching trigger technology and newsletter generation process between a library LMS 26 and the LMS Staff workstation 34. The LMS Staff Workstation 34 can be configured to print in "single receipt mode" or "two receipts mode." Two receipts mode prints an AES (library rewards) newsletter/receipt on the library rewards printer 44, while a standard receipt is printed by the LMS Staff Workstation 34 on its standard printer. For two-receipt printing, the AES (Library Rewards) Staff Station Client 52 monitors the LMS staff workstation 34 barcode scanner and the print queue to help generate and determine when AES (Library Reward) newsletters/receipts are to be printed for a patron. The barcode scanner is attached to a COM port or USB port. The port always returns barcode data, which is evaluated to determine if they are patron IDs or library asset IDs. Item IDs are sent to the PRA manager 68b to generate category IDs. In conjunction with monitoring barcode IDs, the Staff Station Client 52 monitors for the end of the patron LMS staff workstation 34 transaction and then notifies the PRA manager 68b to initiate the process to generate the AES (Library Rewards) newsletter/receipt.

The Staff Station Client 34 has two methods to determine the end of a transaction for two-receipt printing. In the first method, the Staff Station Client 34 notifies the PRA manager 68b of the end of a patron transaction by having the Staff Station Client 52 monitor the LMS Staff Station 34 print queue for the presence of a file. If a file is present, a notification message is sent to the PRA manager 68b to print an AES (Library Rewards) newsletter/receipt. When this method is used, a library receipt and an AES (Library Rewards) newsletter/receipt are printed separately for the patron. The library receipt is printed by the LMS Staff workstation printer, by the LMS Staff Workstation 34 and the AES (Library Rewards) newsletter/receipt is printed by the AES (Library Rewards) Program on the AES (Library Rewards) Printer 44. This method is used when the LMS staff workstation 34 application sends the receipt to the LMS staff workstation printer at the end of the patron session. The second method is for the Staff Station Client 52 to monitor the LMS staff workstation 34 application's session windows to determine when a patron session transaction ends. Again, the AES (Library Rewards) Staff Station Client 52 notifies the PRA manager 68b at the end of a patron session and the PRA manager 68b invokes the print newsletter/receipt process. This method is used when the LMS staff workstation 34 is configured to print to its printer dynamically. Dynamic printing is when the LMS staff workstation 34 prints the transaction receipt item by item as they are processed. Monitoring the LMS staff workstation 34 application is necessary in this scenario, since the print queue does not indicate the end of patron session in dynamic printing. Print is sent to the printer continuously during the patron session in dynamic printing.

For single receipt printing the AES (Library Rewards) Staff Station Client 52 is configured as the port for the LMS staff workstation's printer 34d (see FIG. 3D), which is configured as a generic/test printer. The AES (Library Rewards) Staff Station Client 52 monitors the LMS staff workstation's generic/text printer 34d to retrieve the raw printed data sent to the generic/text printer 34d. When the raw printed data arrives at the generic/text printer, the AES (Library Rewards) Staff Station Client 52 reads and parses the data, then sends it to the PRA manager 68b to construct a print request to print web service. For each piece of data it reads and parses, if the data contains header summary text, the AES (Library Rewards) Staff Station Client 52 sends the transaction type start session to the PRA manager 68b, so it can prepare a transaction type session. Any raw printed data followed by the transaction type start is sent to the PRA manager 68b as print type request and continues until a new transaction type is detected. The use of transaction types enables the PRA manager 68b to generate any receipt that the library would normally print and add AES (Library Rewards) category numbers, newsletter, and messages to any transaction types selected in the configuration.

Figure 3B:
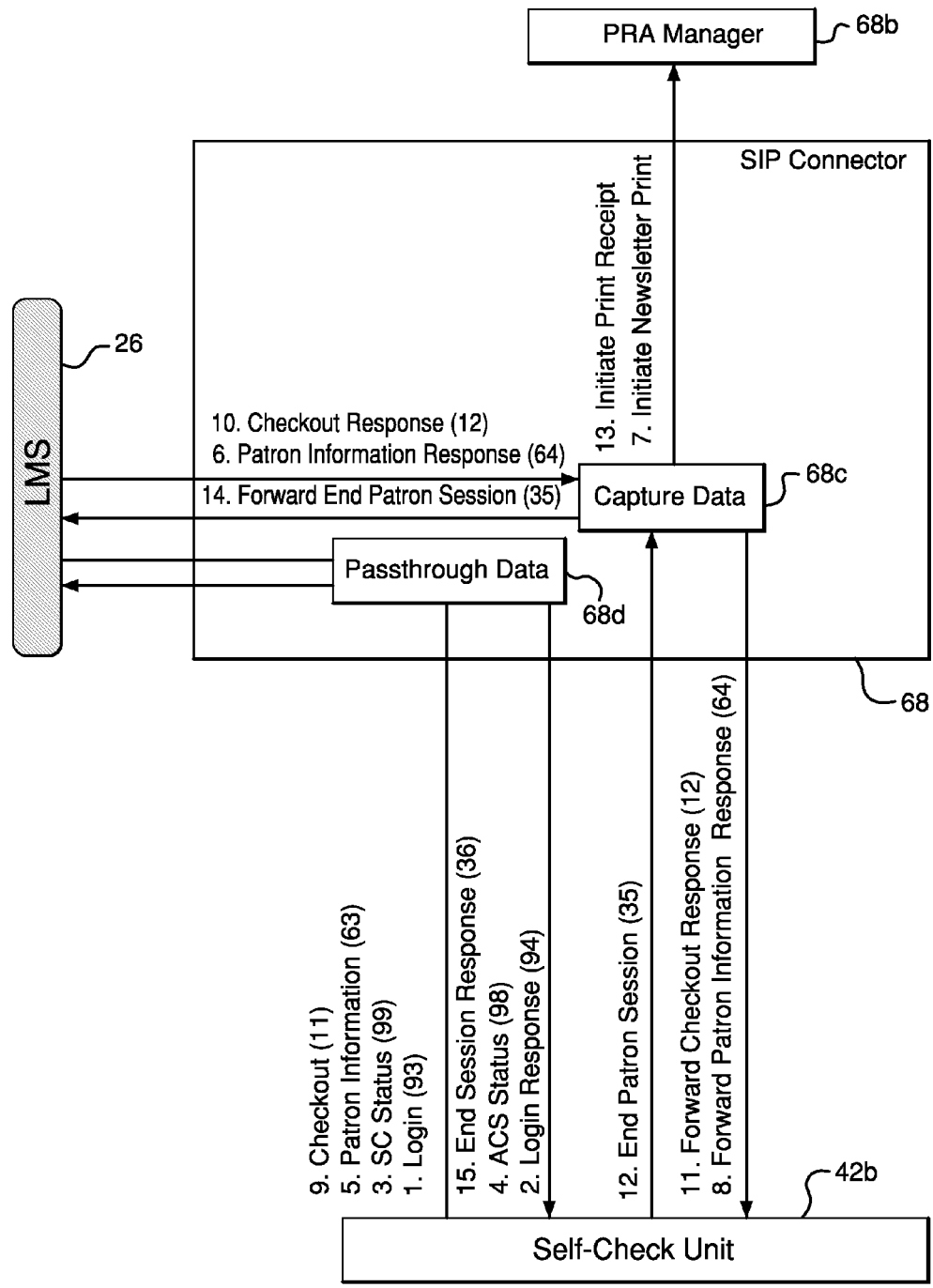
FIG. 3B is a block diagram of the AES PRA Standard Interchange Protocol (SIP) pass-through connector and associated data flow and thus provides a non-invasive method for connecting between an existing self-checkout system (not provided by the service provider) and the library management system (LMS) in order to provide the matching trigger technology and printing of newsletters/receipts of the AES system.

FIG. 3B details the AES (Library Rewards) PRA SIP connector (68) and the flow of data for a typical self check transaction. The outline numbers in Table 2 below correspond to the numbers for the messages shown in FIG. 3B. The numbers in parentheses at the end of each message in the FIG. 3B are the actual SIP 2 protocol message identifiers.

TABLE 2

| Message Number in FIG. 3B | Description |
|---|---|
| 1 | The self-check (42b) sends a login request to the LMS (26), which is passed through the SIP2 Connector's (68) Passthrough Data (68d) function to the LMS (26). |
| 2 | The LMS (26) responds with a login response, which is passed through the SIP2 Connector's (68) Passthrough Data (68d) function and returned to the self-check unit (42b). Note that the patron ID is passthrough only and not used or retained by the AES (Library Rewards) Program. |
| 3 | The self-check (42b) sends a status request to the LMS (26), which is passed through (68d) the SIP2 Connector (68) to the LMS (26). |
| 4 | The LMS (26) responds with a status response, which is passed through (68d) the SIP2 Connector (68) and returned to the self-check unit (42b). |
| 5 | The self-check sends the patron information request message to the LMS (26), which is passed through (68d) the SIP2 Connector (68) to the LMS (26). |
| 6 | The LMS (26) responds with a patron information response message, which is captured (68c) in the SIP2 Connector (68) and considered the start of a patron transaction session, as it is a new patron ID. |
| 7 | The SIP2 Connector (68) initiates a newsletter print start, having identified the beginning of a new patron session. |
| 8 | The patron information response is returned to the self-check unit (42b). |
| 9 | The self-check unit (42b) sends a checkout request message to the LMS (26), which is passed through (68d) the SIP2 Connector (68) to the LMS (26). |
| 10 | The LMS (26) responds with a checkout response message, which is captured (68c) in the SIP2 Connector (68). The SIP2 Connector (68) saves the item id in the checkout response and starts a timer. |
| 11 | The Checkout response is returned to the self-check unit (42b). |
| 12 | The self-check (42b) sends an end session request message, which is captured by the SIP2 Connector (68). |
| 13 | The SIP2 Connector (68) initiates the end newsletter print. |
| 14 | The SIP2 Connector (68) forwards the captured (68c) end session request to the LMS (26). |
| 15 | The LMS (26) responds with a patron end session response, which is passed through (68d) the SIP2 Connector (68) to the LMS (26). |

Figure 3C:
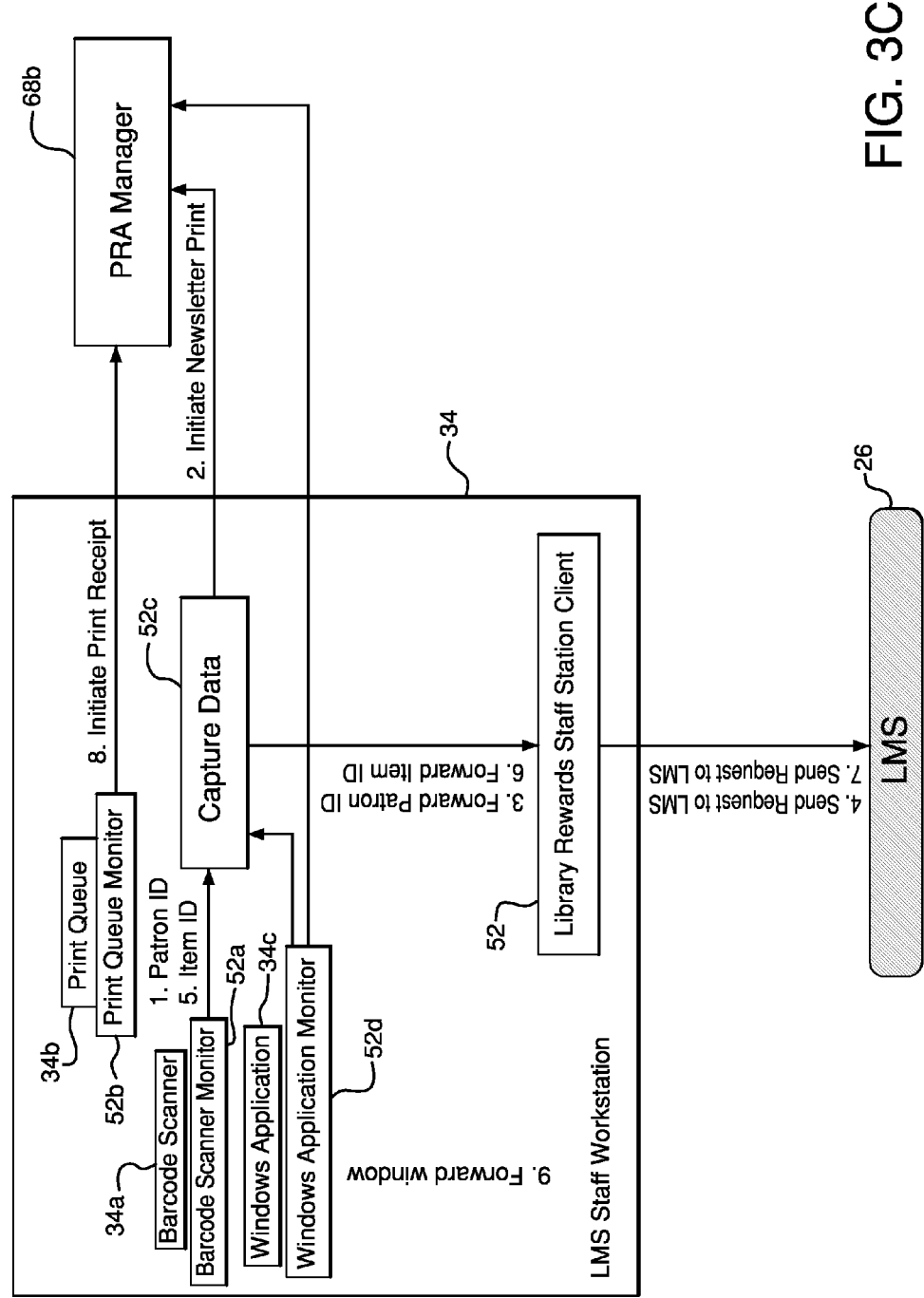
FIG. 3C is a block diagram of the AES PRA staff station client that is the component of the PRA that provides non-invasive method for monitoring LMS staff workstation transactions and provides the matching trigger technology and printing newsletters/receipts in addition to the standard LMS staff workstation receipt.

FIG. 3C details the AES (Library Rewards) Staff Station Client 52 and the flow of data for a typical staffed checkout transaction. The outline numbers in Table 3 below match the numbers for the messages shown in FIG. 3C. The numbers in parenthesis at the end of each message in the FIG. 3C are the actual SIP 2 protocol message identifiers.

TABLE 3

| Message Number in FIG. 3C | Description |
|---|---|
| 1 | Library Staff member scans a patron id barcode with the barcode scanner (34a). |
| 2 | The Staff Station Client (52) captures (52c) the patron barcode ID and initiates the newsletter print process. |

TABLE 3-continued

| Message Number in FIG. 3C | Description |
|---|---|
| 3 | The patron id is forwarded to the LMS Staff Workstation (34) application. |
| 4 | The LMS Staff Workstation (34) application sends a request to checkout message to the LMS (26), logging in the patron. |
| 5 | Library Staff member scans an item ID with the barcode scanner (34a) to checkout an item to the patron. |
| 6 | The item ID is captured (52c) and forwarded to the LMS Staff Workstation (34) application. |
| 7 | The LMS Staff Workstation (34) application sends a request to the LMS (26). |
| 8 | For static printing, the Staff Station Client (52) Print Queue Monitor (52b) detects a file in the print queue (34b). Since it has a patron session, the Print Queue Monitor (52b) initiates the end newsletter print to PRA manager (68b). |
| 9 | For dynamic printing, the print queue monitor (52b) is not used, but the window application monitor (52d) detects the staff member ending the session in the Windows Application (34c) and the Windows Application Monitor (52d) initiates the end newsletter print to PRA manager (68b). |

Figure 3D:
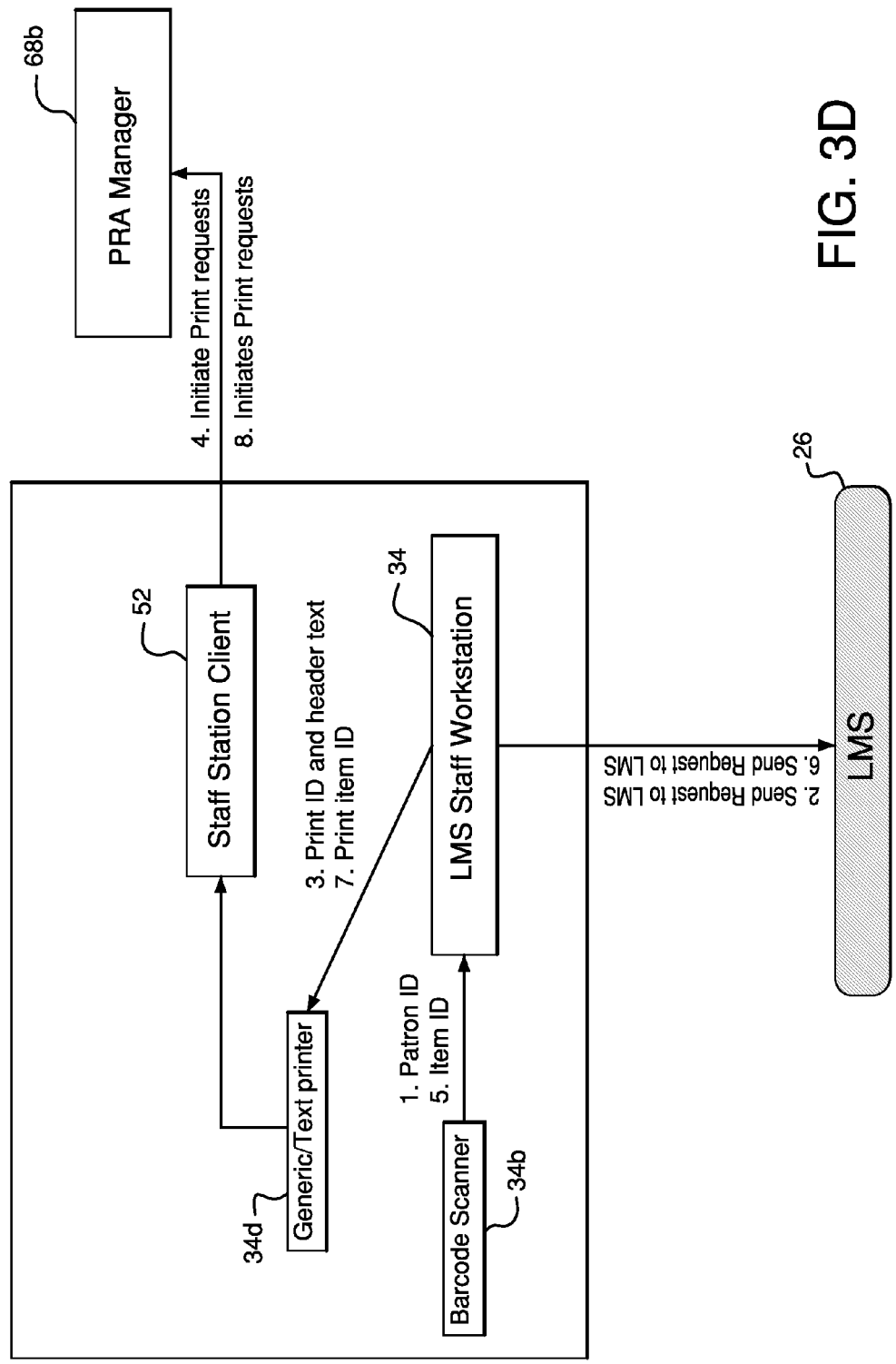
FIG. 3D is a block diagram of the AES PRA staff station client for "single" newsletter/receipt printing wherein this alternative configuration of the AES PRA staff station client provides a non-invasive method for monitoring LMS staff workstation transactions and provides the matching trigger technology while printing a combined newsletter/receipt from a LMS staff workstation to an AES point of sale (POS) network printer, resulting in printing all receipt transactions from a single printer.

FIG. 3D details the AES (Library Rewards) Staff Station Client 52 and the flow of data for a typical staffed Single Receipt Checkout transaction printing dynamically. The outline numbers in Table 4 below match the numbers for the messages shown in FIG. 3D. The numbers in parenthesis at the end of each message in the FIG. 3D are the actual SIP 2 protocol message identifiers.

TABLE 4

| Message Number in FIG. 3D | Description |
|---|---|
| 1 | Library Staff member scans a patron Id barcode with the Barcode Scanner (34b). |
| 2 | The staff station (34) software sends request to LMS (26) and receives the response from it. |
| 3 | The staff station (34) starts sending the print header to the Generic/Text printer (34d). |
| 4 | Staff Station Client's (52) Generic/Text printer monitor receives the Generic/Text printer's data and parses the raw printed data. It then formats the data as a message (transaction type start) to send to PRA manager (68b) for constructing a print request. |
| 5 | Library Staff member scans an item ID with the Barcode Scanner (34b). |
| 6 | The staff station (34) software sends a checkout request to LMS (26) and receives the response from it. |
| 7 | Staff Station Client (52) Generic/Text printer monitor receives the generic/text printer's data and parses the raw printed data. |
| 8 | The Staff Station Client (52) formats the data as a message (transaction type print item) to send to PRA manager (68b) for constructing a print request. |

In dynamic mode, the Staff Station Client 52 is configured to send a print request to print immediately. This configuration builds sends the newsletter/receipt to the AES (Library Rewards) POS printer 36 (FIG. 1) as the LMS Staff Workstation 34 sends raw data to the generic/text printer 34d. In static mode the process is similar with the exception that the Staff Station Client 53 receives the complete receipt from the generic/text printer 34d. The Staff Station Client 52 sends one print message with all the print request to the PRA manager 68b. The complete newsletter/receipt is built and sent to the AES (Library Rewards) POS printer 36 all at once, since the LMS Staff Workstation 34 only sends data to the generic/text printer 34d at the end of a transaction.

The AES Category Services builds a relationship between patrons and libraries that can now provide patrons relevant programming that the patron will be passionate about. A patron borrows material from a library, because of an interest. Category Services creates a link between the types of material that patrons find relevant or interesting and uses the information about the material to offer other programming in the same relevancy group. The mechanics for the process are based on the fact that every item in a library has a unique identifier called an item barcode. The item barcode associates the physical item to a library item record that describes the material. The physical records that describe the library collection are stored in the LMS database 28.

The AES Program contains a serviced AES Category database (AESDB) 24, separate from the LMS database 28, which categorizes relevant materials by item ID together in relevancy categories that match programming and content.

The materials in a library collection are grouped into the relevancy categories through queries to the library LMS database 28 based on criteria, including library of congress subject headings that determine what materials from the library's collection fit into relevant categories that are created by the service provider and stored in the AES category database 24. The program categories have been selected on the basis that they are the categories that patrons find the most popular and the library materials that have the highest circulation. The result of the LMS queries is a report that places the unique item IDs that are used to process the item transactions and category IDs that associate the assets to a particular relevancy category. The fact that the library is in control of the library of congress subject headings used in the queries to create the category reports enables them to customize their collection's association to relevancy categories and the particular interests most prevalent with their patronage.

Another process to create the association between item IDs for assets held in a library collection and relevancy categories is for the library catalogers or book jobbers to assign a category ID directly into the marc record for the item or asset. This provides the library more control in the association of materials to particular relevancy categories. For example, a library may add a note in the 590 field of the Marc record for an item with the category ID that the library wants to associate with the item. The 590 field is reserved for notes that are considered part of the bibliographic description even though the note is related to a specific item. The inventors have realized that an ID that associates an item to a relevancy category of patron interest could be a considered a note that is part of the item's bibliographic description. This process also makes the creation of a report output file with all of the items in a library collection that are to be assigned to a particular relevancy category straight forward.

As mentioned previously, the broad mapping user interest categories currently maintained on the program database 14 are: Family, Young Adult, Small Business, Smart Money, Personal Technology, Health Care, Home Improvement, Pet Care, Hobbies, Fitness & Wellness, Cultural Offerings, Local Offering, and Fiction. When a transaction occurs at the library, the item ID is used to generate a category number on a confirmation item (e.g., newsletter, receipt, etc.) along with an invitation to the AES Program. The category number or numbers provide access to the relevant programming on the hosted website.

Figure 4:
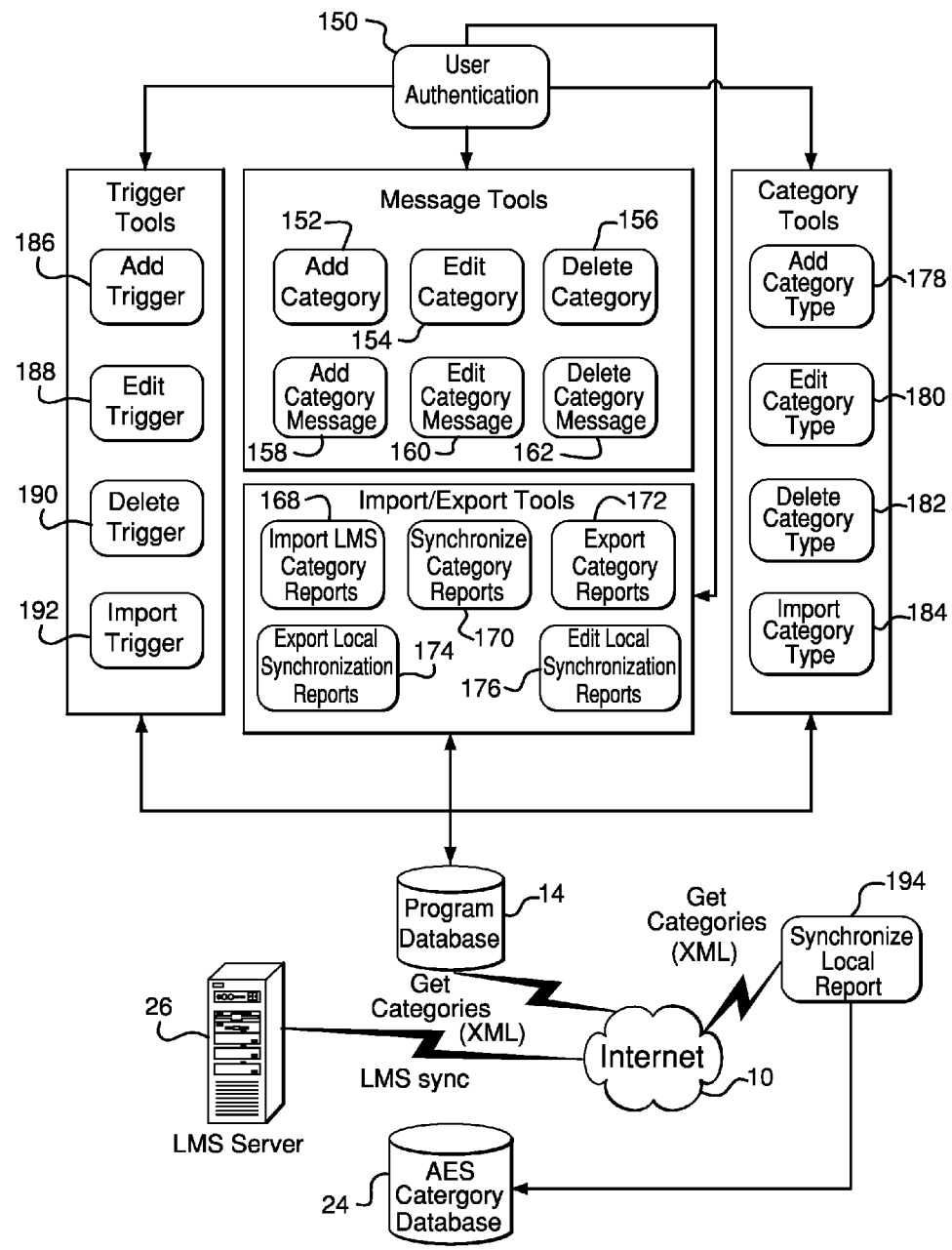
FIG. 4 depicts an AES web service category database architecture and management diagram.

Category Services has five main components of the System, the AES Category Builder (AESCB) and AES Host Category Server (AESHCS), the AES Host Category database AESHC-Db, the AES Local Category Service (AESCS), and the AES Local Category Database (AESCS-Db). FIG. 4 depicts the category builder including the message tools, the import/export tools, the category tools, and the trigger tools shown by example in the figure. The category builder is an application that enables the definition of database categories and the association between categories and items held in the library collection. Additionally, the category builder facilitates creating the category numbers that associate relevant reward categories on the AES website. The AES Host Category (AESHC) is the main repository for all categories and category numbers for all participating libraries. The AESHCS maintains each library's unique configuration, content and sponsors. The AESCS-Db contains the particular category numbers and library item identifiers that are unique to that library configuration. The item Id is the transaction trigger at the library, which results in the provision of category number to patrons that provide access to relevant information at the libraries portal to the program's web site.

Referring to FIG. 4, a user must be authenticated 150 to use the AESCB. Message tools create, edit, and delete category messages. In particular, the message tools include an add category 152, an edit category 154, a delete category 156, an add category message 158, an edit category message 160, and a delete category message 162. Import/Export tools synchronize the program database 14 with the LMS server 26 and synchronize the program database 14 with the AES category database 24. In particular, the import/export tools include import LMS category reports 168, synchronize category reports 170, edit category reports 172, export local synchronization reports 174, and edit local synchronization reports 176. Category tools manage category types, and include add category type 178, edit category type 180, delete category type 182, and import category type 184. Trigger tools manage how an item identifier triggers, and includes add trigger 186, edit trigger 188, delete trigger 190, and import trigger 192. Import LMS category reports 168 keeps the LMS database 28 synchronized with each participating library's changing collection. Synchronize category reports 170 runs a process to update the LMS database 28 with the information from the report. Export local synchronization reports 174 create a local report of changes for each participating library. The AESCS runs a service, synchronize local report 194 as needed to update the LMS database 28.

The printer service provides a method for combining a newsletter inviting the patron to opt into the library's relevancy program with targeting messages from the category service along with standard transaction information on a single receipt. This service provides receipt printing services for the different customer transaction points listed above. The receipt is based on templates for checked out/checked in items, renewed items, held items, PC reservations, fee/fine payment, and print management. Receipts may be printed at the point of transaction or emailed to a patron-supplied address.

Figure 12:
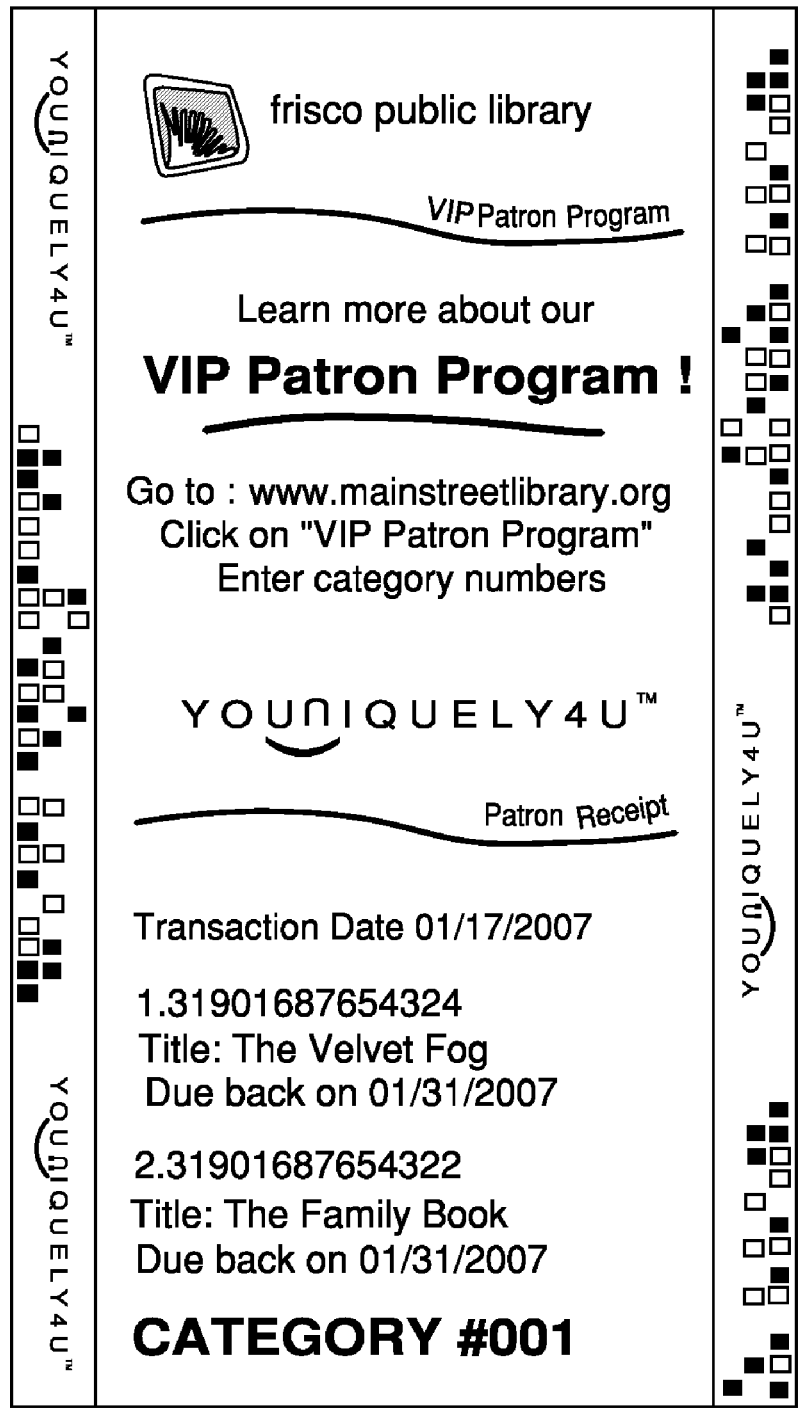
FIG. 12 is a sample newsletter (confirmation item) that can be printed or emailed.
Figure 13A:
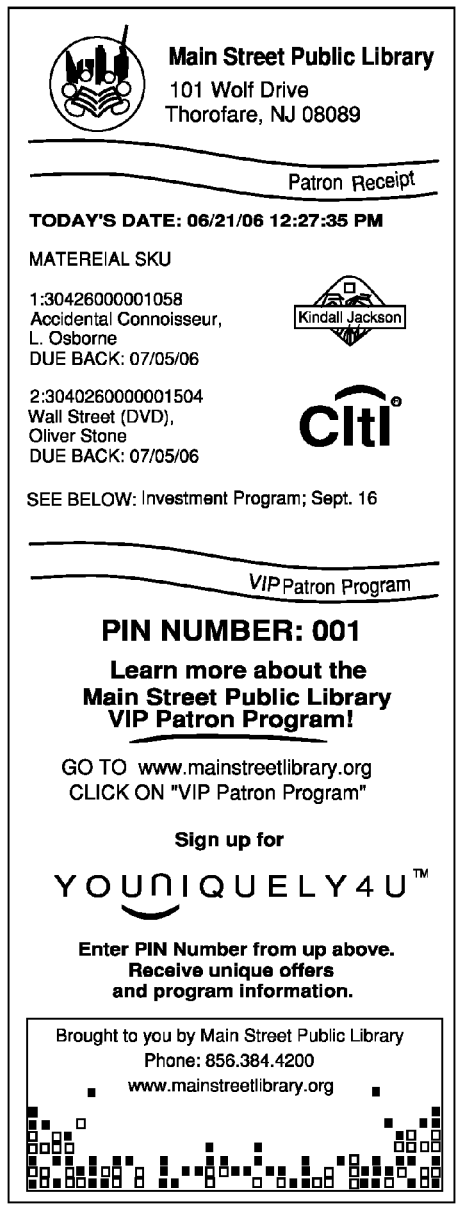
FIG. 13A is a sample self-service newsletter (confirmation item)
Figure 13B:
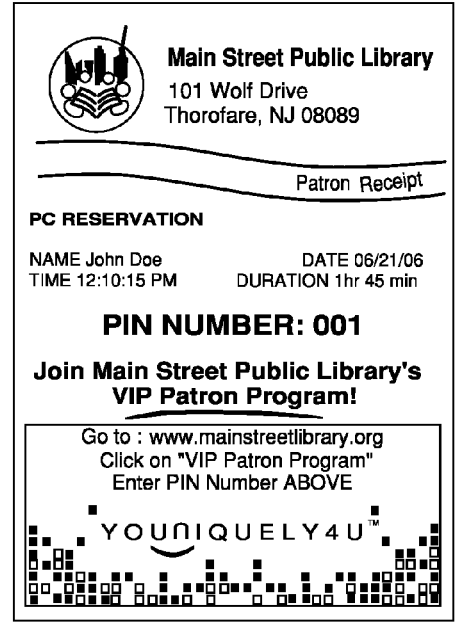
FIG. 13B is a sample checkpass personal computer reservation newsletter.

FIGS. 12, 13A and 13B depict newsletter (also know as confirmation item) samples generated on a printer in accordance with the preferred embodiments of the invention. A library patron is informed about the AES at various patron transaction points in the library environment. The patron receives a customized item bearing printed indicia at the end of a transaction that has two components: a receipt and a newsletter. The receipt component contains the standard information that the library normally prints and further contains one or more specific category IDs that are based on the assets borrowed or reserved in the transaction, which reference the specific category targeting content that is relevant to the patron on the program's website. The specific category ID is preferably a number that corresponds with the category name. However is also within the scope of the invention that the specific category ID can include the category name or rewards description with or in lieu of the category number or a reward description. The newsletter component of the receipt item provides an invitation to the program and information about the program. A receipt and newsletter may also be emailed to the patron if the user selects the email delivery option from the USS checkout transaction type. Sample PC reservation receipts are shown in FIGS. 13A and 13B.

The service provider-hosted AES Web Site (AESWS) is the program website that patrons visit to find relevant programming based on the assets borrowed from the library. Library patrons are recruited to opt in to the program. Patrons must be members of the library in order to register. Programming content delivered to members includes expertise, educational content, programs, promotional values, and events.

Figure 15:
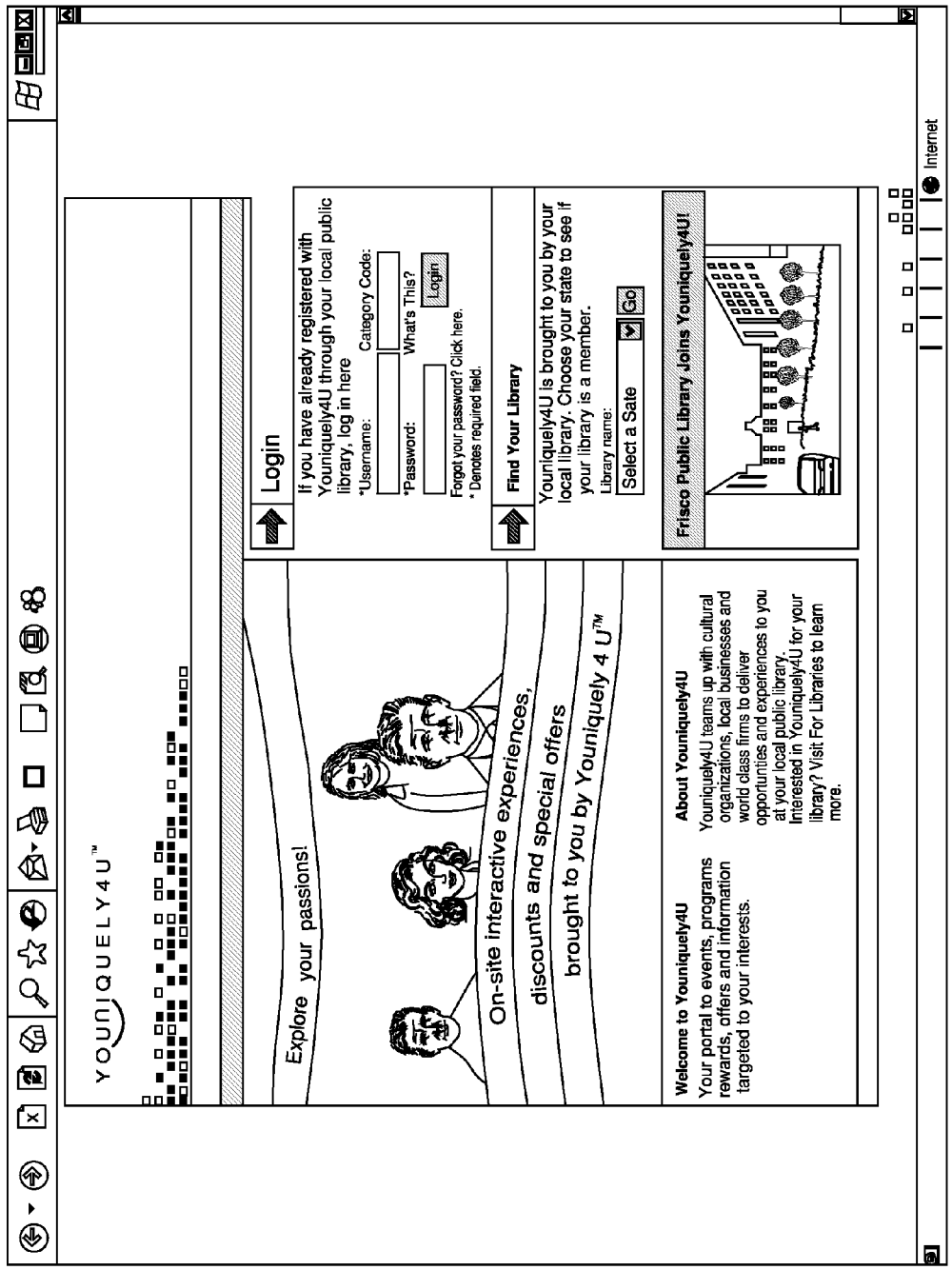
FIG. 15 is a screen display of FIG. 14.

FIG. 14 depicts an exemplary AESWS wire frame home page, which is presented when the patron types in the website URL. The page contains a welcome message, a drop down list to select the library that the patron is a member of, a text box for entering a category code, a text box for entering a user name, a text box for entering a password, and a button to submit the information entered. In this example, the category number is provided on the patron's newsletter that is received when conducting a library transaction. As discussed above, the category number is generated based on the materials processed in the transaction and directs the patron to rewards on the website that are relevant to the materials processed in the transaction. FIG. 15 shows a sample of the corresponding web page.

Figure 17:
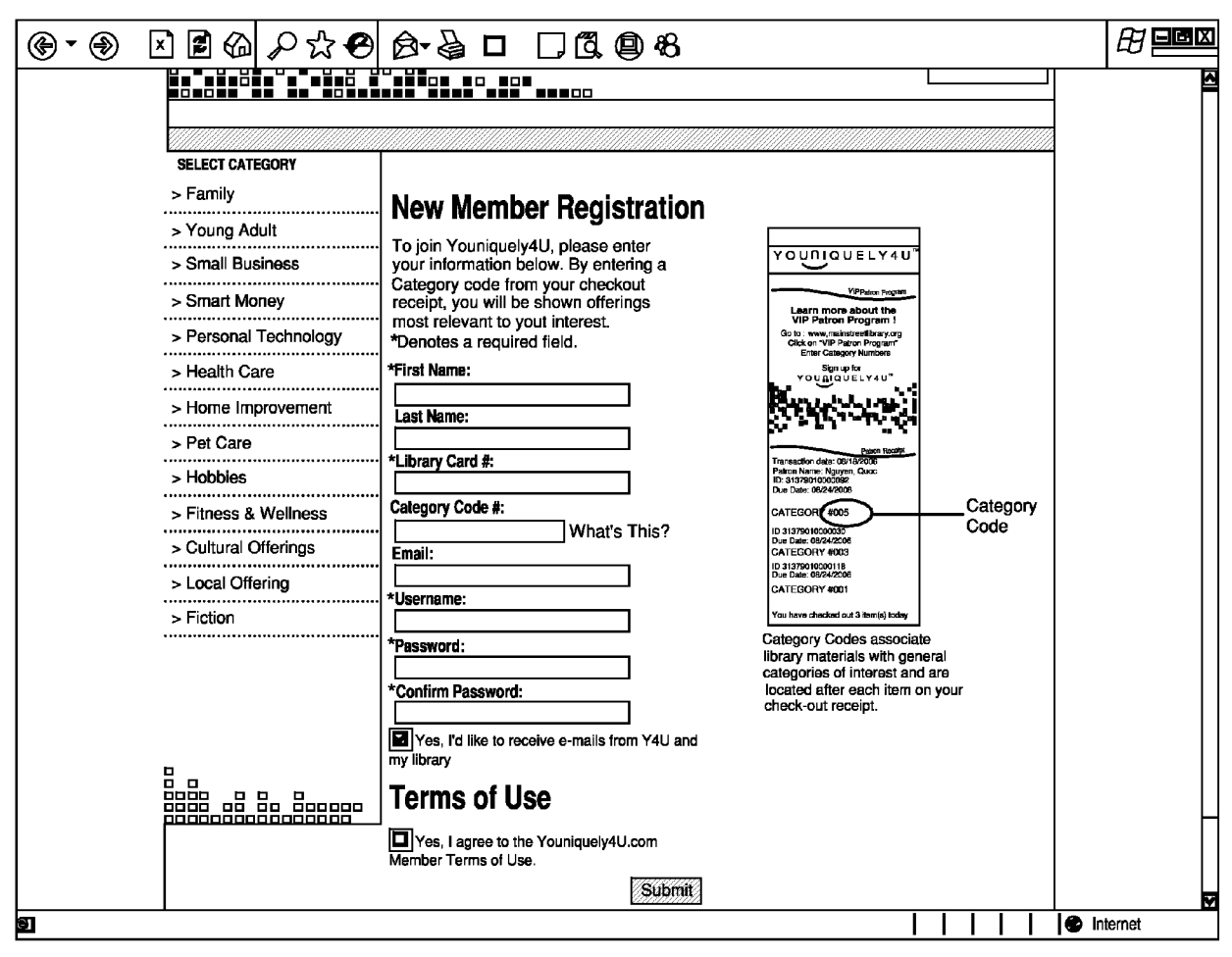

FIG. 16 shows an exemplary wire frame of a joining member's registration page. The page includes text boxes for the joining member to enter his or her first name, last name, library card number, category number, email address, username, password with confirmation, a submit button, and an image. FIG. 17 shows a sample of the corresponding web page.

Figure 18:
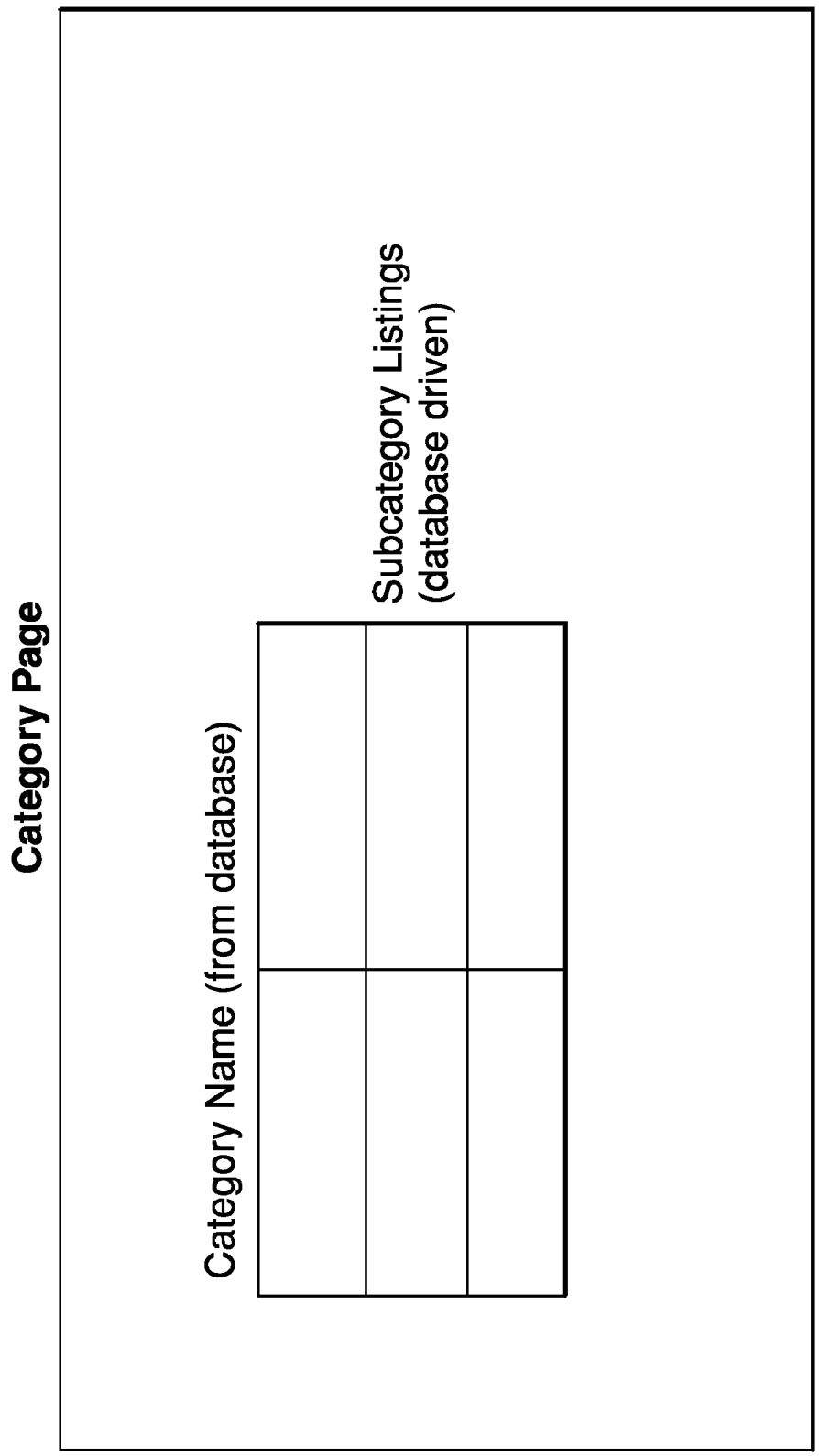
FIG. 18 is a wire frame depiction of the program categories page of the hosted web site.
Figure 19:
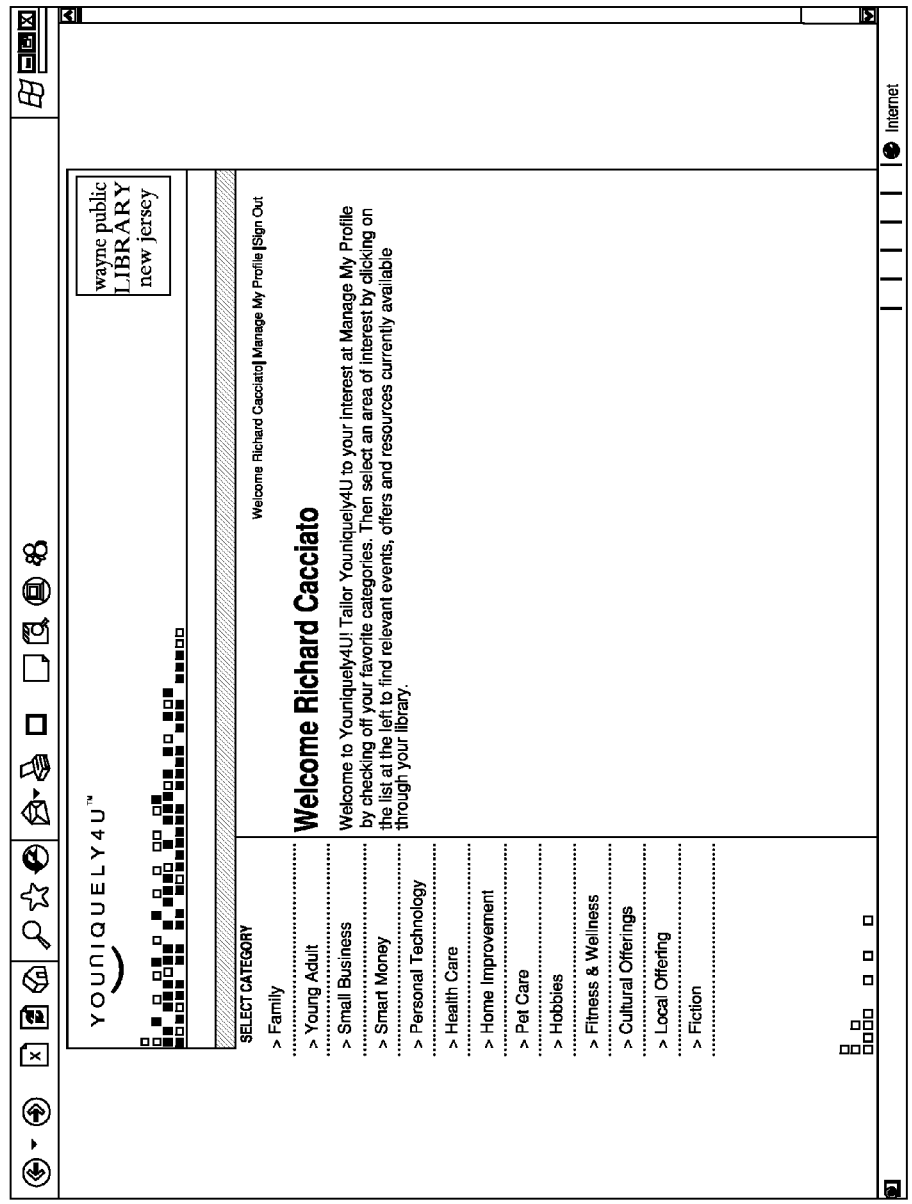
FIG. 19 is a screen display of FIG. 18.

FIG. 18 shows an exemplary wire frame of the AESWS program category page. The page includes a welcome message for the patron and selection boxes for each category. This page is only shown when a member logs in to the website without entering a category number and provides general access to all available programming. FIG. 19 shows a sample of the corresponding web page.

Figure 20:
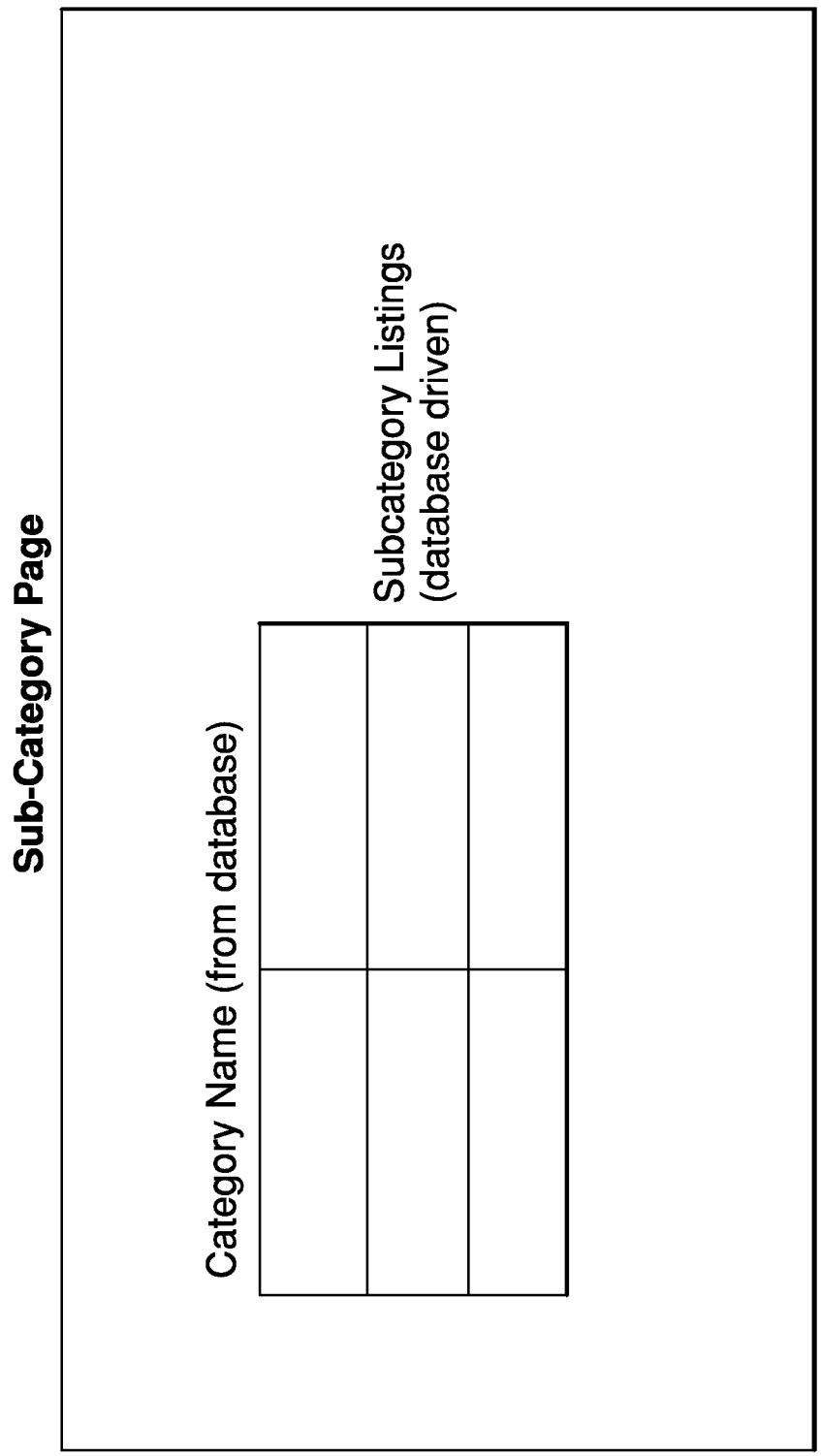
FIG. 20 is a wire frame depiction of the program subcategories page of the hosted web site.
Figure 21:
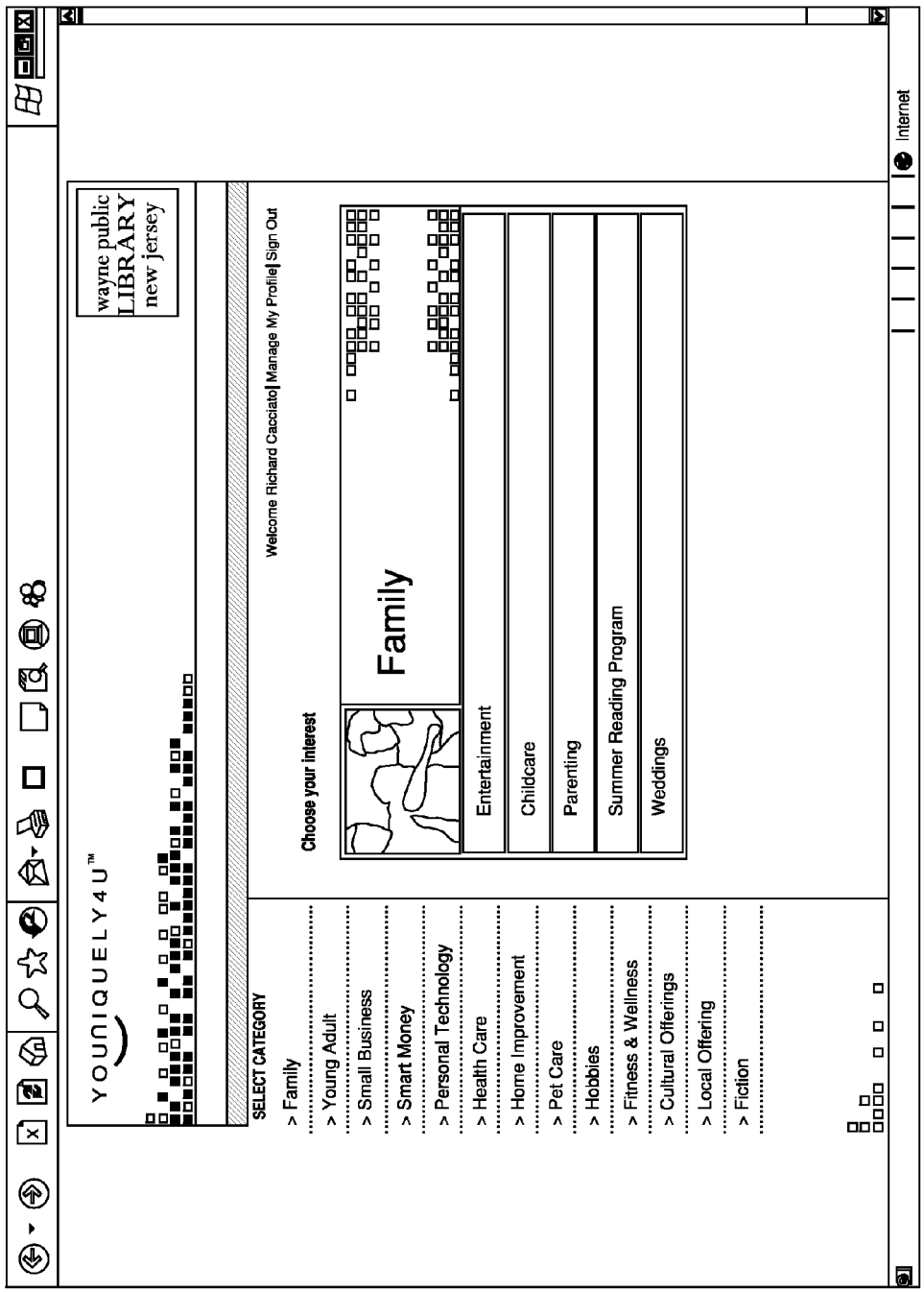
FIG. 21 is a screen display of FIG. 20.

FIG. 20 shows an exemplary wire frame of the AESWS program sub category page. The page includes a selection box for each category and displays the patron's relevancy category. A description of the relevancy category is included with a listing of the sub categories that belong to the main category. For instance the main category Family contains the following subcategories; Entertainment, Parenting, Childcare, Summer Reading Program, and Weddings. FIG. 21 shows a sample of the Family category and its sub category listings.

Figure 23:
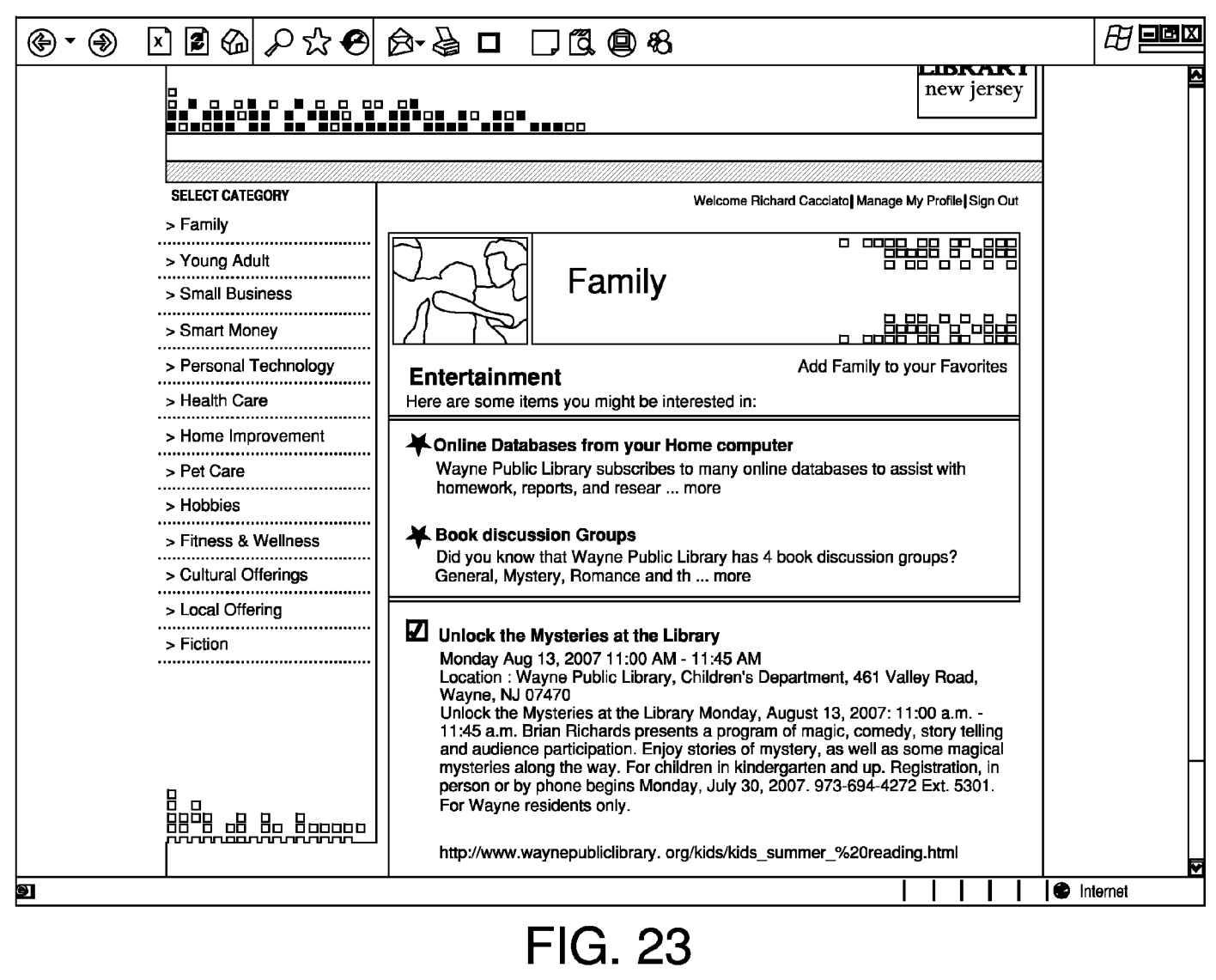

FIG. 22 shows an exemplary wire frame of the AESWS sub-category page. The page includes selections for programming types, which may include offers, resources, and events. If a readers' advisory is available it is also included, and all offers are listed. Each listing includes a logo identifying the type of program content contained in the selection. FIG. 23 shows a sample of the corresponding page.

Figure 25:
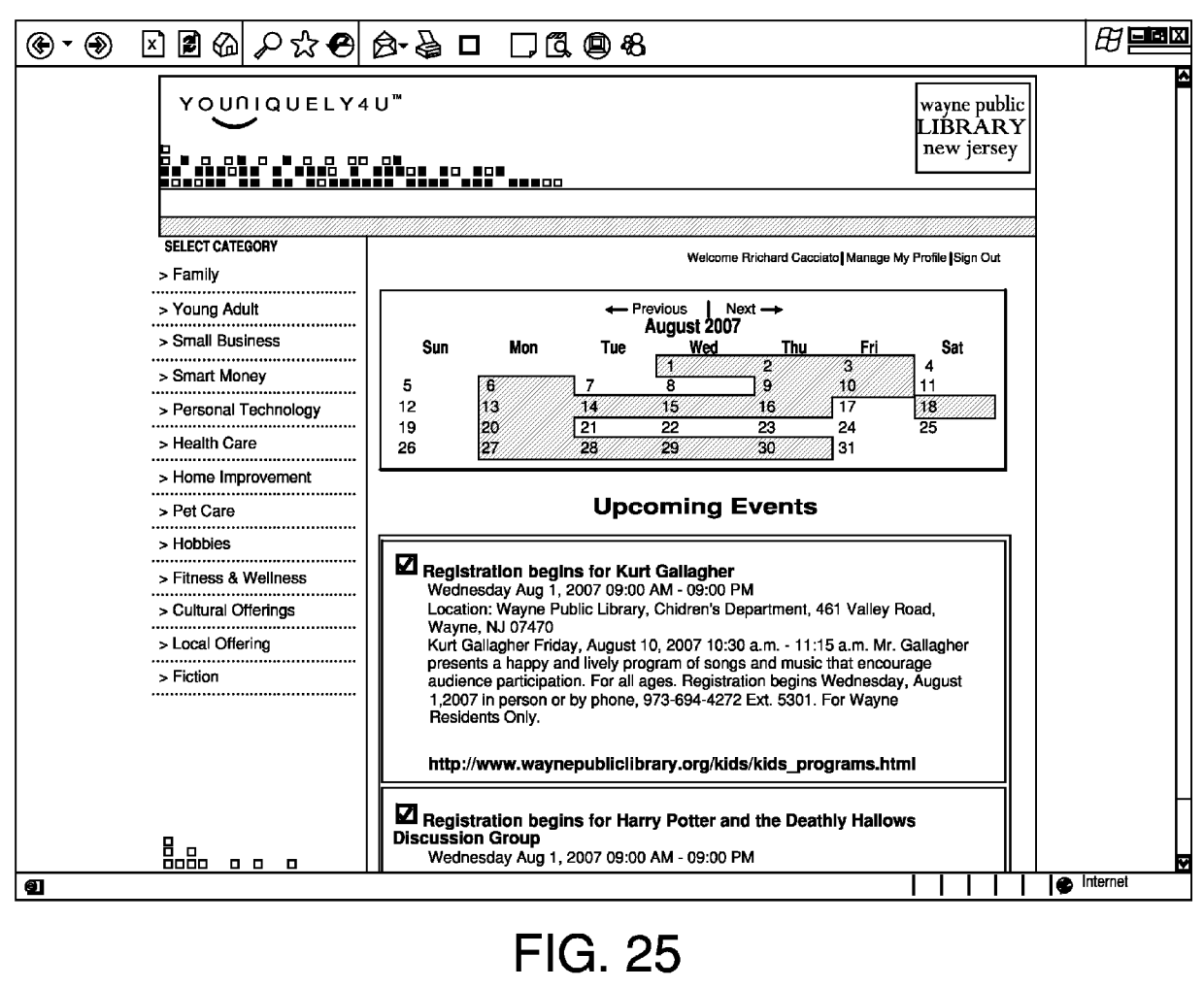

FIG. 24 shows an exemplary wire frame of the AESWS Library Programs Events Calendar page. The page includes a calendar view of the month with shading for days that program events in the selected category/subcategory are available shaded. Below the calendar view is a list of programming events. The list includes the date, title, time, location, description, and link to register for a listed event. Only events relevant to the category are viewed from the calendar view and the category listing. All events in all categories may be viewed by selecting the "show all events" menu option or by logging in without entering a category number. FIG. 25 shows a sample page of the calendar view.

Figure 27:
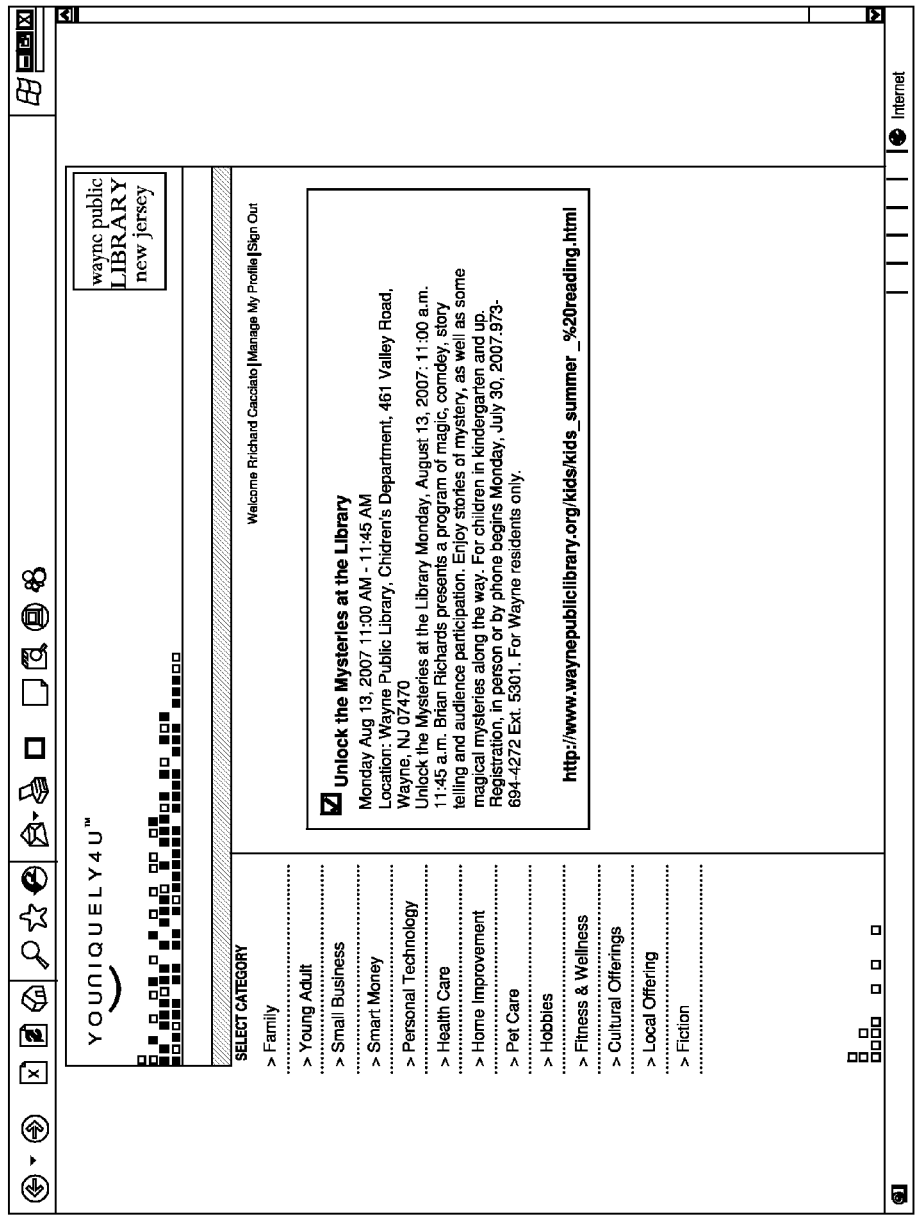
FIG. 27 is a screen display of FIG. 26.

FIG. 26 shows an exemplary wire frame of the AESWS events detail page. The page includes the title, time, location, description, and an image corresponding to a selected event. FIG. 27 shows a sample of the events detail page.

Figure 28:
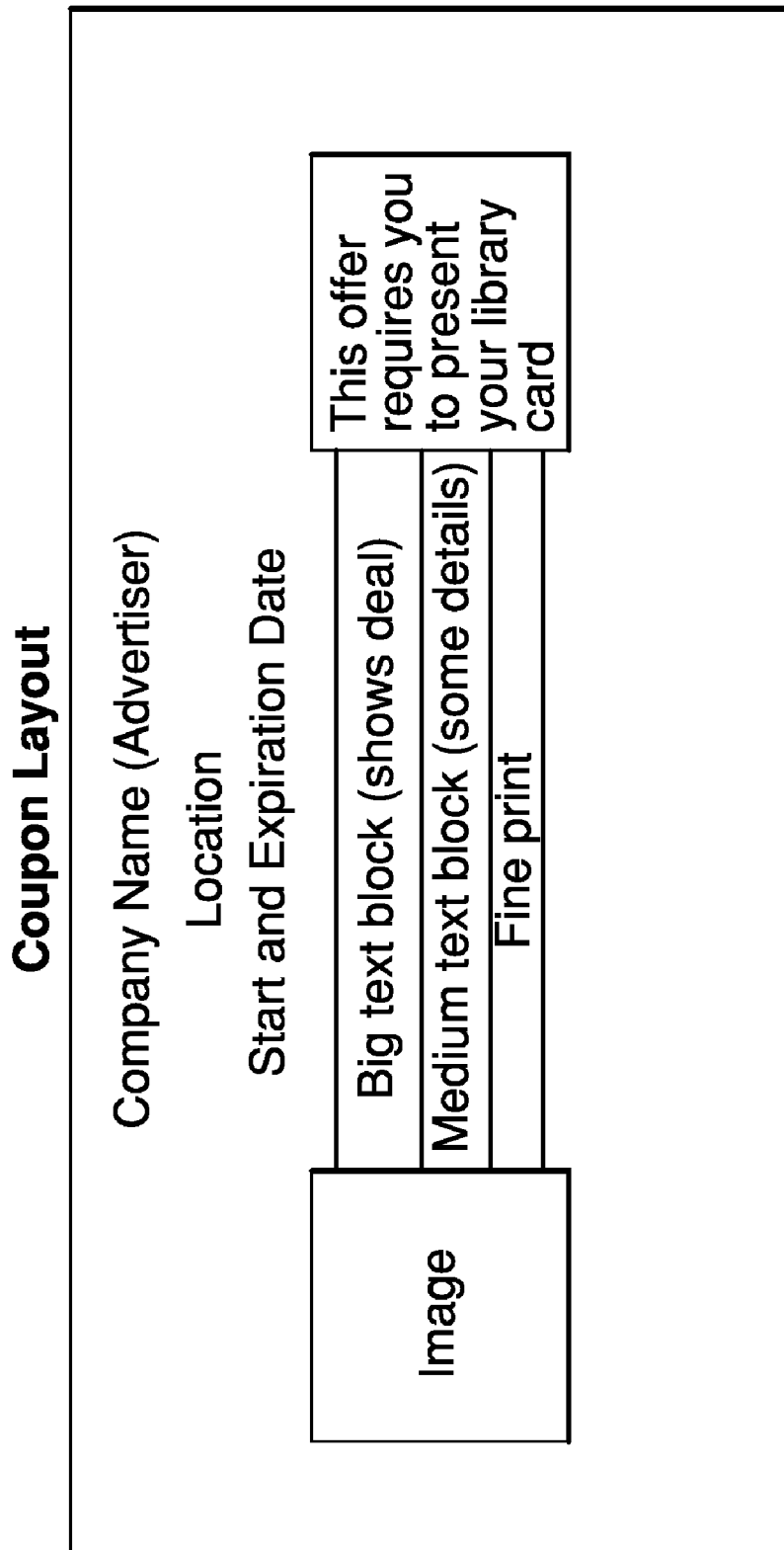
FIG. 28 is wire frame depiction of a coupon layout page of the hosted web site.
Figure 29:
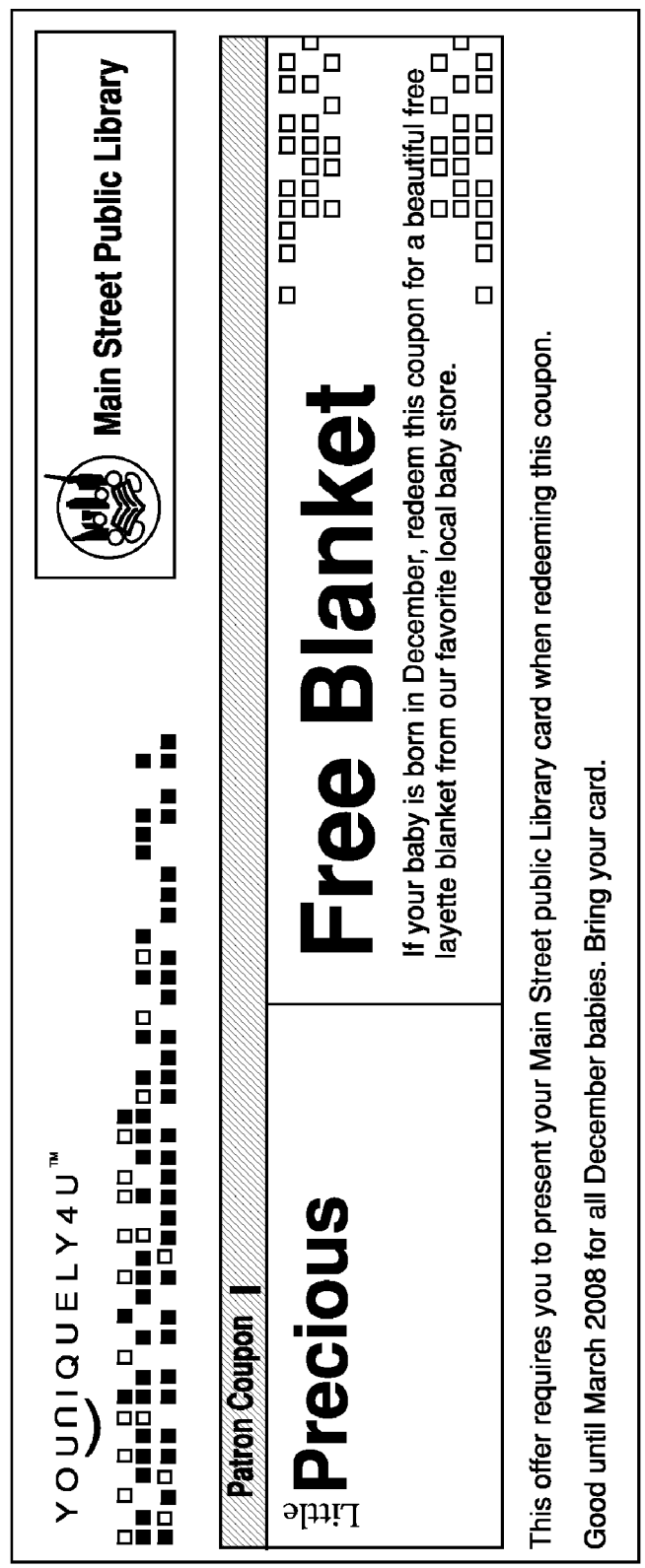
FIG. 29 is a screen display of FIG. 28.

FIG. 28 shows an exemplary wire frame of the AESWS coupon layout page. The coupon layout page includes the company name, location, start date, expiration date, big text block (shows the deal), text block (some details of the deal), fine print, and an image. FIG. 29 shows a sample coupon offer.

Figure 31:
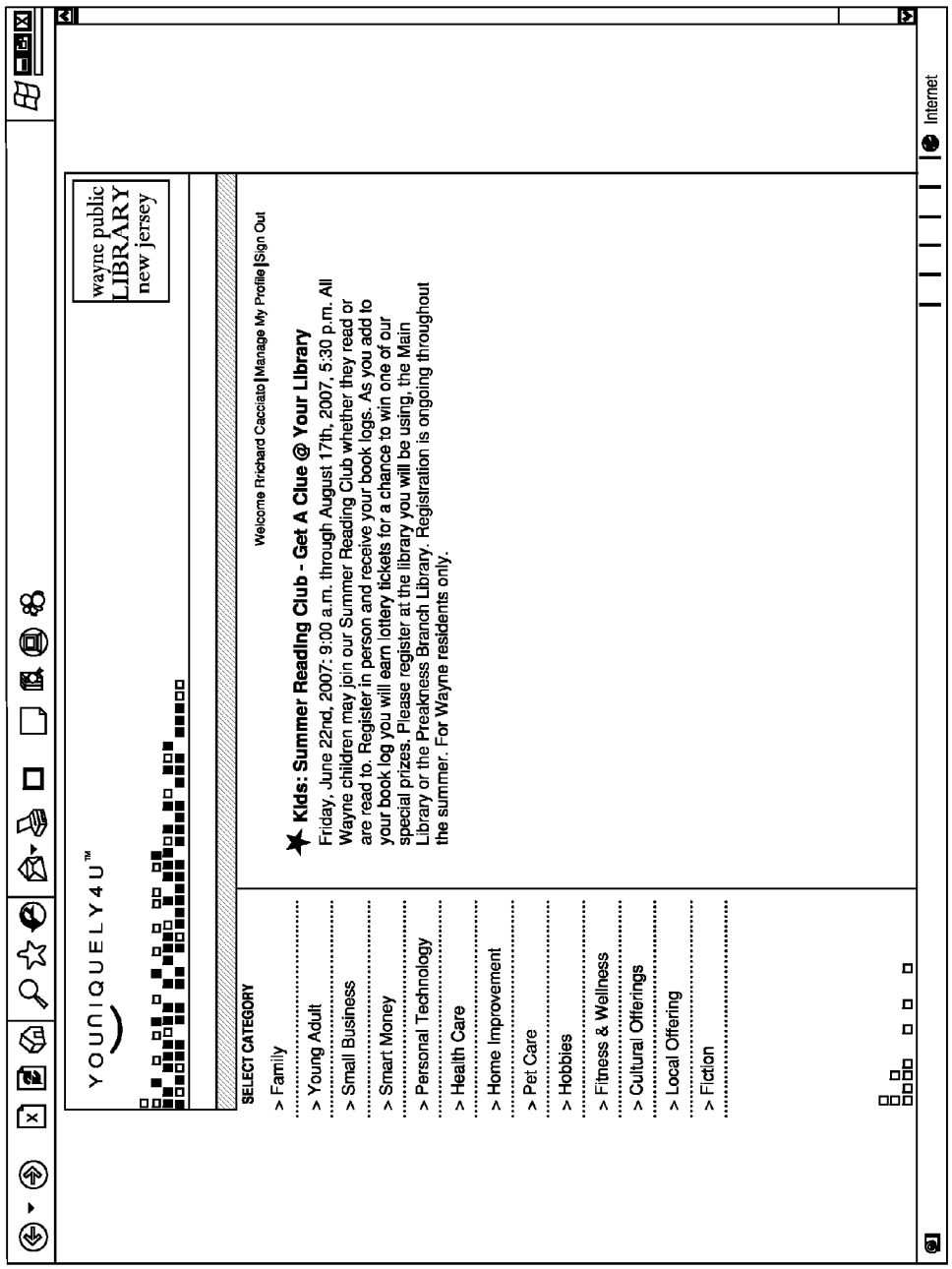
FIG. 31 is a screen display of FIG. 30.

FIG. 30 shows an exemplary wire frame of the AESWS Readers' Advisory Detail Page. It includes date, title, and advisory detail for the selected advisory entry. FIG. 31 shows a sample of the Readers' advisory page.

The Rewards Program website provides an administrator's package for managing program rewards on the website. The intended users of the package are service provider administrators responsible for managing regional and national sponsor's programming, and library administrators responsible for managing local programming, including events and reader advisories.

Figure 32:
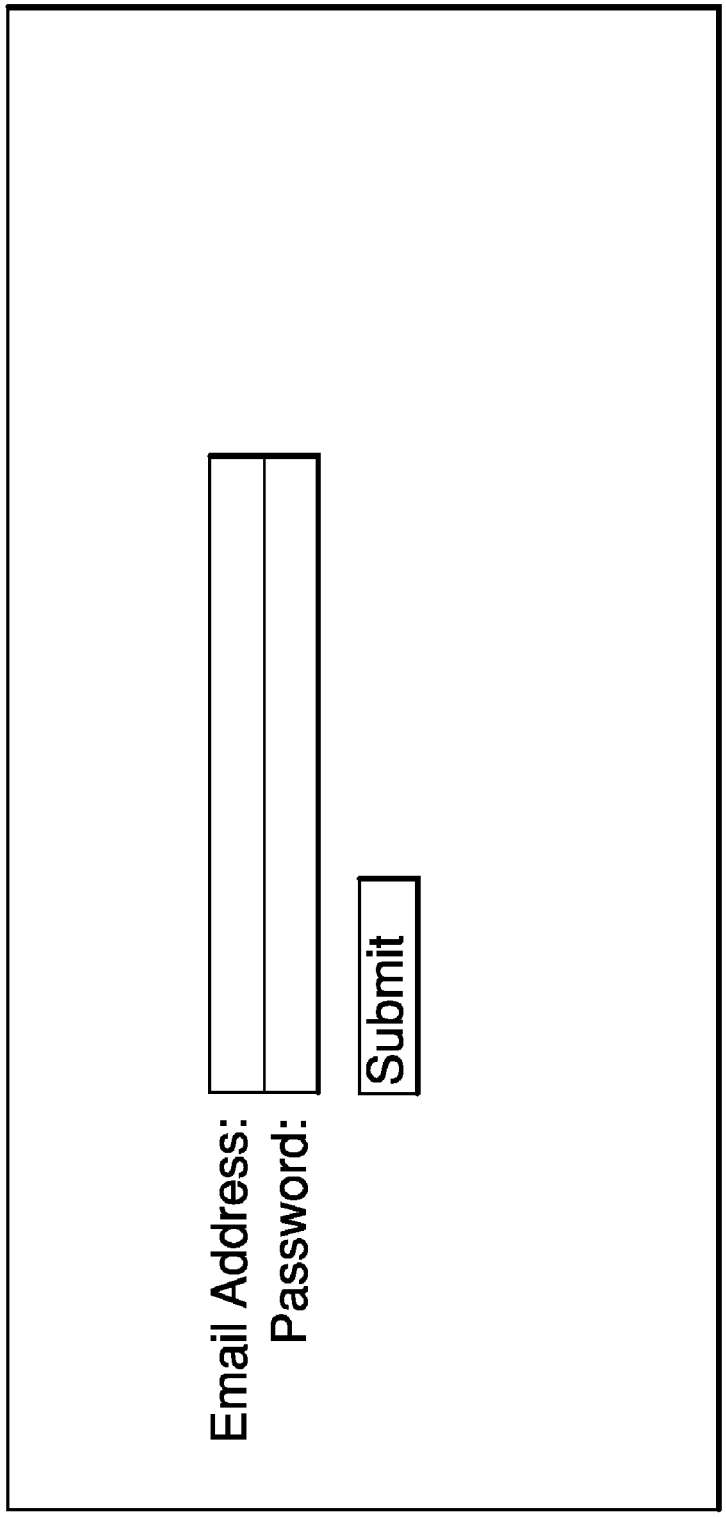
FIG. 32 is a wire frame depiction of an administrator login page of the hosted web site.
Figure 33:
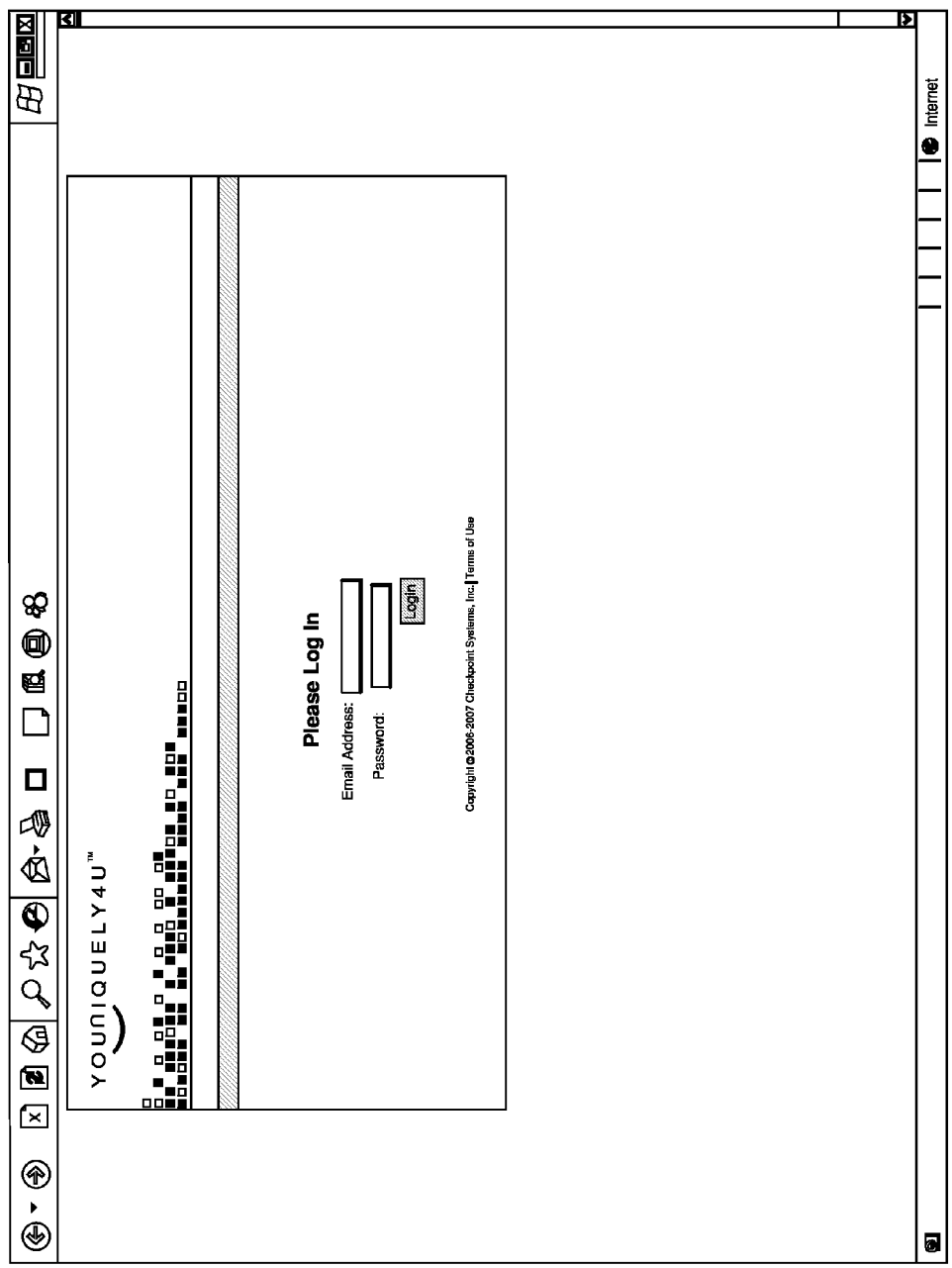
FIG. 33 is a screen display of FIG. 32.

FIG. 32 shows an exemplary wire frame of the AESWS administrator login page. The AESWS administrator login page includes a text box for entering the administrator username, which is the administrator email address; a text box for entering the administrator's password; and a button to submit the information to the program for authentication. FIG. 33 shows a sample of the administrator login page.

Figure 35:
FIG. 35 is a screen display of FIG. 34.

FIG. 34 shows an exemplary wire frame of the AESWS administrator event manager page. This page defaults to a calendar view that displays events and programming entered in the system. There are four selection links: last, month view, list view, and next view. Selecting "last", displays last month's view; selecting the "month view" displays the calendar layout; selecting the "list view" displays a list view of events entered into the program for the month; selecting "next" displays the next month's view. The calendar view contains selectable description text for events entered in the program. This text is displayed in the calendar on the day or days that the event takes place. Selecting the text brings the administrator to an editing page for the event. The administrator may modify the event from this page. There is a selectable link "Create New" that, when selected, brings the administrator to the page where a new event can be added to the program. The list also facilitates modifying and creating new events through selectable links. FIG. 35 shows a sample of the AESWS administrator event manager page's calendar view.

Figure 36:
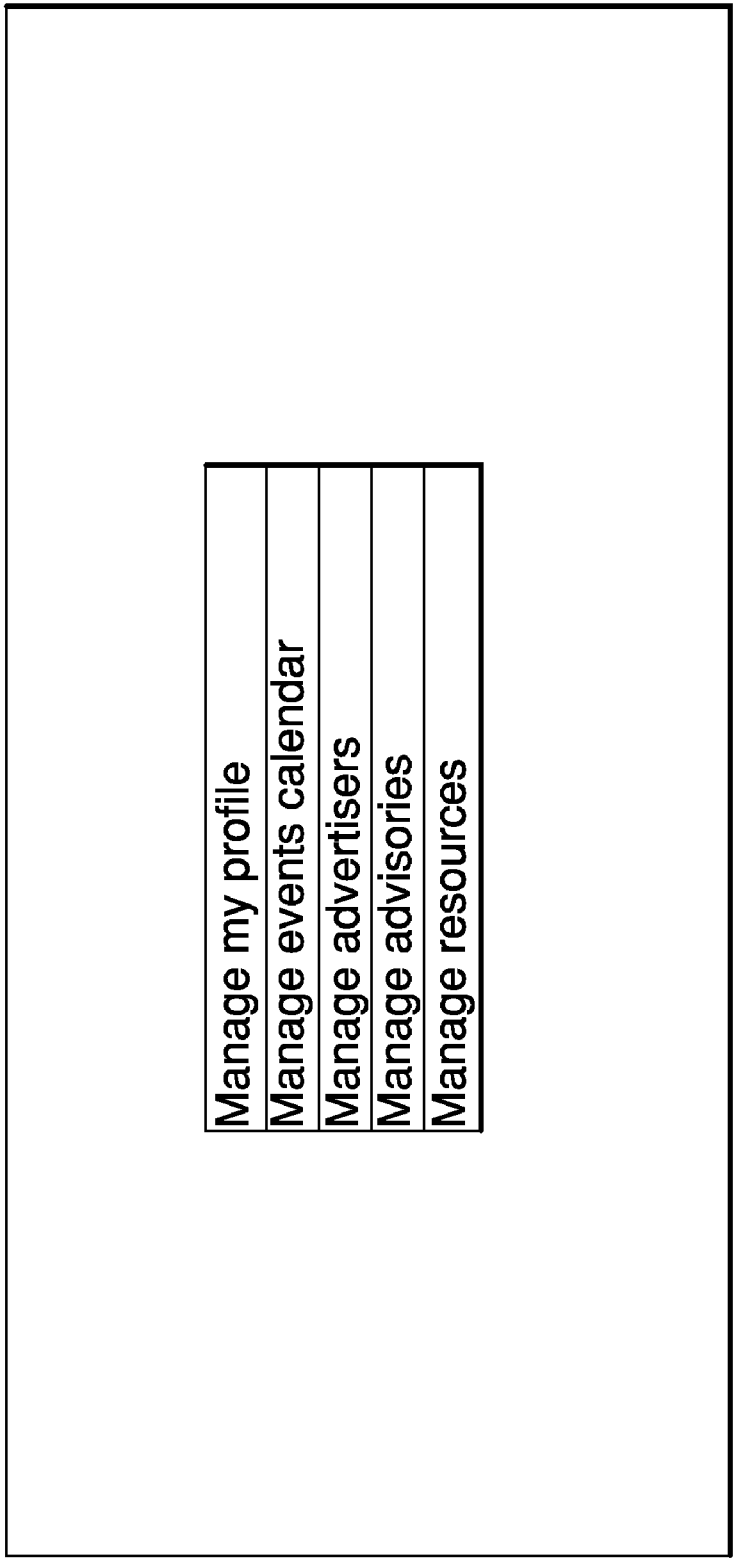
FIG. 36 is a wire frame depiction of an administrator landing page of the hosted web site.
Figure 37:
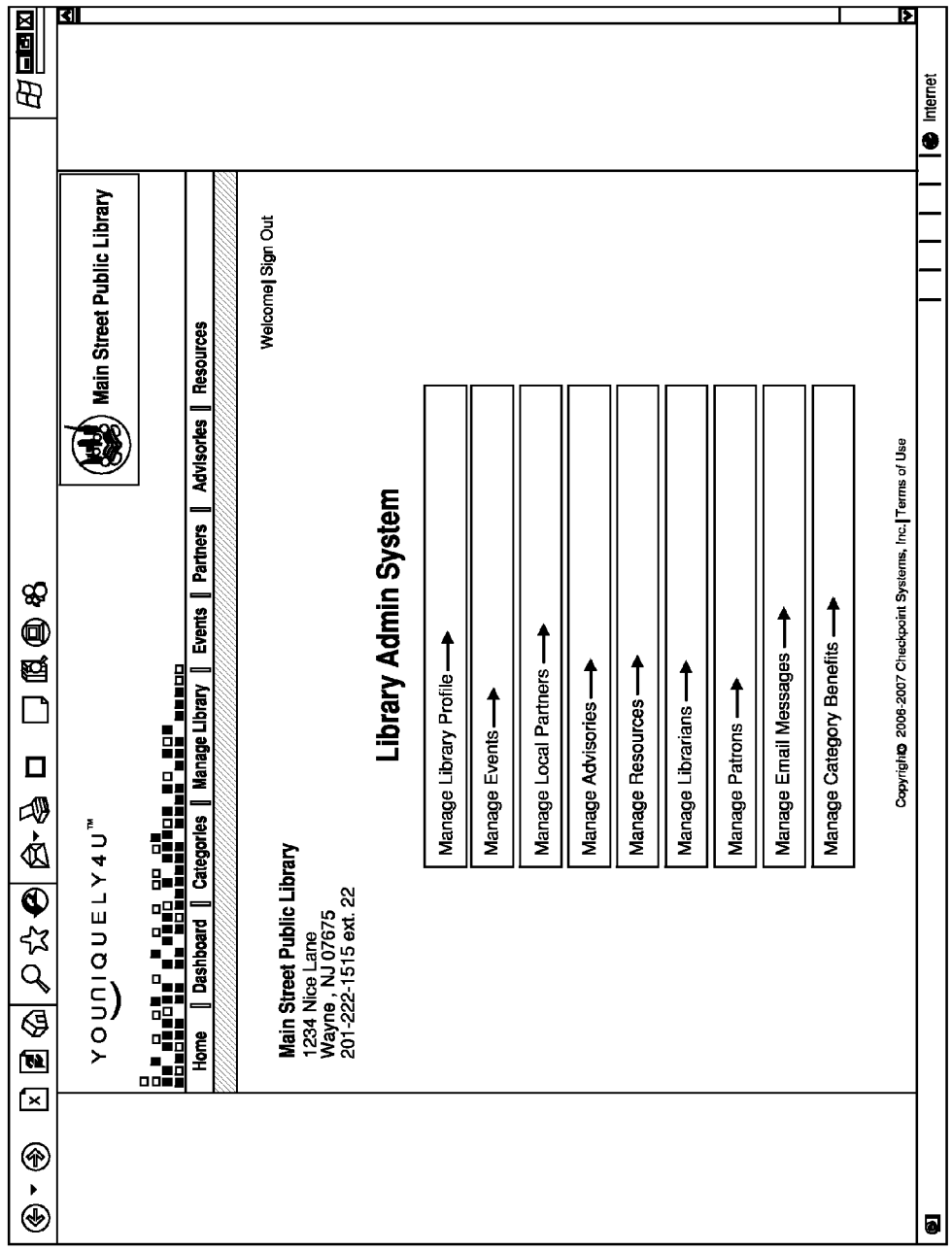
FIG. 37 is a screen display of FIG. 36.

FIG. 36 shows an exemplary wire frame of the AESWS administrator landing page. The landing page displays a list view of text boxes containing selectable text links for managing the program's content. The links are: manage my (the library) profile, manage events calendar, manage advertisers, manage advisories, and manage resources. Selecting "Manage my profile" takes the administrator to the page that contains the library's profile and enables the administrator to modify the profile. Selecting "Manage events calendar" take the administrator to the "Manage events calendar" page for modifying and creating event programming. Selecting "Manage advertisers" takes the administrator to the "Manage advertisers" page for adding or creating sponsored programming. Selecting "Manage advisories" takes the administrator to the reader advisory page for entering reader advisory programming. Selecting "Manage resources" takes the administrator to the page for modifying or creating new resources. FIG. 37 shows a sample of the AESWS administrator landing page.

Figure 39:
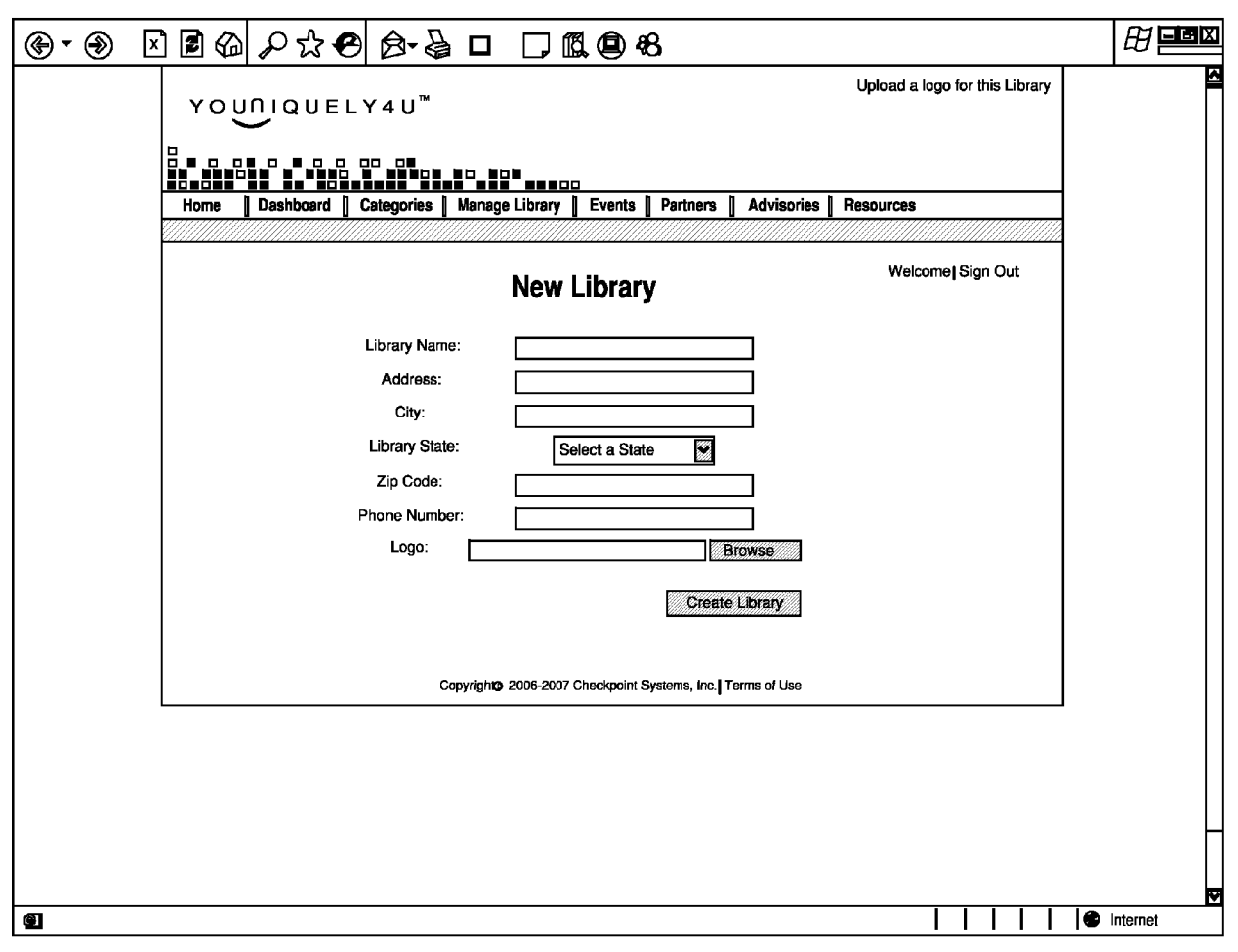

FIG. 38 shows an exemplary wire frame of the AESWS administrator library profile management page. The library profile management page maintains the library administrator information for libraries that are part on the AES network. The page contains text boxes for entering, the name of the library, the address of the library, the contact name for the library, the contact phone for the library, the change password option, and the directory path for the library logo to be displayed on the website when the member logs in to their library's applicant hosted web pages. FIG. 39 shows a sample of the library management profile page.

Figure 41:
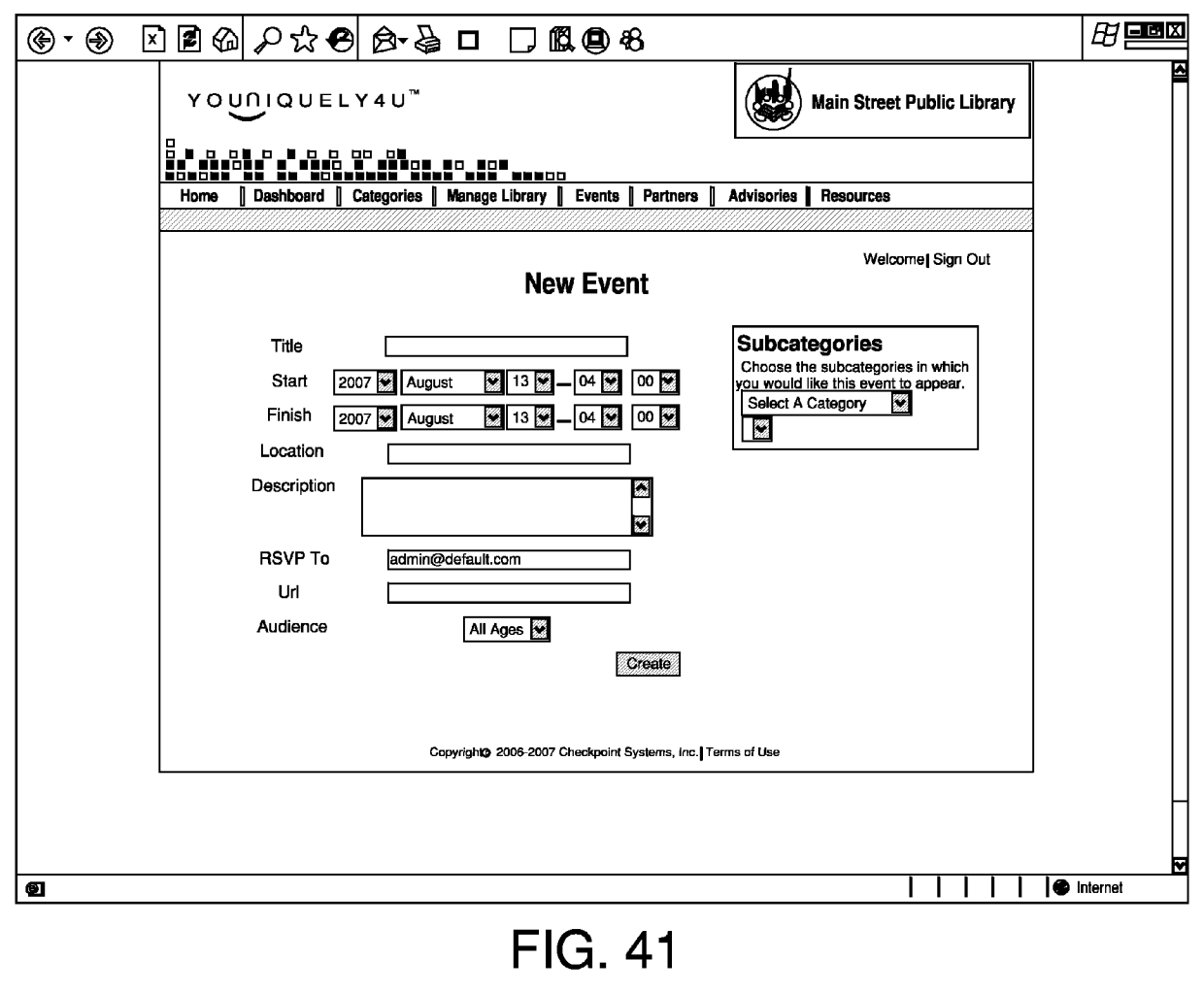

FIG. 40 shows an exemplary wire frame of the AESWS administrator event edit form page. The event edit form page is used for entering new or modifying existing events. Events are programs or activities that are offered by the library, library partners, or sponsors. The event edit form has text boxes for entering the following information: title—the title of the event; date/time—the date and time of the event; location—where the event takes place; description—information about the event; RSVP email—email address for members to send request to register for events; external link—link to internet site for additional information about an event; audience selection—selection box for age appropriateness of event; and category/subcategory—the category or categories for which this event is applicable. FIG. 41 shows a sample of the administrator event edit form page.

Figure 42:
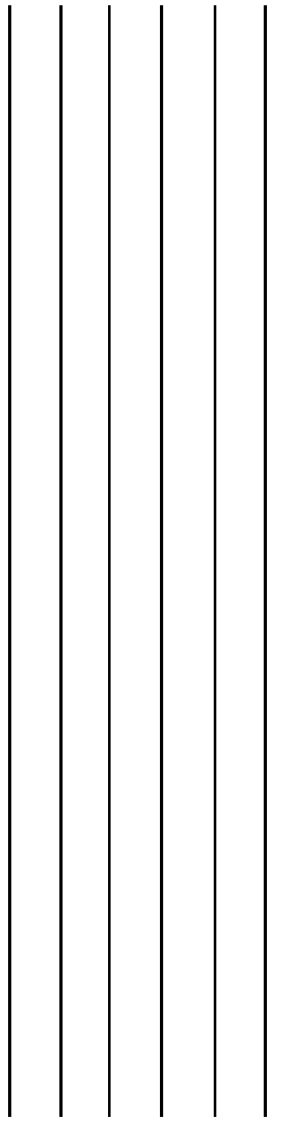
FIG. 42 is a wire frame depiction of an administrator local sponsors management page of the hosted web site.
Figure 43:
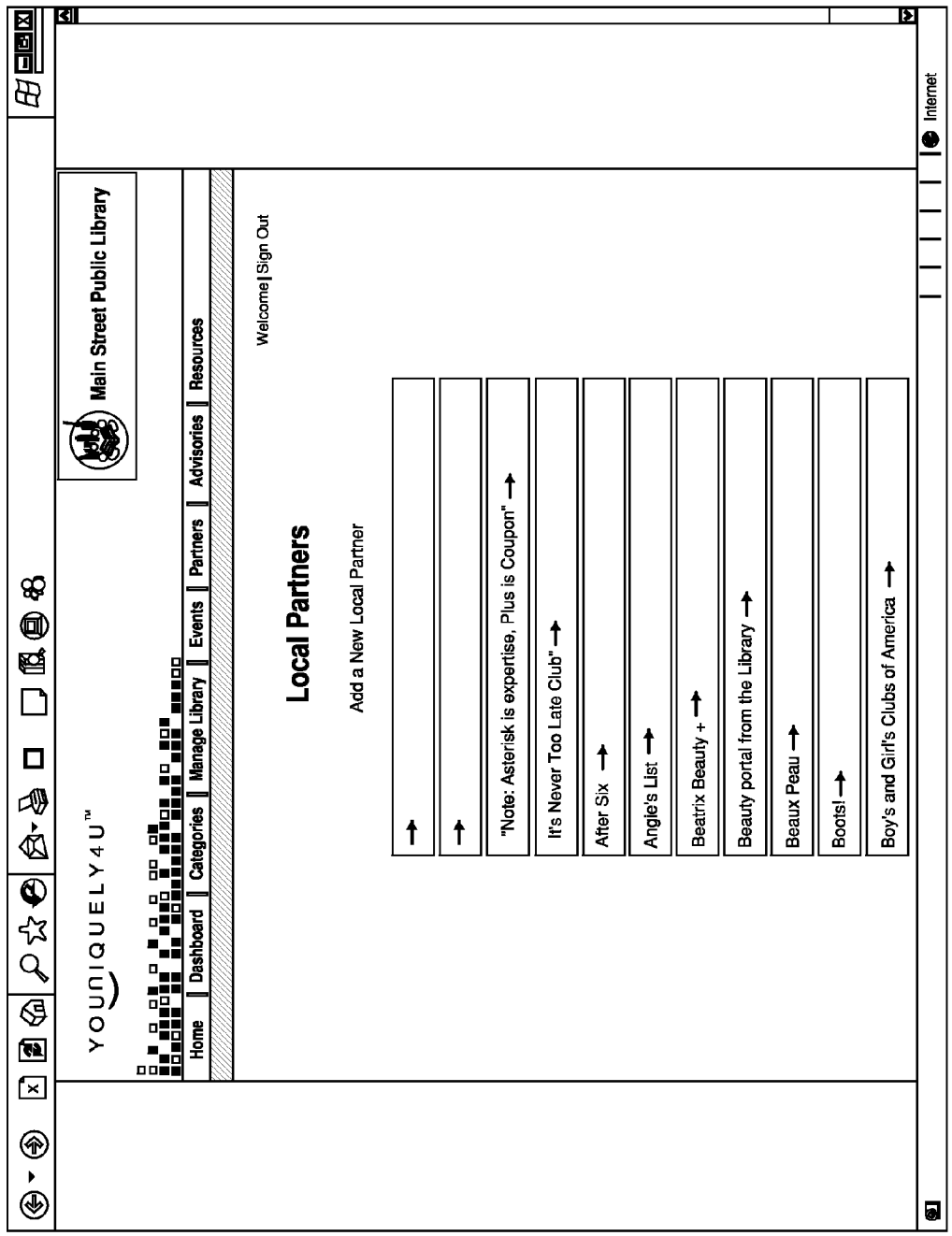
FIG. 43 is a screen display of FIG. 42.

FIG. 42 shows an exemplary wire frame of the AESWS administrator local sponsors management page. This page shows a selectable list of library-managed local sponsors or advertisers and a button for creating a new advertiser. Selecting a current advertiser or local sponsor link brings the administrator to the advertiser or local partner form, where information can be edited. Selecting the "Add new advertiser" button takes the administrator the "New advertiser" form, for entering a new advertiser's or local partner's content to the program. FIG. 43 shows a sample page of the AESWS administrator local sponsors management page.

Figure 45:
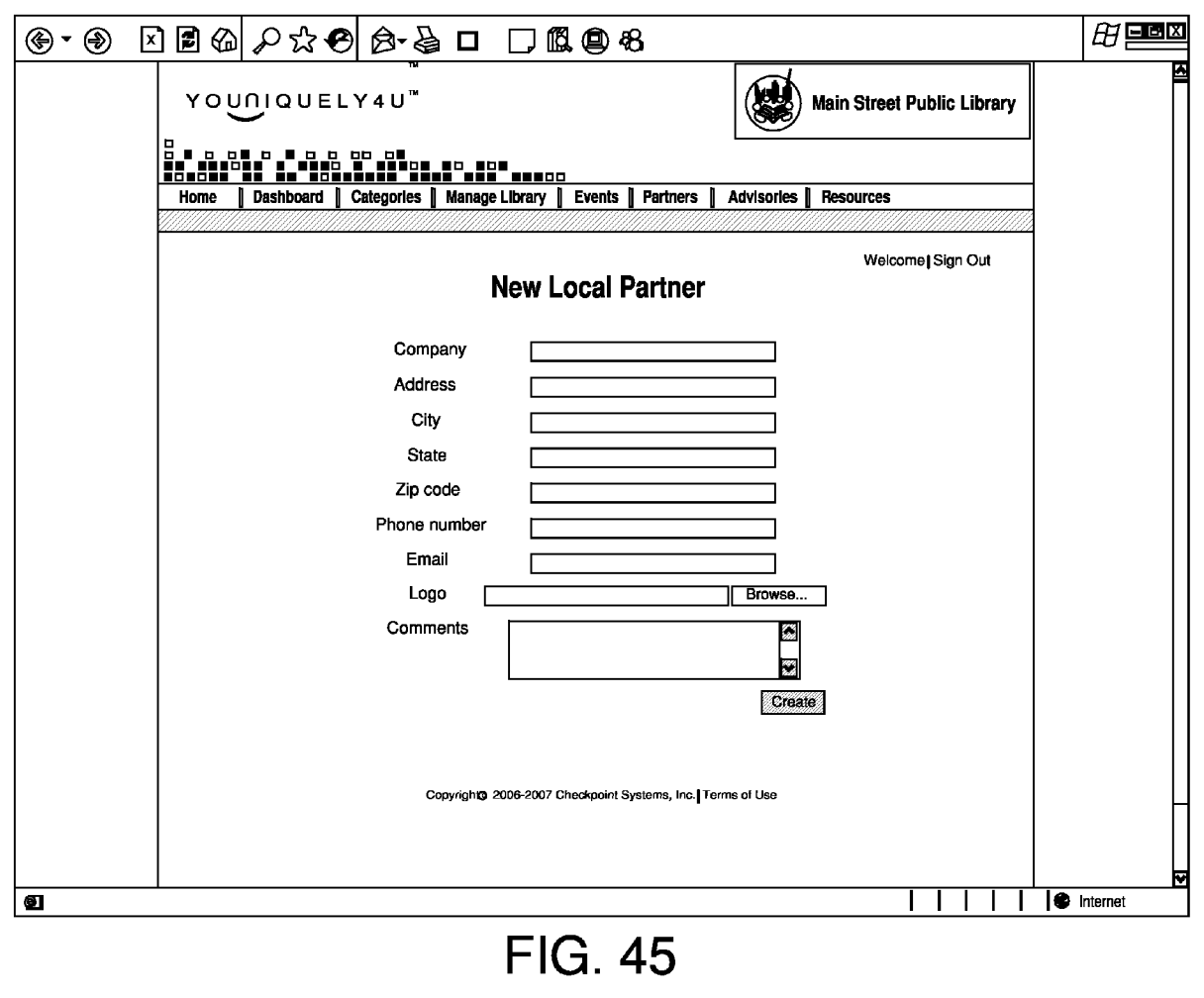

FIG. 44 shows an exemplary wire frame of the AESWS Administrator New Advertiser Form page. This page is for entering content for a new advertiser or local sponsor. The advertiser form has text boxes for entering the following advertiser's information: Business Name—the name of the business; Address—what the business address is; Phone—phone number for the business; email—the business email address; and Comments—informational text. There is also a text box with associated browse button for adding the path to display a logo for the advertiser. FIG. 45 shows a sample of the administrator "New Advertiser Form" page.

Figure 46:
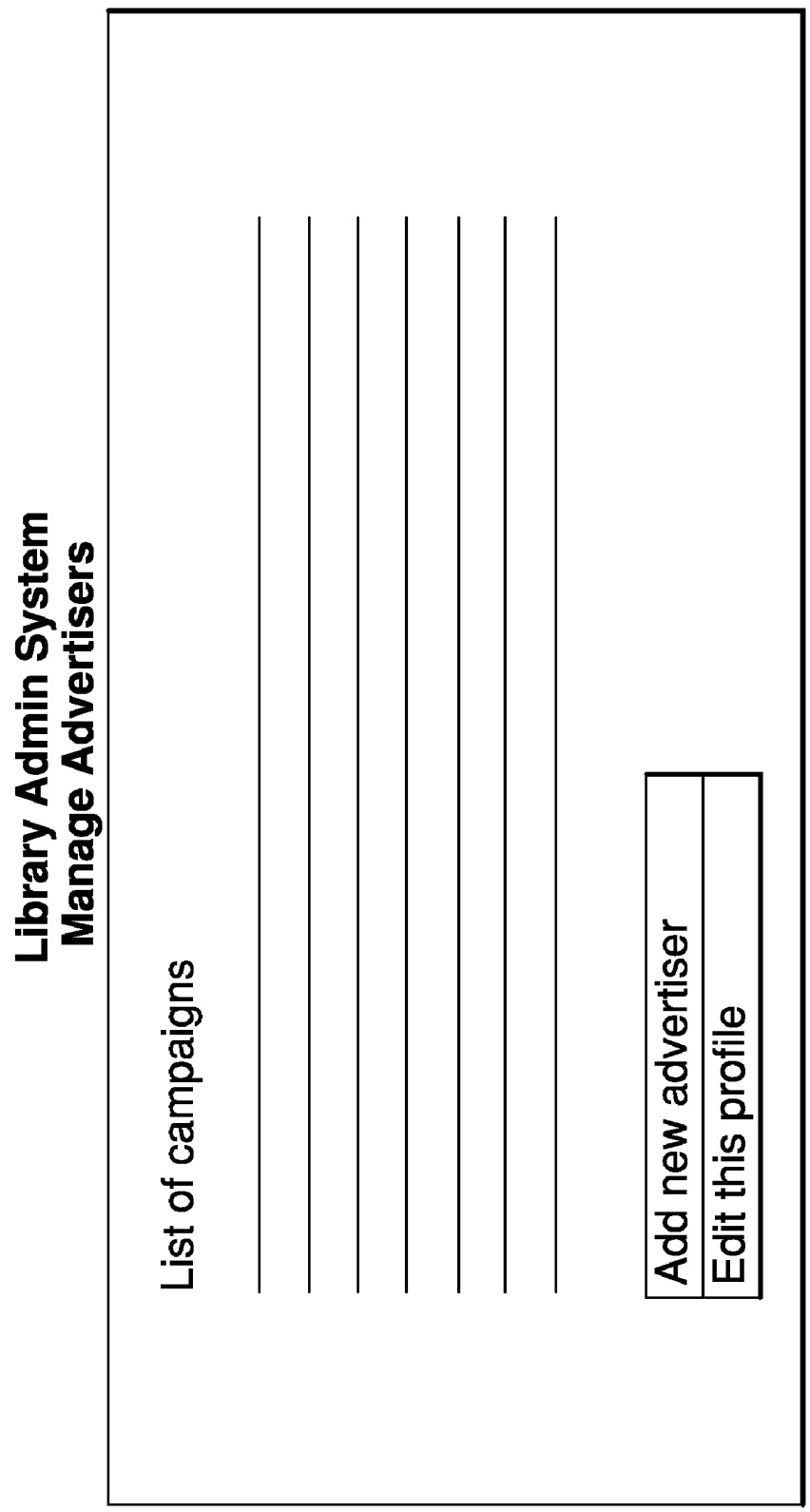
FIG. 46 is a wire frame depiction of an administration advertisers management page of the hosted web site.
Figure 47:
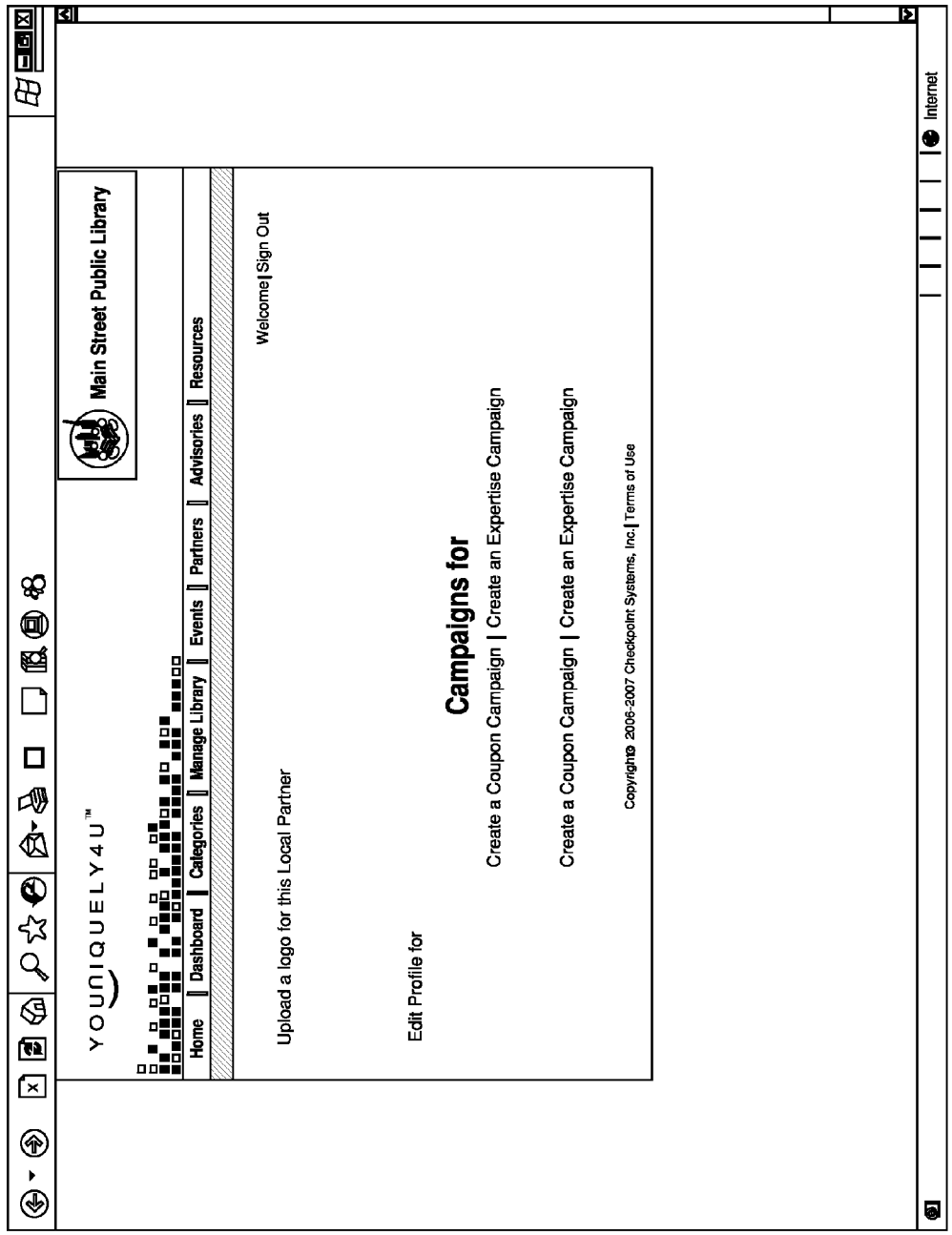
FIG. 47 is a screen display of FIG. 46.

FIG. 46 shows an exemplary wire frame of the AESWS administration advertisers management page. The advertiser management page is used for creating advertiser campaigns. The page lists any current campaigns. Current campaigns are selectable and selecting current campaigns will bring the administrator to the campaign page, where campaign content can be edited. There a two types of advertiser campaigns that an administrator can create; a coupon campaign and an expertise campaign. A selectable link is provided for each campaign type. When the link is selected the page for creating the coupon or expertise campaign is displayed. FIG. 47 shows a sample of the AESWS administration advertisers management page.

Figure 49:
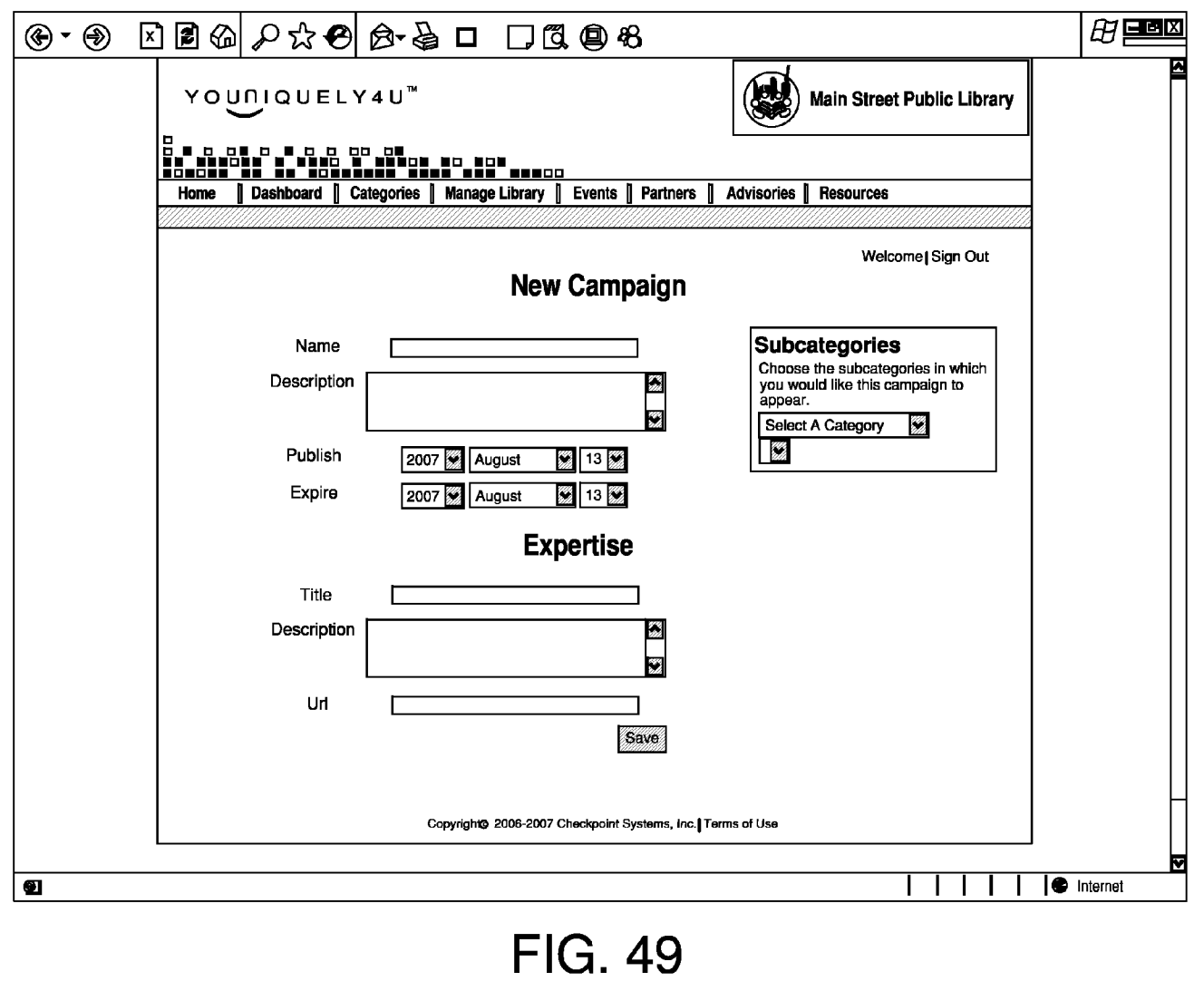

FIG. 48 shows an exemplary wire frame of the AESWS administrator new/campaign/edit campaign page for creating an expertise campaign. This page includes text boxes for the campaign content and expertise content. Text boxes for the campaign information include the name, description, publish date and expiration date. Text boxes for the expertise include the title, description and URL. The URL is the link to the where the expertise content is located. A drop down box enables the administrator to select the category or categories that the campaign is relevant to. A save button enables the administrator to save the campaign. FIG. 49 shows a sample of the administrator new/campaign/edit campaign page for expertise content.

Figure 51:
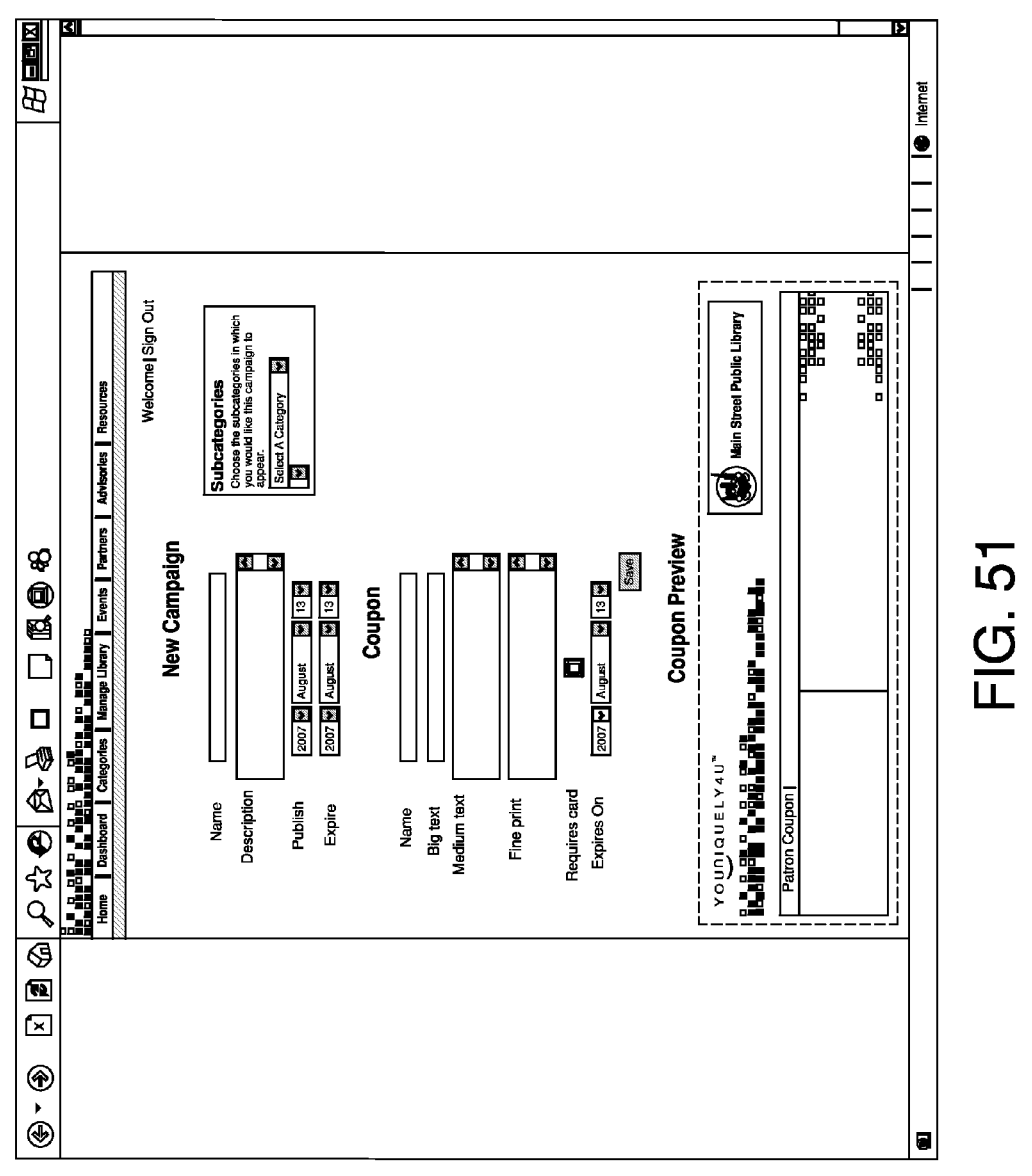

FIG. 50 shows an exemplary wire frame of the AESWS administrator new/campaign/edit campaign page for creating a coupon campaign. This page includes text boxes for the campaign content and coupon content. Text boxes for the campaign information include the name, description, publish date and expiration date. Text boxes for the coupon include the name, coupon name, big text (large font text printed on the coupon), medium text (medium font text located below big text that is printed on the coupon), and fine print (small font text printed at the bottom of the coupon). A drop down box is provided for the administrator to select the category or categories for which this event is applicable. There are three drop down boxes for selecting the date of coupon expiration, a save button to save the coupon campaign, and a coupon preview that shows what the coupon looks like as text is added to the coupon. FIG. 51 shows a sample of the administrator new/campaign/edit campaign page.

Figure 53:
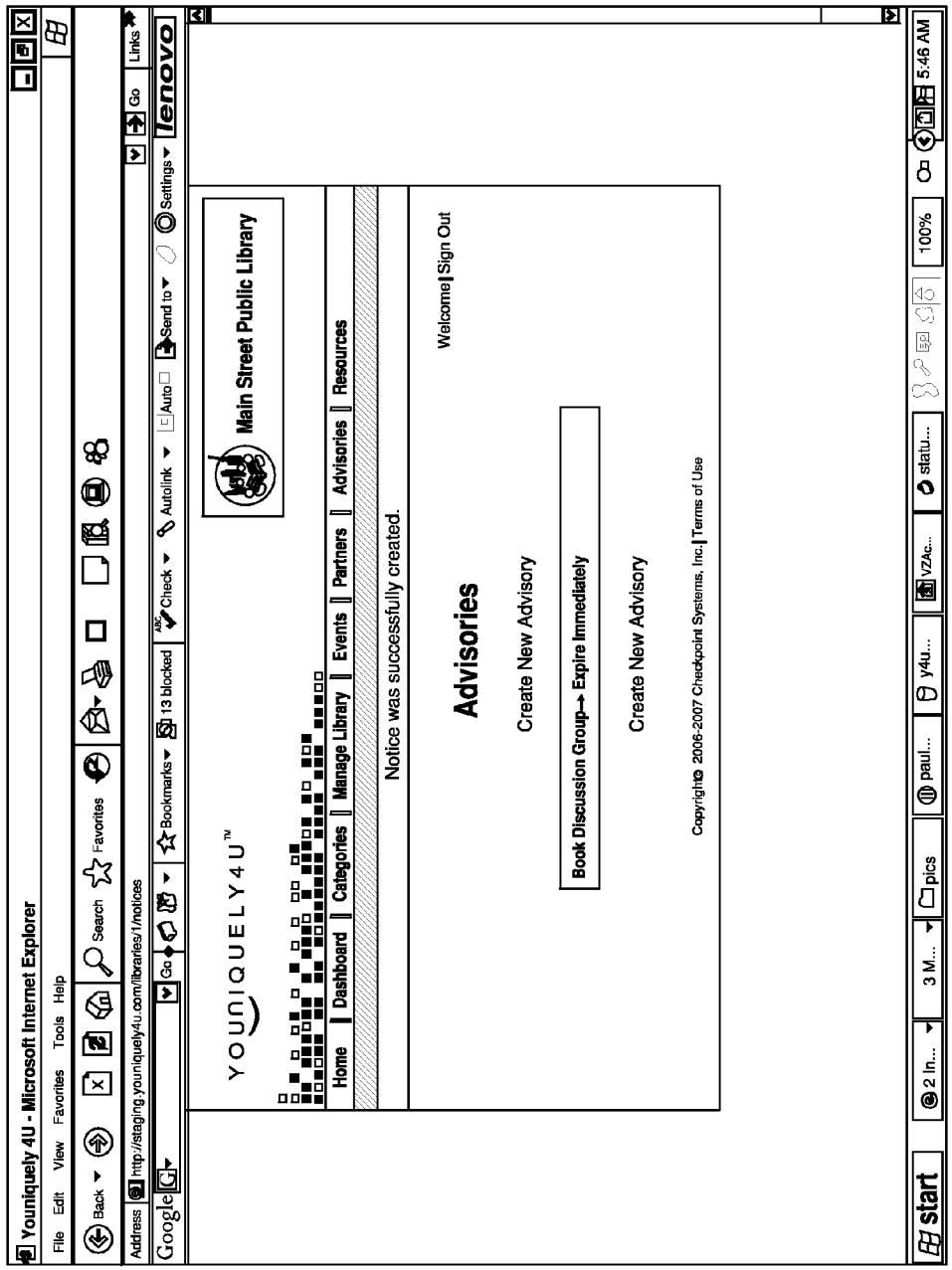
FIG. 53 is a screen display of FIG. 53.

FIG. 52 shows an exemplary wire frame of the AESWS administrator manage readers' advisory page. This page lists current readers' advisories that are selectable and a button for adding new readers' advisories. Selecting a current readers' advisory brings the administrator to the edit readers' advisory page to edit the current advisory. Selecting Add New brings the administrator to the new readers' advisory page to add a new reader advisory. Editing and adding new advisories are on the same form. The only difference is that the form already has content in it when a current advisory is selected for editing. FIG. 53 shows a sample of the administrator manage readers' advisory page.

Figure 55:
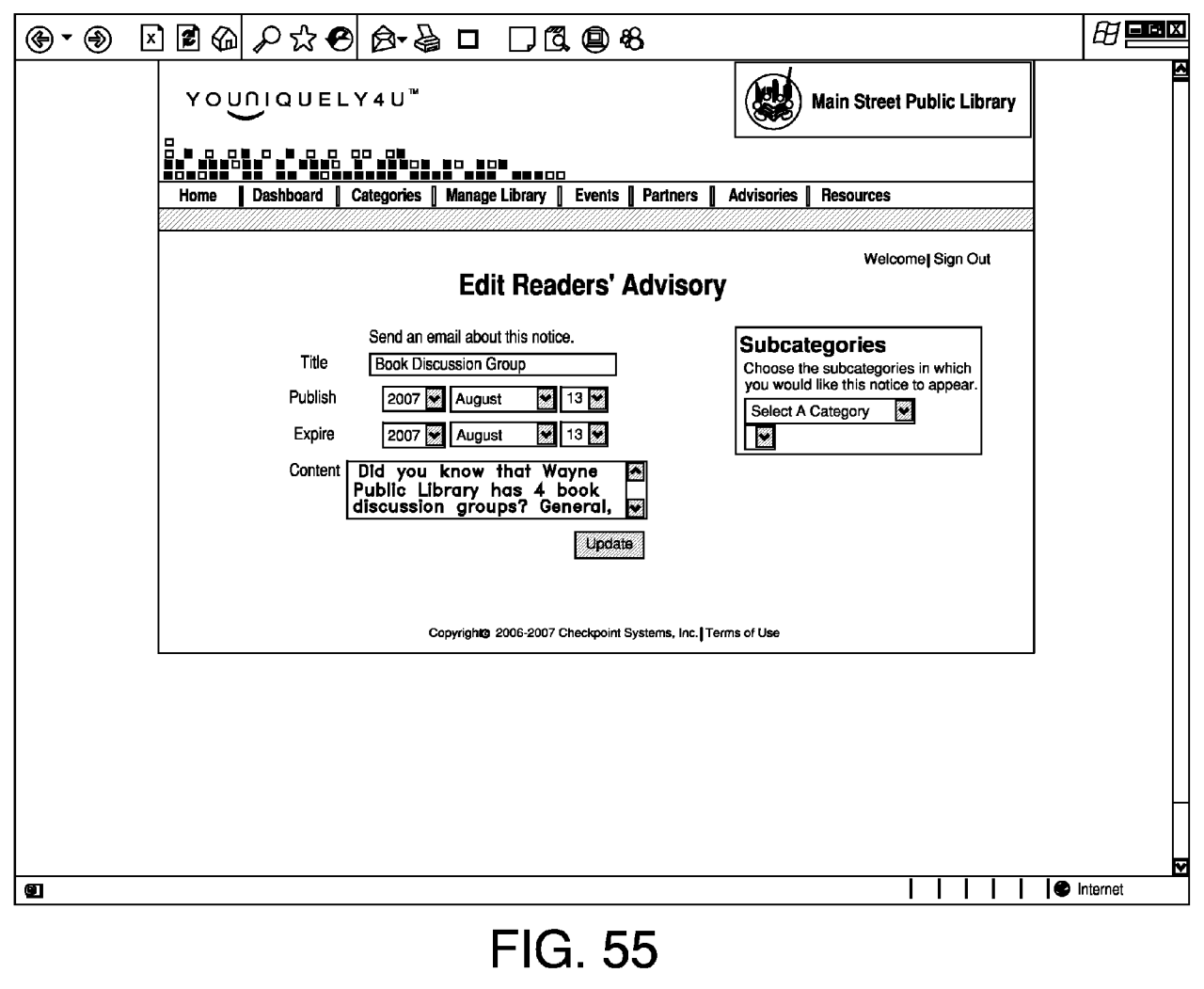

FIG. 54 shows an exemplary wire frame of the AESWS administrator edit readers' advisory page. This page contains text boxes for entering the following readers' advisory information: title—the title of the reader advisory; publish/expire date—when the advisory expires and is no longer listed as readers' advisory content on the AES program; and comments—a textual review of the reader advisory. The page has a selection box for assigning a category or categories to which the readers' advisory content will be associated. FIG. 55 shows a sample of the administrator edit readers' advisory page.

Figure 57:
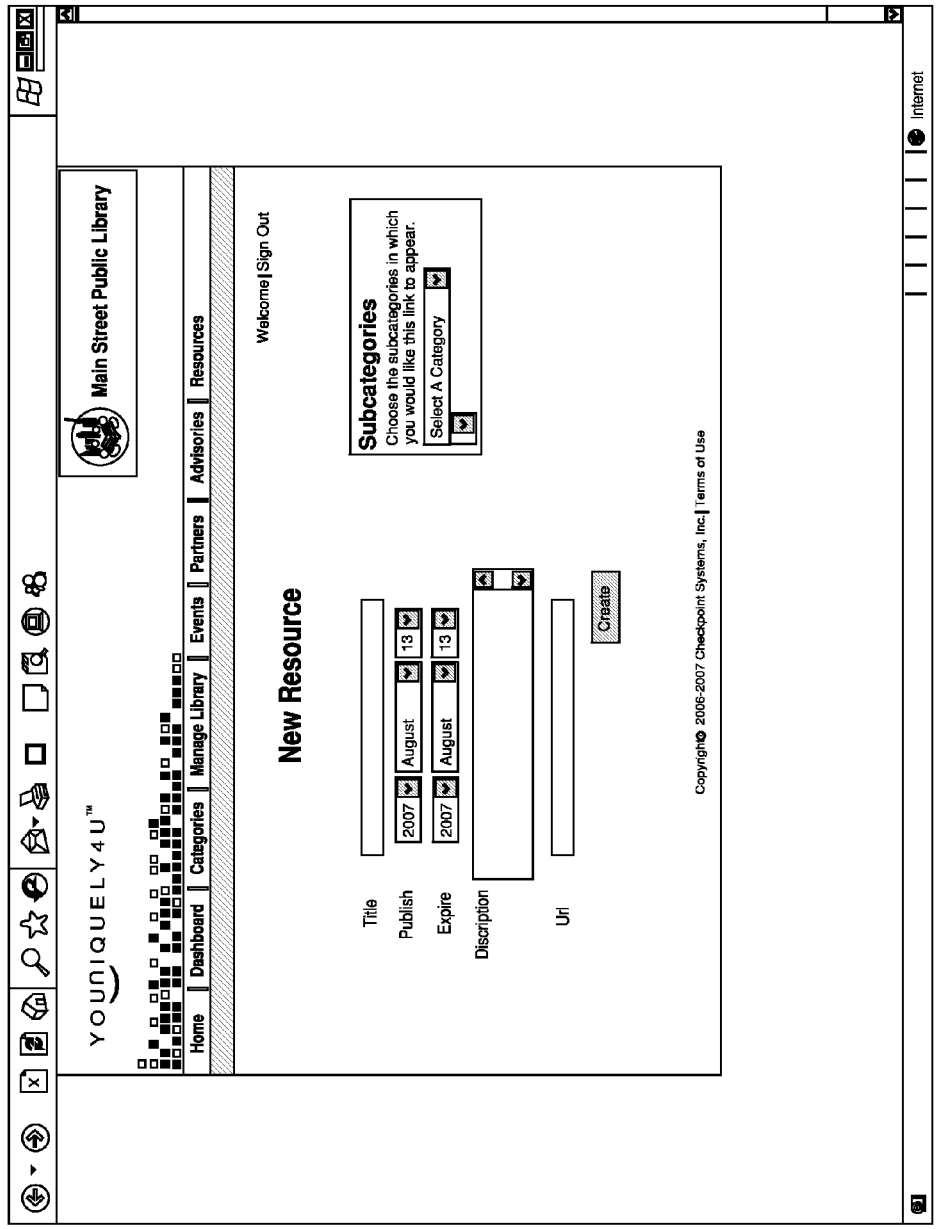
FIG. 57 is a screen display of FIG. 56.

FIG. 56 shows an exemplary wire frame of the AESWS administrator links and resources form page. The links and resources form page is where links to expertise and educational content are entered. The form includes text boxes for entering the following content: title—the title of the content that is being made accessible; publish/expire date—the date that the resource is no longer available from the AES program; description—a brief summary of the content; and external URL—a link to a site where content is. The form has a selection box for assigning the category or categories with which the resource is associated. FIG. 57 shows a sample of the administrator links and resources form page.

Figure 58:
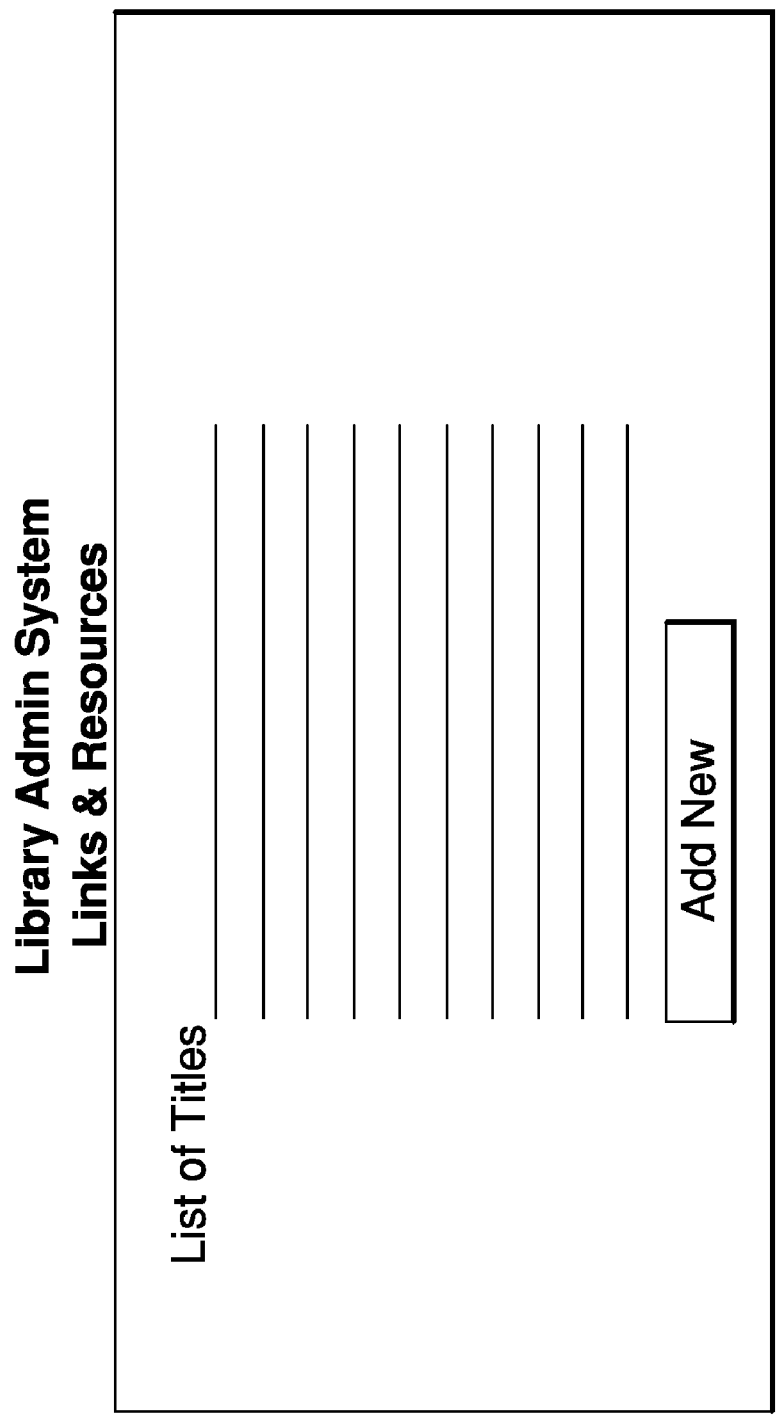
FIG. 58 is a wire frame depiction of an administrator's links and resources (existing resources) page of the hosted web site.
Figure 59:
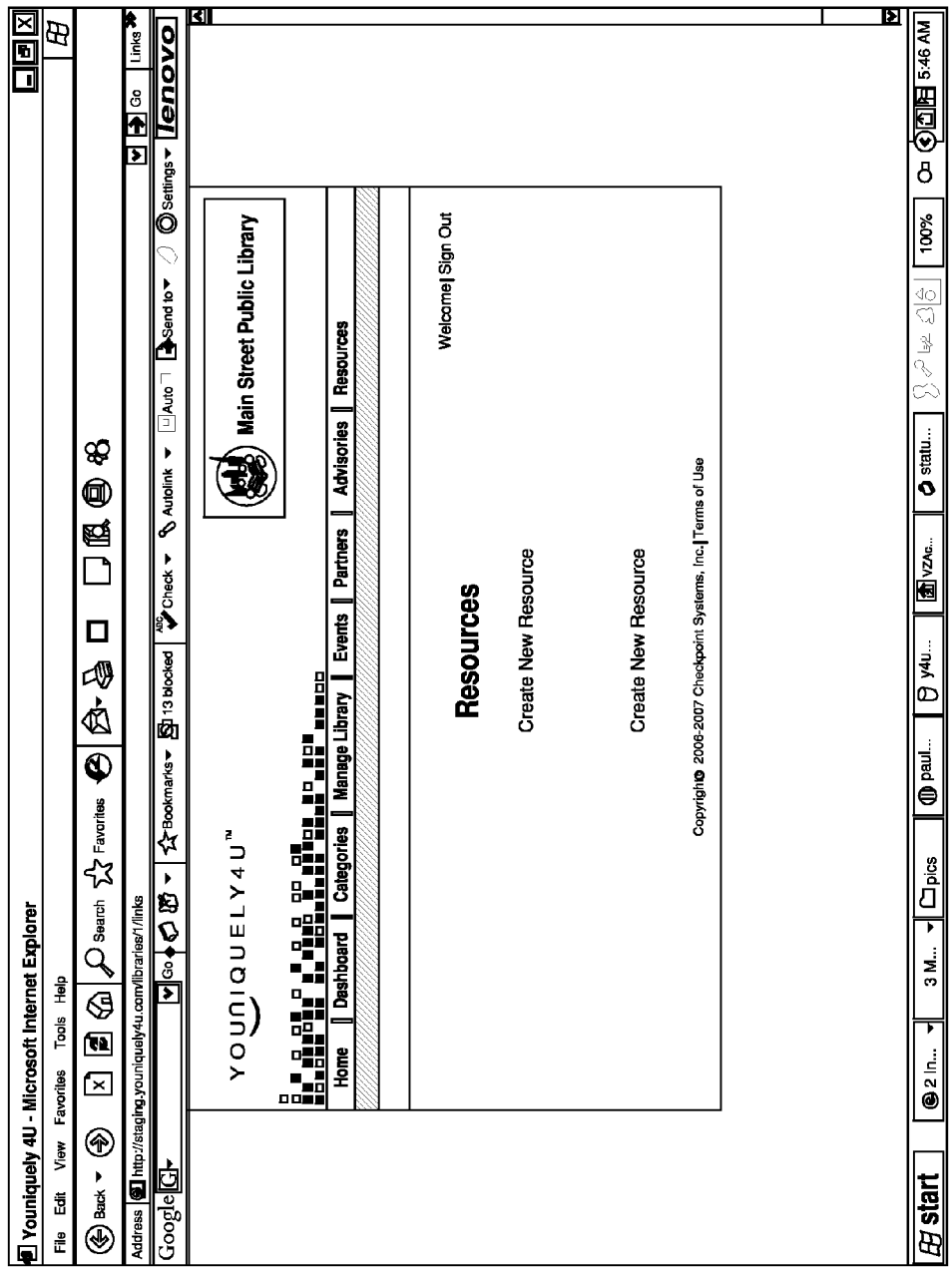
FIG. 59 is a screen display of FIG. 58.

FIG. 58 shows an exemplary wire frame of the AESWS administrator links & resources page. This page displays selectable text and a "create new" button. The selectable text is a listing of titles of the existing resource content. Selecting the title resource brings the administrator to the "Links and Resources" form for editing the resource content. Selecting the "add new" button brings the administrator the "Links and Resources" form for adding a new link and resource. FIG. 59 shows a sample of the administrator links & resources page.

It is also within the broadest scope of the present invention to include providing a confirmation item to an "untargeted patron". By way of example only, this involves a patron who reserves a library computer to use in a "stand-alone" mode, e.g., work on a Word application, Excel spreadsheet, etc., where he/she is not conducting a search but is rather running an application on one of the library computers. In that instance, there is no user interest category that can be associated with such activity. To that end, the AES still generates a confirmation item but uses a default user interest category. By way of example only, this default user interest category may include "local offering." Thus, when the patron concludes this stand-alone mode computer session, a confirmation item is generated, e.g., a printed receipt, in which the default user interest category number is presented. The patron is therefore invited to access the website and to opt-in while entering the default user interest category number.

Although the above disclosure focuses on use of the checkout procedure and equipment, it should be understood that it is within the broadest scope of the present invention to include a check-in procedure and related equipment as part of the system and method of determining library patron's interests.

Library Advocate

The Library Advocate (LA) is a library-branded, service provider-hosted web-application service for libraries that links user needs and interests, as identified by patrons' use of library materials, to information, expertise, advertising content, events, programs and promotional values organized by categories that are controlled by the library. The LA features includes library staff services and library program services. The library staff services includes calendaring and RSVP/scheduling, readers' advisories and bookmarking, coupon/voucher programs, speaker bureau management and third party content as provided by the present invention. The library program services include local advertiser/partner services, third party expertise references and category specific grants and donations. As mentioned previously, the advantages for patrons using the present invention is that it:

permits the viewing of library events related to areas of interest and permits reserving spots by clicking on provided links;

permits receipt of alerts for new or recommended material or on-line content in areas of interest;

permits the receipt of coupons/vouchers for goods/services in areas of interest;

permits patrons to learn about library staff, thought leaders and community leaders who are available for public speaking on various areas of interest; and permits pledge donations and gifts to library which are ear-marked for specific areas of interest and define rules or conditions associated with the donation;

The advantages for libraries of the invention are:

fast/easy creation of an event calendar with the ability to associate events with categories of interest;

automatic reservation and library facility management;

fast/easy creation of readers' advisories and on-line content links with the ability to associate with categories of interest;

fast/easy generation of emails to patrons promoting library benefits, soliciting feedback (e.g., survey), etc.;

fast/easy catalog of potential speakers organized by category; and fast/easy creation of coupon/vouchers promoting local partners and tools for tracking redemption;

An advanced LA configuration implements patron communication services (e.g., two-way interaction) that provide interaction with library staff and other patrons using advanced media types and/or distributed collaboration (e.g., user accounts/profiles, blogs, Wikis, videos, pictures, podcasts, chat rooms) and book tags (e.g., consumer reviews), meeting room bookings, and federated searches, etc. Thus, this permits the building of on-line library communities triggered by patron interest using the service provider-hosted web-application service for libraries which enables patrons to interact across geographic boundaries without additional support or investment of local municipalities.

While the invention has been described in detail and with reference to specific examples thereof, it will be apparent to one skilled in the art that various changes and modifications can be made therein without departing from the spirit and scope thereof.

What is claimed is:

1. A system for providing deliverables in the form of services and/or items to patrons of a library comprising:

a confirmation item received by the patron from the library upon either checking out a specific library asset or reserving a specific library asset for checkout, said confirmation item bearing indicia indicative of a category of interest related to the subject matter of the specific library asset; and an Internet-based system establishing a program at a website for providing said deliverables, said deliverables being in the form of information and/or expertise in the category of interest and/or events or programs available from the library or from others in the category of interest and/or promotional values in the category of interest, said Internet-based system being arranged so that the patron who receives said confirmation item can access said website to opt-into said program if the patron so chooses, said website being arranged to receive from the patron who has opted-in an input corresponding to said indicia on said confirmation item, as well as patron information, whereupon said Internet-based system responds to said indicia and said patron information by presenting the patron with information about said deliverables, so that the patron can avail himself/herself of said deliverables if the patron so chooses.

2. The system of claim 1 wherein said confirmation item is in electronic form or print form.

3. A method for providing deliverables in the form of services and/or items to patrons of a library comprising:

providing a confirmation item to the patron by the library upon the patron either checking out a specific library asset or reserving a specific library asset for checkout, said confirmation item bearing indicia indicative of a category of interest related to the subject matter of the specific library asset; and establishing a program at a website on the Internet for providing deliverables in the form of information and/or expertise in the category of interest and/or events or programs available from the library or from others in the category of interest and/or promotional values in the category of interest, said program being arranged so that the patron who receives said confirmation item can access said website to opt-into said program if the patron so chooses, said website being arranged to receive from the patron who has opted-in an input corresponding to said indicia on said confirmation item, as well as patron information, whereupon said Internet-based system responds to said indicia and said patron information by presenting the patron with information about said deliverables, so that the patron can avail himself/herself of said deliverables if the patron so chooses.

4. The method of claim 3 wherein said confirmation item is in electronic form or print form.

5. A method of doing business by a service provider comprising:

establishing a system for a library to enable patrons of the library to have access to deliverables in the form of services and/or items, said system comprising providing a confirmation item to the patron upon the patron either checking out a specific library asset or reserving a specific library asset for checkout, said confirmation item bearing indicia indicative of a category of interest related to the subject matter of the specific library asset; and establishing a program at a website on the Internet for providing deliverables in the form of information and/or expertise in the category of interest and/or events or programs available from the library or from others in the category of interest and/or promotional values in the category of interest, said program being arranged so that the patron who receives said confirmation item can access said website to opt-into said program if the patron so chooses, said website being arranged to receive from the patron who has opted-in an input corresponding to said indicia on said confirmation item, as well as patron information, whereupon said Internet-based system responds to said indicia and said patron information by presenting the patron with information about said deliverables, so that the patron can avail himself/herself of said deliverables if the patron so chooses.

6. The method of claim 5 wherein said confirmation item is in electronic form or print form.

7. A method for automatically providing library patrons with relevant information upon checkout or reservation of at least one library asset, said method comprising:

associating, on a database, the identity of every removable library asset with a category based on a user interest;

providing each removable library asset with a machine readable identity code;

scanning, using a scanner, the machine readable identity code upon checkout of a removable library asset;

generating a confirmation item that identifies the removable library asset or a reserved library asset and at least one corresponding user interest category indicia;

inputting, via an Internet-accessible device, said user interest category indicia, as well as patron information, to a website at which said library patrons are registered; and displaying information, via said Internet-accessible device, pertinent to said at least one user interest category indicia and to said patron information, to said registered library patrons.

8. The method of claim 7 wherein said confirmation item is in electronic form or print form.

9. A method of integrating a system for providing deliverables in the form of services and/or items to patrons of a library wherein the library has an existing library asset management system and which is coupled to an existing checkout station or asset access system:

accessing said existing library asset management system;

intercepting messages from the library asset management system to determine library asset identifiers, said computer associating said library asset identifiers with corresponding user interest categories;

intercepting messages from the checkout station containing library asset identifiers corresponding to library assets being checked out;

comparing said intercepted library asset identifiers to determine if there is a match between said intercepted asset identifiers and their corresponding user interest categories;

generating a confirmation item bearing indicia of said corresponding user interest category without interfering with the library system's checkout process if a match is found, or generating a confirmation item without indicia of said corresponding interest category if no match is found; and permitting a patron who has completed the checkout or reservation or access process to input said corresponding user interest category at a website for providing deliverables in the form of information and/or expertise in the category of interest and/or events or programs available from the library or from others in the category of interest and/or promotional values in the category of interest, said program being arranged so that the patron who receives said confirmation item can access said website to opt-into said program if the patron so chooses, said website being arranged to receive from the patron who has opted-in an input corresponding to said indicia on said printed item, as well as patron information, whereupon said website responds to said indicia and said patron information by presenting the patron with information about said deliverables, so that the patron can avail himself/herself of said deliverables if the patron so chooses.

10. The method of claim 9 wherein said confirmation item is in electronic form or print form.

11. A system for providing deliverables in the form of services and/or items to patrons of a library which includes an existing library asset management system database and storage means having library asset identifiers stored therein, said system comprising:

a user interest category database and associated storage means, said database including records that associate specific user interest categories with specific library assets;

a checkout station interfaced with said user interest category database and associated storage means; and an Internet-based system establishing a program at a website for providing said deliverables; and wherein said checkout station and said user interest category database and associated storage means cooperate to generate a confirmation item that includes indicia indicative of a user category of interest related to a subject matter of a specific library asset that is being checked out by the patron and wherein said deliverables are in the form of information and/or expertise in the category of interest and/or events or programs available from the library or from others in the category of interest and/or promotional values in the category of interest, said Internet-based system being arranged so that the patron who receives said confirmation item can access said website to opt-into said program if the patron so chooses, said website being arranged to receive from the patron who has opted-in an input corresponding to said indicia on said confirmation item, as well as patron information, whereupon said Internet-based system responds to said indicia and said patron information by presenting the patron with information about said deliverables, so that the patron can avail himself/herself of said deliverables if the patron so chooses.

12. The system of claim 11 wherein said confirmation item is in electronic form or print form.

13. A system for providing deliverables in the form of services and/or items to patrons of a library which includes an existing library asset management system database and storage means having library asset identifiers stored therein, said system comprising:
   a user interest category database and associated storage means, said database including records that associate specific user interest categories with specific library assets;
   a computer search station for permitting patrons to conduct searches and interfaced with said user interest database and associated storage means; and
   an Internet-based system establishing a program at a website for providing said deliverables; and
   wherein said computer search station is monitored during a patron search session such that a specific user interest category is associated with content or keywords used in the patron's search, said user interest category database and associated storage means cooperating to generate a confirmation item that includes indicia indicative of said specific user interest category related to the patron's search and wherein said deliverables are in the form of information and/or expertise in the category of interest and/or events or programs available from the library or from others in the category of interest and/or promotional values in the category of interest, said Internet-based system being arranged so that the patron who receives said confirmation item can access said website to opt-into said program if the patron so chooses, said website being arranged to receive from the patron who has opted-in an input corresponding to said indicia on said confirmation item, as well as patron information, whereupon Internet-based system responds to said indicia and said patron information by presenting the patron with information about said deliverables, so that the patron can avail himself/herself of said deliverables if the patron so chooses.

14. The system of claim 13 wherein said confirmation item is in electronic form or print form.

15. A system for providing deliverables in the form of services and/or items to patrons of a library which includes an existing library asset management system database and storage means having library asset identifiers stored therein, said system comprising:
   a user interest category database and associated storage means, said database including records that associate specific user interest categories with specific library assets;
   a digital device for permitting patrons to use said digital device in a stand-alone session and interfaced with said user interest database and associated storage means; and
   an Internet-based system establishing a program at a website for providing said deliverables; and
   wherein upon ending a session with said digital device, a default user interest category is associated with said session, said user interest category database and associated storage means cooperating to generate a confirmation item that includes indicia indicative of said default user interest category and wherein said deliverables are in the form of information and/or expertise in said default category of interest and/or events or programs available from the library or from others in the category of interest and/or promotional values in said default category of interest, said Internet-based system being arranged so that the patron who receives said confirmation item can access said website to opt-into said program if the patron so chooses, said website being arranged to receive from the patron who has opted-in an input corresponding to said indicia on said confirmation item, as well as patron information, whereupon said Internet-based system responds to said indicia and said patron information by presenting the patron with information about said deliverables, so that the patron can avail himself/herself of said deliverables if the patron so chooses.

16. The system of claim 15 wherein said confirmation item is in electronic form or print form.

\* \* \* \* \*